United States Patent
Yu et al.

(10) Patent No.: US 11,936,861 B2
(45) Date of Patent: Mar. 19, 2024

(54) ENCODING METHOD AND APPARATUS, AND DECODING METHOD AND APPARATUS

(71) Applicants: Huawei Technologies Co., Ltd., Shenzhen (CN); Tsinghua University, Beijing (CN)

(72) Inventors: Quanhe Yu, Beijing (CN); Jicheng An, Shenzhen (CN); Jianhua Zheng, Shenzhen (CN); Yongbing Lin, Beijing (CN); Liqiang Wang, Beijing (CN); Benben Niu, Beijing (CN); Ziwei Wei, Beijing (CN); Yun He, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 563 days.

(21) Appl. No.: 17/099,470

(22) Filed: Nov. 16, 2020

(65) Prior Publication Data
US 2021/0076036 A1    Mar. 11, 2021

Related U.S. Application Data

(63) Continuation of application No. PCT/CN2019/087316, filed on May 16, 2019.

(30) Foreign Application Priority Data

May 16, 2018  (CN) .......................... 201810470411.5
Jun. 7, 2018   (CN) .......................... 201810581662.0

(51) Int. Cl.
H04N 19/119    (2014.01)
H04N 19/105    (2014.01)
(Continued)

(52) U.S. Cl.
CPC ......... *H04N 19/119* (2014.11); *H04N 19/105* (2014.11); *H04N 19/176* (2014.11); *H04N 19/46* (2014.11)

(58) Field of Classification Search
CPC ..... H04N 19/119; H04N 19/46; H04N 19/176
(Continued)

(56) References Cited

FOREIGN PATENT DOCUMENTS

| CN | 102595116 A | 7/2012 |
|---|---|---|
| CN | 104811736 A | 7/2015 |

(Continued)

OTHER PUBLICATIONS

"Series H: Audiovisual and Multimedia Systems Infrastructure of audiovisual services—Coding of moving video, Video coding for low bit rate communication," ITU-T Recommendation H.263, total 226 pages, Geneva, Switzerland (Jan. 2005).

(Continued)

*Primary Examiner* — Jeffery A Williams
(74) *Attorney, Agent, or Firm* — Leydig, Voit & Mayer, Ltd.

(57) ABSTRACT

Embodiments of this application relate to the video coding and compression field, and disclose an encoding method and apparatus, and a decoding method and apparatus, to resolve a problem that an existing split mode cannot satisfy a relatively complex texture requirement. The decoding method specifically includes: parsing a bitstream to determine a basic split mode for a current to-be-decoded picture block and a target derivation mode for a subpicture block of the current to-be-decoded picture block; splitting the current to-be-decoded picture block into N subpicture blocks in the basic split mode, where N is an integer greater than or equal to 2; deriving one derived picture block from at least two (Continued)

adjacent subpicture blocks in the N subpicture blocks in the target derivation mode; and decoding the derived picture block.

14 Claims, 26 Drawing Sheets

(51) Int. Cl.
*H04N 19/176* (2014.01)
*H04N 19/46* (2014.01)

(58) Field of Classification Search
USPC .................................................. 375/240.02
See application file for complete search history.

(56) References Cited

FOREIGN PATENT DOCUMENTS

| | | | |
|---|---|---|---|
| CN | 107071468 A | 8/2017 | |
| CN | 107566848 A | 1/2018 | |
| TW | 201528209 A | 7/2015 | |
| TW | 201626793 A * | 7/2016 | ........... H04N 19/159 |
| WO | WO-2013039363 A2 * | 3/2013 | ........... H04N 19/103 |
| WO | 2017157249 A1 | 9/2017 | |
| WO | 2017205621 A1 | 11/2017 | |
| WO | 2017205700 A1 | 11/2017 | |
| WO | 2017205704 A1 | 11/2017 | |
| WO | 2018056703 A1 | 3/2018 | |

OTHER PUBLICATIONS

"Series H: Audiovisual and Multi Media Systems Infrastructure of audiovisual services—Coding of moving video, Advanced video coding for generic audiovisual services," Recommendation ITU-T H.264, total 812 pages, Geneva, Switzerland (Apr. 2017).

"Series H: Audiovisual and Multi Media Systems Infrastructure of audiovisual services—Coding of moving video, High efficiency video coding," Recommendation ITU-T H.265, total 692 pages, Geneva, Switzerland (Feb. 2018).

Amer et al., "An Enhanced Lenient Merging Scheme for H.264 Variable Block Size Selection," 2009 First International Conference on Advances in Multimedia, total 4 pages (Aug. 18, 2009).

Song Yu-xin et al., "Research on Fast Merge Mode Decision Method for 3D-HEVC," Journal of Signal Processing, vol. 32 No.1, total 10 pages (Jan. 2016). With English abstract.

* cited by examiner

CONT.
FROM
FIG. 13A
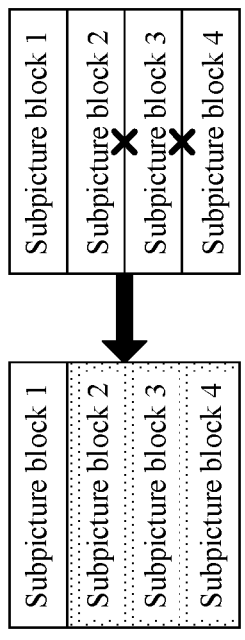 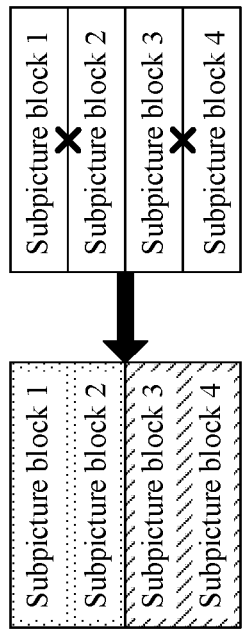 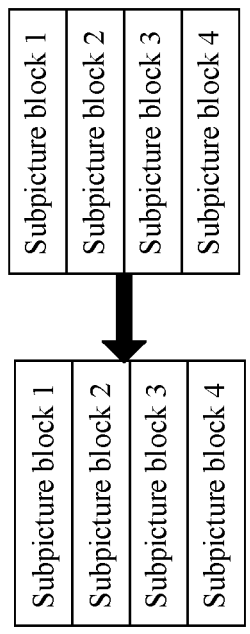 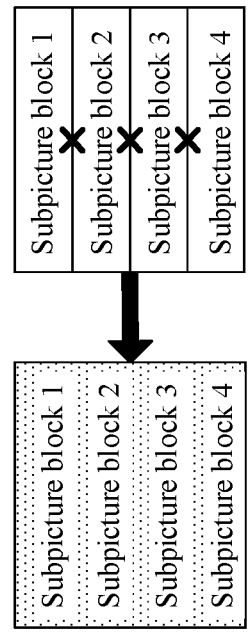
E'    F'    G'    H'
FIG. 13B

ENCODING METHOD AND APPARATUS, AND DECODING METHOD AND APPARATUS

CROSS-REFERENCE TO RELATED APPLICATIONS

This application is a continuation of International Application No. PCT/CN2019/087316, filed on May 16, 2019, which claims priority to Chinese Patent Application No. 201810470411.5, filed on May 16, 2018 and Chinese Patent Application No. 201810581662.0, filed on Jun. 7, 2018. The disclosures of the aforementioned applications are hereby incorporated by reference in their entireties.

TECHNICAL FIELD

Embodiments of this application relate to the video coding and compression field, and in particular, to an encoding method and apparatus, and a decoding method and apparatus.

BACKGROUND

A basic processing unit in video coding is a picture block. The picture block is obtained by an encoder side by splitting a frame of picture/a picture. Fineness and diversity of splitting into picture blocks affect a texture characteristic and a contour characteristic of a picture to some extent.

Currently, split modes for a picture block include a quadtree plus binary tree (QTBT) split mode, a triple tree (TT) split mode, an arbitrary binary tree (ABT) split mode, and the like. The QTBT split mode is as follows: A coding tree unit (CTU) is split into four subpicture blocks in a quadtree (QT) split mode; and then a subpicture block that needs to be further split is split in a QT split mode/binary tree (BT) split mode. According to this split mode, a picture block can be split into only a plurality of centrosymmetric subpicture blocks. The TT split mode is as follows: A picture block is horizontally split into three centrosymmetric or non-centrosymmetric subpicture blocks, or a picture block is vertically split into three centrosymmetric or non-centrosymmetric subpicture blocks. The ABT split mode is as follows: a picture block is horizontally split into two centrosymmetric or non-centrosymmetric subpicture blocks, or a picture block is vertically split into two centrosymmetric or non-centrosymmetric subpicture blocks.

Both the TT split mode and the ABT split mode may be combined with the QTBT split mode. However, a picture block obtained in a combined split mode still cannot satisfy a relatively complex texture requirement.

SUMMARY

Embodiments of this application provide an encoding method and apparatus, and a decoding method and apparatus, to resolve a problem that an existing split mode cannot satisfy a relatively complex texture requirement.

To achieve the foregoing objective, the following technical solutions are used in the embodiments of this application.

According to a first aspect, a decoding method is provided. After obtaining a bitstream, a decoding apparatus parses the bitstream to determine a basic split mode for a current to-be-decoded picture block and a target derivation mode for a subpicture block of the current to-be-decoded picture block. Then, the decoding apparatus splits the current to-be-decoded picture block into N (where N is an integer greater than or equal to 2) subpicture blocks in the basic split mode, and derives a first derived picture block from at least two adjacent subpicture blocks in the N subpicture blocks in a derivation manner indicated by the target derivation mode. Finally, the decoding apparatus decodes the first derived picture block. Herein, the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-decoded picture block, and M is an integer greater than or equal to 0.

It can be learned that the decoding apparatus determines a specific split mode for the current to-be-decoded picture block in the basic split mode and the target derivation mode. In the decoding method provided in this application, a plurality of different split results are identified by combining a split mode and a derivation mode. In comparison with the prior art, the decoding method can enrich split modes for a picture block, adapt to video pictures with various texture characteristics, improve picture quality of a compressed video picture, more effectively reduce bit overheads of bitstream load used for picture block splitting, and further improve compression efficiency. In addition, the decoding method can regularize different split modes for the picture block, and reduce syntax complexity of bitstreams corresponding to the different split modes for the picture block.

According to a second aspect, a decoding method is provided. After obtaining a bitstream, a decoding apparatus parses the bitstream to determine a basic split mode for a current to-be-decoded picture block and a feature parameter (e.g., at least one of a height and a width) of the current to-be-decoded picture block. When the feature parameter of the current to-be-decoded picture block is less than or equal to a first preset threshold, the decoding apparatus re-parses the bitstream to determine a target derivation mode for a subpicture block of the current to-be-decoded picture block. Then, the decoding apparatus splits the current to-be-decoded picture block into N (where N is an integer greater than or equal to 2) subpicture blocks in the basic split mode, and derives a first derived picture block from at least two adjacent subpicture blocks in the N subpicture blocks in a derivation manner indicated by the target derivation mode. Finally, the decoding apparatus decodes the first derived picture block. Herein, the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-decoded picture block, and M is an integer greater than or equal to 0.

The decoding apparatus determines the target derivation mode for the subpicture block of the current to-be-decoded picture block only when the feature parameter of the current to-be-decoded picture block is less than or equal to the first preset threshold. In comparison with the first aspect, in the second aspect, the decoding apparatus has higher decoding efficiency.

Optionally, in a possible implementation of the first aspect or the second aspect, a method in which "a decoding apparatus parses the bitstream to determine a basic split mode for a current to-be-decoded picture block" is: the decoding apparatus obtains a split indicator of the current to-be-decoded picture block from the bitstream, and determines the basic split mode based on the split indicator of the current to-be-decoded picture block. Correspondingly, a method in which "a decoding apparatus determines a target derivation mode for the current to-be-decoded picture block" is: the decoding apparatus obtains a derivation indicator of the current to-be-decoded picture block from the bitstream, and determines the target derivation mode based on the derivation indicator of the current to-be-decoded picture block.

According to a third aspect, a decoding apparatus is provided. The decoding apparatus includes a parsing unit, a split unit, a derivation unit, and a decoding unit.

Specifically, the parsing unit is configured to parse a bitstream to determine a basic split mode for a current to-be-decoded picture block and a target derivation mode for a subpicture block of the current to-be-decoded picture block, where the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-decoded picture block, and M is an integer greater than or equal to 0. The split unit is configured to split the current to-be-decoded picture block into N subpicture blocks in the basic split mode determined by the parsing unit, where N is an integer greater than or equal to 2. The derivation unit is configured to derive, in a derivation manner indicated by the target derivation mode determined by the parsing unit, a first derived picture block from at least two adjacent subpicture blocks in the N subpicture blocks obtained by the split unit. The decoding unit is configured to decode the first derived picture block obtained by the derivation unit.

According to a fourth aspect, a decoding apparatus is provided. The decoding apparatus includes a parsing unit, a judging unit, a split unit, a derivation unit, and a decoding unit.

Specifically, the parsing unit is configured to parse a bitstream to determine a basic split mode for a current to-be-decoded picture block and a feature parameter (e.g., at least one of a width and a height) of the current to-be-decoded picture block. The judging unit is configured to determine whether the feature parameter of the current to-be-decoded picture block is less than or equal to a first preset threshold. The parsing unit is further configured to parse the bitstream to determine a target derivation mode for a subpicture block of the current to-be-decoded picture block, where the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-decoded picture block, and M is an integer greater than or equal to 0. The split unit is configured to split the current to-be-decoded picture block into N subpicture blocks in the basic split mode determined by the parsing unit, where N is an integer greater than or equal to 2. The derivation unit is configured to derive, in a derivation manner indicated by the target derivation mode determined by the parsing unit, a first derived picture block from at least two adjacent subpicture blocks in the N subpicture blocks obtained by the split unit. The decoding unit is configured to decode the first derived picture block obtained by the derivation unit.

Optionally, in a possible implementation of the third aspect or the fourth aspect, the parsing unit is specifically configured to: obtain a split indicator of the current to-be-decoded picture block from the bitstream; determine the basic split mode based on the split indicator of the current to-be-decoded picture block; obtain a derivation indicator of the current to-be-decoded picture block from the bitstream; and determine the target derivation mode based on the derivation indicator of the current to-be-decoded picture block.

According to a fifth aspect, a decoding device is provided. The decoding device includes one or more processors, a memory, and a communications interface. The memory and the communications interface are coupled to the one or more processors. The memory is configured to store computer program code. The computer program code includes an instruction. When the one or more processors execute the instruction, the decoding device performs the decoding method according to any one of the first aspect, the second aspect, or the possible implementation of the first aspect or the second aspect.

According to a sixth aspect, a video decoder is provided, including a non-volatile storage medium and a central processing unit. The non-volatile storage medium stores an executable program. The central processing unit is connected to the non-volatile storage medium, and executes the executable program to implement the decoding method according to any one of the first aspect, the second aspect, or the possible implementation of the first aspect or the second aspect.

According to a seventh aspect, a decoder is provided. The decoder includes the decoding apparatus according to the third aspect or the fourth aspect and a reconstruction module. The reconstruction module is configured to determine a reconstructed sample value of a current picture block based on a predicted sample obtained by the decoding apparatus.

According to an eighth aspect, a computer-readable storage medium is provided. The computer-readable storage medium stores an instruction. When the instruction is run on the decoding apparatus according to the third aspect or the fourth aspect, the decoding apparatus is enabled to perform the decoding method according to any one of the first aspect, the second aspect, or the possible implementation of the first aspect or the second aspect.

According to a ninth aspect, a computer program product including an instruction is provided. When the computer program product runs on the decoding apparatus according to the third aspect or the fourth aspect, the decoding apparatus is enabled to perform the decoding method according to any one of the first aspect, the second aspect, or the possible implementation of the first aspect or the second aspect.

In the present disclosure, a name of the decoding apparatus does not constitute any limitation on devices or functional modules. During actual implementation, these devices or functional modules may have other names. Provided that functions of the devices or the functional modules are similar to those in this application, the devices or the functional modules fall within the scope of the claims in this application and their equivalent technologies.

For specific descriptions of the third aspect to the ninth aspect and implementations of the third aspect to the ninth aspect in this application, refer to the detailed descriptions in the first aspect, the second aspect, and the implementation of the first aspect or the second aspect. In addition, for beneficial effects achieved in the third aspect to the ninth aspect and the implementations of the third aspect to the ninth aspect, refer to beneficial effect analysis in the first aspect, the second aspect, or the implementation of the first aspect or the second aspect. Details are not described herein again.

According to a tenth aspect, an encoding method is provided. First, an encoding apparatus determines a basic split mode for a current to-be-encoded picture block and a target derivation mode for a subpicture block of the current to-be-encoded picture block, where the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-encoded picture block, and M is an integer greater than or equal to 0. Then, the encoding apparatus splits the current to-be-encoded picture block into N (where N is an integer greater than or equal to 2) subpicture blocks in the basic split mode, and derives a first derived picture block from at least two adjacent subpicture blocks in the N subpicture blocks in a derivation manner indicated by the target derivation mode. When the first derived picture block is not split, the encoding apparatus encodes the first derived picture block to obtain a bitstream, where the bitstream includes a split indicator of the current to-be-encoded picture block and a derivation indicator of the current to-be-encoded picture block, the split indicator of the current to-be-encoded picture block is used to indicate the basic split mode, and the derivation indicator of the current to-be-encoded picture block is used to indicate the target derivation mode.

The encoding apparatus identifies a plurality of different split results by combining a split mode and a derivation mode. This can enrich split modes for a picture block, adapt to video pictures with various texture characteristics, improve picture quality of a compressed video picture, more effectively reduce bit overheads of bitstream load used for picture block splitting, and further improve compression efficiency. In addition, this can regularize different split modes for the picture block, and reduce syntax complexity of bitstream corresponding to the different split modes for the picture block.

According to an eleventh aspect, an encoding method is provided. First, an encoding apparatus determines a basic split mode for a current to-be-encoded picture block and a feature parameter (e.g., at least one of a width and a height) of the current to-be-encoded picture block, and determines a target derivation mode for a subpicture block of the current to-be-encoded picture block when the feature parameter of the current to-be-encoded picture block is less than or equal to a first preset threshold, where the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-encoded picture block, and M is an integer greater than or equal to 0. Then, the encoding apparatus splits the current to-be-encoded picture block into N (where N is an integer greater than or equal to 2) subpicture blocks in the basic split mode, and derives a first derived picture block from at least two adjacent subpicture blocks in the N subpicture blocks in a derivation manner indicated by the target derivation mode. When the first derived picture block is not split, the encoding apparatus encodes the first derived picture block to obtain a bitstream, where the bitstream includes a split indicator of the current to-be-encoded picture block and a derivation indicator of the current to-be-encoded picture block, the split indicator of the current to-be-encoded picture block is used to indicate the basic split mode, and the derivation indicator of the current to-be-encoded picture block is used to indicate the target derivation mode.

The encoding apparatus determines the target derivation mode for the subpicture block of the current to-be-encoded picture block only when the feature parameter of the current to-be-encoded picture block is less than or equal to the first preset threshold. In comparison with the tenth aspect, in the eleventh aspect, the encoding apparatus has higher encoding efficiency.

Optionally, in a possible implementation of the tenth aspect or the eleventh aspect, a method in which "an encoding apparatus determines a basic split mode for a current to-be-encoded picture block" is: the encoding apparatus determines at least two candidate split modes corresponding to the current to-be-encoded picture block, and calculates a rate distortion cost for each of the at least two candidate split modes. In this way, the encoding apparatus determines a candidate split mode corresponding to a minimum rate distortion cost as the basic split mode. A method in which "an encoding apparatus determines a target derivation mode for the current to-be-encoded picture block" is: the encoding apparatus calculates a rate distortion cost for each preset derivation mode in the candidate derivation mode set, and determines a preset derivation mode corresponding to a minimum rate distortion cost as the target derivation mode, where the candidate derivation mode set includes the M preset derivation modes. When the basic split mode is horizontal N-way split mode or a vertical N-way split mode, $0 \leq M \leq 2^{N-1}$; or when the basic split mode is a horizontal and vertical N-way split mode, $0 \leq M \leq 2^{2\sqrt{N} \times (\sqrt{N}-1)}$, where M is an integer, and $\sqrt{N}$ is an integer.

According to a twelfth aspect, an encoding apparatus is provided. The encoding apparatus includes a determining unit, a split unit, a derivation unit, a judging unit, and an encoding unit.

Specifically, the determining unit is configured to determine a basic split mode for a current to-be-encoded picture block and a target derivation mode for a subpicture block of the current to-be-encoded picture block, where the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-encoded picture block, and M is an integer greater than or equal to 0. The split unit is configured to split the current to-be-encoded picture block into N subpicture blocks in the basic split mode determined by the determining unit, where N is an integer greater than or equal to 2. The derivation unit is configured to derive, in a derivation manner indicated by the target derivation mode determined by the determining unit, a first derived picture block from at least two adjacent subpicture blocks in the N subpicture blocks obtained by the split unit. The judging unit is configured to determine whether the first derived picture block obtained by the derivation unit is to be split. The encoding unit is configured to: when the judging unit determines that the first derived picture block obtained by the derivation unit is not to be split, encode the first derived picture block to obtain a bitstream, where the bitstream includes a split indicator of the current to-be-encoded picture block and a derivation indicator of the current to-be-encoded picture block, the split indicator of the current to-be-encoded picture block is used to indicate the basic split mode, and the derivation indicator of the current to-be-encoded picture block is used to indicate the target derivation mode.

According to a thirteenth aspect, an encoding apparatus is provided. The encoding apparatus includes a determining unit, a split unit, a derivation unit, a judging unit, and an encoding unit.

Specifically, the determining unit is configured to determine a basic split mode for a current to-be-encoded picture block and a feature parameter (e.g., at least one of a width and a height) of the current to-be-encoded picture block. The split unit is configured to split the current to-be-encoded picture block into N subpicture blocks in the basic split mode determined by the determining unit, where N is an integer greater than or equal to 2. The judging unit is configured to determine whether the feature parameter of the current to-be-encoded picture block is less than or equal to a first preset threshold. The determining unit is further configured to: when the judging unit determines that the feature parameter of the current to-be-encoded picture block is less than or equal to the first preset threshold, determine a target derivation mode for a subpicture block of the current to-be-encoded picture block, where the target derivation mode is one derivation mode in a candidate derivation mode set, the candidate derivation mode set includes M preset derivation modes, the preset derivation mode is used to indicate a derivation manner, the derivation manner is used for deriving one derived picture block from any two adjacent subpicture blocks of the current to-be-encoded picture block, and M is an integer greater than or equal to 0. The derivation unit is configured to derive a first derived picture block from at least two adjacent subpicture blocks in the N subpicture blocks in a derivation manner indicated by the target derivation mode determined by the determining unit. The judging unit is further configured to determine whether the first derived picture block obtained by the derivation unit is to be split. The encoding unit is configured to: when the judging unit determines that the first derived picture block is not to be split, encode the first derived picture block to obtain a bitstream, where the bitstream includes a split indicator of the current to-be-encoded picture block and a derivation indicator of the current to-be-encoded picture block, the split indicator of the current to-be-encoded picture block is used to indicate the basic split mode, and the derivation indicator of the current to-be-encoded picture block is used to indicate the target derivation mode.

Optionally, in a possible implementation of the twelfth aspect or the thirteenth aspect, the determining unit is specifically configured to: determine at least two candidate split modes corresponding to the current to-be-encoded picture block; calculate a rate distortion cost for each of the at least two candidate split modes; and determine a candidate split mode corresponding to a minimum rate distortion cost as the basic split mode.

Optionally, in another possible implementation of the twelfth aspect or the thirteenth aspect, the determining unit is specifically configured to: calculate a rate distortion cost for each preset derivation mode in the candidate derivation mode set, where when the basic split mode is a horizontal N-way split mode or a vertical N-way split mode, $0 \leq M \leq 2^{N-1}$; or when the basic split mode is a horizontal and vertical N-way split mode, $0 \leq M \leq 2^{2\sqrt{N} \times (\sqrt{N}-1)}$, where $\sqrt{N}$ is an integer; and determine a preset derivation mode corresponding to a minimum rate distortion cost as the target derivation mode.

According to a fourteenth aspect, an encoding device is provided. The encoding device includes one or more processors, a memory, and a communications interface. The memory and the communications interface are coupled to the one or more processors. The memory is configured to store computer program code. The computer program code includes an instruction. When the one or more processors execute the instruction, the encoding device performs the encoding method according to any one of the tenth aspect, the eleventh aspect, or the possible implementation of the tenth aspect or the eleventh aspect.

According to a fifteenth aspect, a video encoder is provided, including a non-volatile storage medium and a central processing unit. The non-volatile storage medium stores an executable program. The central processing unit is connected to the non-volatile storage medium, and executes the executable program to implement the encoding method according to any one of the tenth aspect, the eleventh aspect, or the possible implementation of the tenth aspect or the eleventh aspect.

According to a sixteenth aspect, an encoder is provided. The encoder includes the encoding apparatus according to the twelfth aspect or the thirteenth aspect.

According to a seventeenth aspect, a computer-readable storage medium is provided. The computer-readable storage medium stores an instruction. When the instruction is run on the encoding apparatus according to the twelfth aspect or the thirteenth aspect, the encoding apparatus is enabled to perform the encoding method according to any one of the tenth aspect, the eleventh aspect, or the possible implementation of the tenth aspect or the eleventh aspect.

According to an eighteenth aspect, a computer program product including an instruction is provided. When the computer program product runs on the encoding apparatus according to the twelfth aspect or the thirteenth aspect, the encoding apparatus is enabled to perform the encoding method according to any one of the tenth aspect, the eleventh aspect, or the possible implementation of the tenth aspect or the eleventh aspect.

In this application, a name of the encoding apparatus does not constitute any limitation on devices or functional modules. During actual implementation, these devices or functional modules may have other names. Provided that functions of the devices or the functional modules are similar to those in this application, the devices or the functional modules fall within the scope of the claims in this application and their equivalent technologies.

For specific descriptions of the twelfth aspect to the eighteenth aspect and the implementations of the twelfth aspect to the eighteenth aspect in this application, refer to the detailed descriptions in the tenth aspect, the eleventh aspect, or the implementation of the tenth aspect or the eleventh aspect. In addition, for beneficial effects achieved in the twelfth aspect to the eighteenth aspect and the implementations of the twelfth aspect to the eighteenth aspect, refer to beneficial effect analysis in the tenth aspect, the eleventh aspect, or the implementation of the tenth aspect or the eleventh aspect. Details are not described herein again.

Optionally, in any one of the foregoing aspects or the possible implementations of the foregoing aspects, the basic split mode is a horizontal N-way split mode, a vertical N-way split mode, or a horizontal and vertical N-way split mode.

Herein, all of the horizontal N-way split mode, the vertical N-way split mode, and the horizontal and vertical N-way split mode may be used to indicate to evenly split the current to-be-decoded picture block/the current to-be-encoded picture block, or may be used to indicate to unevenly split the current to-be-decoded picture block/the current to-be-encoded picture block.

Optionally, in any one of the foregoing aspects or the possible implementations of the foregoing aspects, when the basic split mode is the horizontal N-way split mode, a width of each of a plurality of subpicture blocks is equal to a width of the current to-be-decoded picture block, and a height of each subpicture block is equal to 1/N of a height of the current to-be-decoded picture block. When the basic split mode is the vertical N-way split mode, a height of each of a plurality of subpicture blocks is equal to a height of the current to-be-decoded picture block, and a width of each subpicture block is equal to 1/N of a width of the current to-be-decoded picture block.

Optionally, in any one of the foregoing aspects or the possible implementations of the foregoing aspects, when the basic split mode is the horizontal and vertical N-way split mode, a width of each of a plurality of subpicture blocks is equal to $1/\sqrt{N}$ of a width of the current to-be-decoded picture block, and a height of each subpicture block is equal to $1/\sqrt{N}$ of a height of the current to-be-decoded picture block, where $\sqrt{N}$ is an integer.

Optionally, in any one of the foregoing aspects or the possible implementations of the foregoing aspects, the target derivation mode is one derivation mode in the candidate derivation mode set, and the candidate derivation mode set includes the M preset derivation modes. When the basic split mode is the horizontal N-way split mode or the vertical N-way split mode, $0 \leq M \leq 2^{N-1}$; or when the basic split mode is the horizontal and vertical N-way split mode, $0 \leq M \leq 2^{2\sqrt{N} \times (\sqrt{N}-1)}$, where M is an integer.

A maximum value of M is related to a quantity of split lines for splitting a picture block. When the basic split mode is the horizontal N-way split mode or the vertical N-way split mode, the quantity of split lines for splitting a picture block is (N−1). Correspondingly, the maximum value of M is $2^{N-1}$. When the basic split mode is the horizontal and vertical N-way split mode, the quantity of split lines for splitting a picture block is $2\sqrt{N} \times (\sqrt{N}-1)$. Correspondingly, the maximum value of M is $2^{2\sqrt{N} \times (\sqrt{N}-1)}$. Certainly, the candidate derivation mode set may alternatively include only some of the preset derivation modes.

Optionally, in any one of the foregoing aspects or the possible implementations of the foregoing aspects, when N=4, M=4, and the basic split mode is a horizontal quad split mode, the candidate derivation mode set includes a first preset derivation mode, a second preset derivation mode, a third preset derivation mode and a fourth preset derivation mode. The first preset derivation mode is to derive one derived picture block from a first subpicture block, a second subpicture block, and a third subpicture block. The second preset derivation mode is to derive one derived picture block from the third subpicture block and a fourth subpicture block. The third preset derivation mode is to derive one derived picture block from the second subpicture block and the third subpicture block. The fourth preset derivation mode is to derive one derived picture block from the first subpicture block and the second subpicture block and derive another derived picture block from the third subpicture block and the fourth subpicture block. The first subpicture block, the second subpicture block, the third subpicture block, and the fourth subpicture block are sequentially arranged in the current to-be-decoded picture block from top to bottom. For the first preset derivation mode, refer to FIG. 12A(D). For the second preset derivation mode, refer to FIG. 12A(C). For the third preset derivation mode, refer to FIG. 12A(B). For the fourth preset derivation mode, refer to FIG. 12B(F).

When N=4, M=4, and the basic split mode is a vertical quad split mode, the candidate derivation mode set includes a fifth preset derivation mode, a sixth preset derivation mode, a seventh preset derivation mode, and an eighth preset derivation mode. The fifth preset derivation mode is to derive one derived picture block from a fifth subpicture block, a sixth subpicture block, and a seventh subpicture block. The sixth preset derivation mode is to derive one derived picture block from the sixth subpicture block, the seventh subpicture block, and an eighth picture block. The seventh preset derivation mode is to derive one derived picture block from the sixth subpicture block and the seventh subpicture block. The eighth preset derivation mode is to keep the fifth subpicture block, the sixth subpicture block, the seventh subpicture block, and the eighth subpicture block independent of each other. The fifth subpicture block, the sixth subpicture block, the seventh subpicture block, and the eighth subpicture block are sequentially arranged in the current to-be-decoded picture block from left to right. For the fifth preset derivation mode, refer to FIG. 13A(D'). For the sixth preset derivation mode, refer to FIG. 13B(E'). For the seventh preset derivation mode, refer to FIG. 13A(B'). For the eighth preset derivation mode, refer to FIG. 13B(G').

When N=4, M=4, and the basic split mode is a horizontal and vertical quad split mode, the candidate derivation mode set includes a ninth preset derivation mode, a tenth preset derivation mode, an eleventh preset derivation mode, and a twelfth preset derivation mode. The ninth preset derivation mode is to derive one derived picture block from a ninth subpicture block and a tenth subpicture block. The tenth preset derivation mode is to derive one derived picture block from the ninth subpicture block and the tenth subpicture block and derive another derived picture block from an eleventh subpicture block and a twelfth subpicture block. The eleventh preset derivation mode is to derive one derived picture block from the tenth subpicture block and the eleventh subpicture block and derive another derived picture block from the ninth subpicture block and the twelfth picture block. The twelfth preset derivation mode is to derive one derived picture block from the ninth subpicture block and the twelfth subpicture block. The ninth subpicture block, the tenth subpicture block, the eleventh subpicture block, and the twelfth subpicture block are sequentially arranged clockwise in the current to-be-decoded picture block. For the ninth preset derivation mode, refer to FIG. 14A(A)". For the tenth preset derivation mode, refer to FIG. 14B(E)". For the eleventh preset derivation mode, refer to FIG. 14B(F)". For the twelfth preset derivation mode, refer to FIG. 14A(B)".

Optionally, in any one of the foregoing aspects or the possible implementations of the foregoing aspects, the candidate derivation mode set includes a preset quantity (for example, four) of preset derivation modes, and each preset derivation mode in the candidate derivation mode set is indicated by using a fixed length code. In comparison with the prior art, the encoding method and the decoding method provided in this application can identify a split mode for a picture block by using a simple indicator. This effectively improves coding efficiency.

Optionally, in any one of the foregoing aspects or the possible implementations of the foregoing aspects, the split indicator of the current to-be-decoded picture block or the split indicator of the current to-be-encoded picture block is indicated by using a variable length code, and the derivation indicator of the current to-be-decoded picture block or the derivation indicator of the current to-be-encoded picture block is indicated by using a fixed length code.

These aspects or other aspects in this application are more concise and comprehensible in the following descriptions.

BRIEF DESCRIPTION OF DRAWINGS

FIG. 13A and FIG. 13B are a schematic diagram of structures corresponding to derivation modes according to an embodiment of this application;

DESCRIPTION OF EMBODIMENTS

Figure 1:
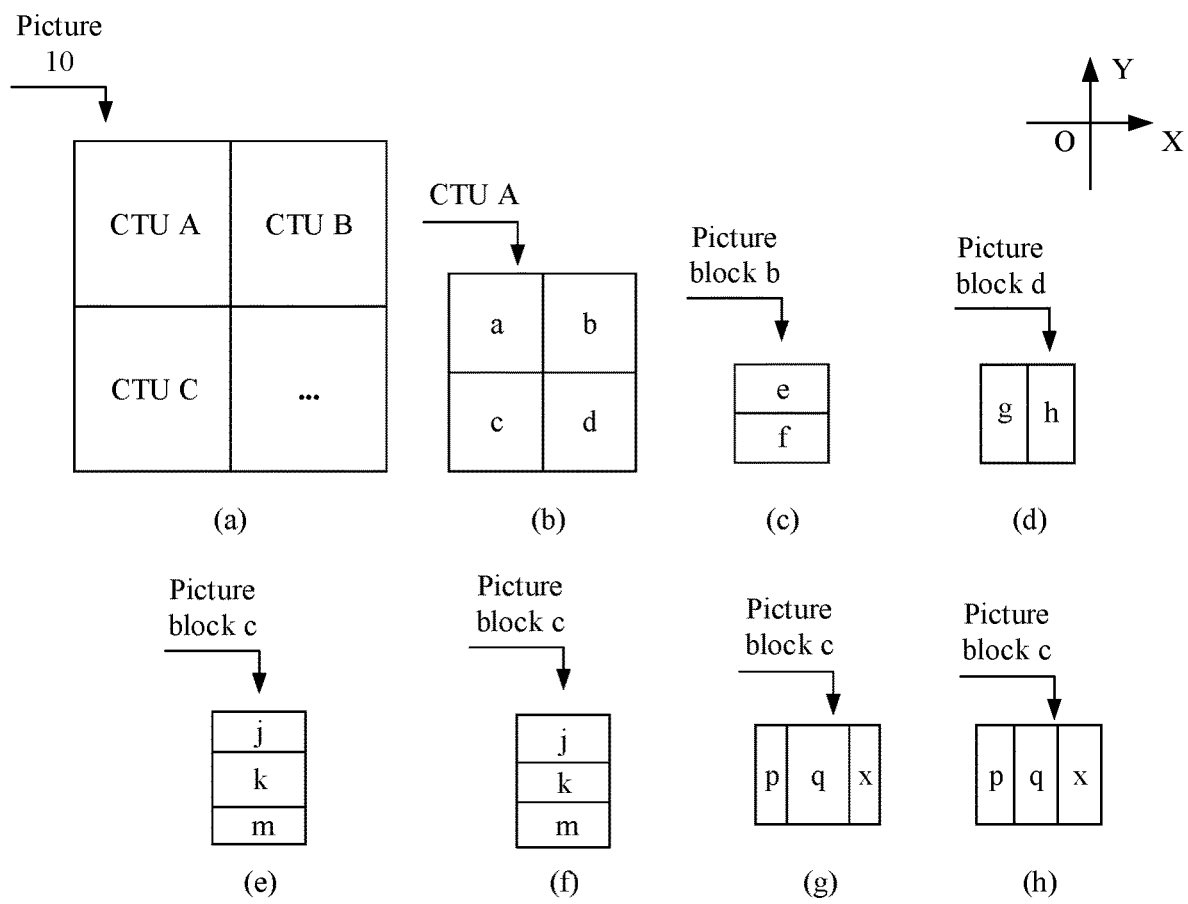
FIG. 1 is a schematic diagram of structures corresponding to different split modes according to an embodiment of this application.

In the specification, claims, and accompanying drawings of this application, the terms "first", "second", "third", "fourth", and the like are intended to distinguish between different objects but do not indicate a particular order.

In the embodiments of this application, the word "example", "for example", or the like is used to represent giving an example, an illustration, or a description. Any embodiment or design scheme described as "an example" or "for example" in the embodiments of this application should not be explained as being more preferred or having more advantages than another embodiment or design scheme. Exactly, use of the word "example", "for example", or the like is intended to present a relative concept in a specific manner.

A complete picture in a video is usually referred to as a "frame", and a video that includes many frames in a time order is also referred to as a video sequence. A video sequence includes a series of redundancy information such as spatial redundancy, temporal redundancy, visual redundancy, information entropy redundancy, structure redundancy, knowledge redundancy, and importance redundancy. To remove redundancy information from the video sequence as much as possible and reduce an amount of data that is used to represent a video, a video coding technology is proposed, to reduce storage space and reduce occupied transmission bandwidth. The video coding technology is also referred to as a video compression technology.

In terms of a current technology development status, the video coding technology mainly includes intra prediction, inter prediction, transform and quantization, entropy coding, deblocking filtering processing, and the like.

Within an international universal scope, video compression coding standards, such as MPEG-2 and MPEG-4 Part 10: advanced video coding (AVC) formulated by the moving picture experts group (MPEG), and H.263, H.264, and H.265: high-efficiency video coding (HEVC) standards that are formulated by the international telecommunication union-telecommunication standardization sector (ITU-T), mainly include four mainstream compression coding schemes: chroma sampling, prediction coding, transform coding, and quantization coding.

Chroma sampling: In this scheme, visual and psychological features of human eyes are fully used, and an amount of data used for describing a single element is tried to be minimized starting from representation of underlying data.

Prediction coding: In this scheme, data information of a previously encoded frame is used to predict a frame that is to be encoded currently. An encoder side obtains a prediction value through prediction. There is a residual value between the prediction value and an actual value. If prediction is more appropriate, the prediction value is closer to the actual value, and the residual value is smaller. This can greatly reduce an amount of data used when the encoder side encodes the residual value. When performing decoding, a decoder side adds the residual value and the prediction value, to restore and reconstruct an initial picture. In mainstream coding standards, the prediction coding is classified into two basic types: intra prediction and inter prediction.

Transform coding: In this scheme, original spatial domain information is not directly encoded, but a sampling value of the information is transformed from a current domain to another manually defined domain (which is usually referred to as a transform domain) according to a transform function form, and then compression coding is performed based on distribution characteristics of the information in the transform domain.

Quantization coding: In this scheme, an input value with a relatively large dynamic range is forcibly adjusted, to output a value with a relatively small dynamic range.

In a coding algorithm based on a hybrid coding architecture, the foregoing compression coding schemes are combined for use, and a picture block is used as a basic processing unit in these compression coding schemes. The picture block is obtained by an encoder side by splitting a frame of picture/a picture.

For picture split, to more flexibly represent video content, the HEVC defines a CTU, a coding unit (CU), a prediction unit (PU), and a transform unit (TU). The CTU, the CU, the PU, and the TU are all picture blocks.

CTU: One picture includes a plurality of CTUs. One CTU usually corresponds to one square picture region. As shown in FIG. 1(a), a picture 10 includes a plurality of CTUs (including a CTU A, a CTU B, a CTU C, and the like).

Encoded information corresponding to a CTU includes a luma value and/or a chroma value of a sample in a square picture region corresponding to the CTU. In addition, the encoded information corresponding to the CTU may further include syntax elements. These syntax elements indicate a method for splitting the CTU into at least one CU, and indicate a method for decoding each CU to obtain a reconstructed picture.

A picture region corresponding to one CTU may include 64×64 samples, 128×128 samples, or 256×256 samples. In an example, a CTU with 64×64 samples includes a rectangular sample matrix including 64 columns with 64 samples per column, and each sample includes a luma component and/or a chroma component.

It may be understood that a CTU may alternatively correspond to a rectangular picture region or a picture region in another shape, and a picture region corresponding to one CTU may alternatively be a picture region in which a quantity of samples in a horizontal direction is different from a quantity of samples in a vertical direction, for example, a picture region including 64×128 samples.

CU: A CU usually corresponds to an A×B rectangular region, where A represents a width of the rectangle, and B represents a height of the rectangle. In the embodiments of this application, a width is a length along an X axis (a horizontal direction) in a two-dimensional rectangular coordinate system XoY shown in FIG. 1, and a height is a length along a Y axis (a vertical direction) in the two-dimensional rectangular coordinate system XoY shown in FIG. 1. Herein, values of A and B may be the same or may be different. The values of A and B each are usually an integer power of 2, for example, 256, 128, 64, 32, 16, 8, or 4.

PU: A PU is a basic unit used for intra prediction and inter prediction.

Figure 2:
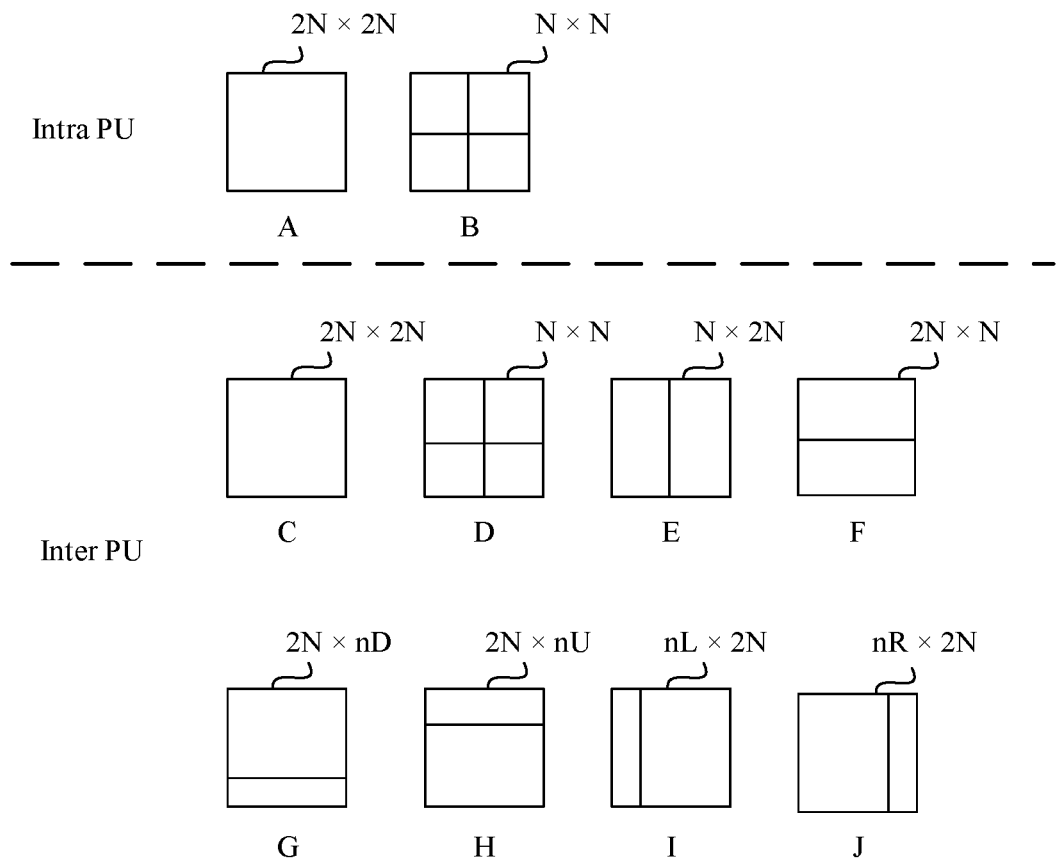
FIG. 2 is a schematic diagram of structures of prediction units that are split in different split modes according to an embodiment of this application.

An intra prediction unit is split in a 2N×2N split mode (as shown in FIG. 2(A)) or an N×N split mode (as shown in FIG. 2(B)). An inter prediction unit is split in a 2N×2N split mode (as shown in FIG. 2(C)), an N×N split mode (as shown in FIG. 2(D)), an N×2N split mode (as shown in FIG. 2(E)), a 2N×N split mode (as shown in FIG. 2(F)), a 2N×nD split mode (as shown in FIG. 2(G)), a 2N×nU split mode (as shown in FIG. 2(H)), an nL×2N split mode (as shown in FIG. 2(I)), or an nR×2N split mode (as shown in FIG. 2(J)), where N is any positive integer, n=x×N, and 0≤x≤1.

The 2N×2N split mode means that a picture block is not split. The N×N split mode means that a picture block is split into four subpicture blocks with a same size. The N×2N split mode means that a picture block is vertically split into two subpicture blocks from left to right with a same size. The 2N×N split mode means that a picture block is horizontally split into two subpicture blocks from top to bottom with a same size. The 2N×nD split mode means that a picture block is horizontally split into two subpicture blocks from top to bottom, and a picture split line moves downward by n relative to a horizontal bisector of the picture block, where D represents that the picture split line moves downward relative to the horizontal bisector of the picture block. The 2N×nU split mode means that a picture block is horizontally split into two subpicture blocks from top to bottom, and a picture split line moves upward by n relative to a vertical bisector of the picture block, where U represents that the picture split line moves upward relative to the vertical bisector of the picture block. The nL×2N split mode means that a picture block is vertically split into two subpicture blocks from left to right, and a picture split line moves leftward by n relative to a vertical bisector of the picture block, where L represents that the picture split line moves leftward relative to the vertical bisector of the picture block. The nR×2N split mode means that a picture block is vertically split into two subpicture blocks from left to right, and a picture split line moves rightward by n relative to a vertical bisector of the picture block, where R represents that the picture split line moves rightward relative to the vertical bisector of the picture block.

TU: A TU is used to process a residual between an original picture block and a predicted picture block.

Generally, split modes used for splitting a picture block include a quad-tree (QT) split mode, a binary tree (BT) split mode, and a TT split mode.

QT split mode: A picture block is split into four subpicture blocks in this mode. Optionally, a subpicture block may be further split or not split.

In an example, an encoder side splits a CTU into four subpicture blocks in the QT split mode, and the encoder side may no longer split each subpicture block (in this case, each subpicture block is a CU), or may split each subpicture block into four lower-layer subpicture blocks. As shown in FIG. 1(b), the encoder side splits a CTU A into four subpicture blocks a, b, c, and d.

BT split mode: A picture block is split into two subpicture blocks in this mode. Optionally, a subpicture block may be further split or not split. The BT split mode may include the following:

(1) Horizontal binary split mode:

In this mode, a picture block is horizontally split into two subpicture blocks with a same size from top to bottom. As shown in FIG. 1(c), a picture block b is split in the horizontal binary split mode, to generate a subpicture block e and a subpicture block f with a same size.

(2) Vertical binary split mode (or referred to as a perpendicular binary split mode):

In this mode, a picture block is vertically split into two subpicture blocks with a same size from left to right. As shown in FIG. 1(d), a picture block d is split in the vertical binary split mode, to generate a subpicture block g and a subpicture block h with a same size.

TT split mode: A picture block is split into three subpicture blocks in this mode. Optionally, a subpicture block may be further split or not split. The TT split mode may include the following.

(1) Horizontal ternary split mode:

In this mode, a picture block is horizontally split into three subpicture blocks from top to bottom.

In an example, heights of the three subpicture blocks from top to bottom are ¼, ½, and ¼ of a height of the picture block. As shown in FIG. 1(e), a picture block c is split in the horizontal ternary split mode, to generate a subpicture block j, a subpicture block k, and a subpicture block m. A height of the subpicture block j is ¼ of a height of the picture block c, a height of the subpicture block k is ½ of the height of the picture block c, and a height of the subpicture block m is ¼ of the height of the picture block c.

In another example, heights of the three subpicture blocks from top to bottom each are ⅓ of a height of the picture block. To be specific, the picture block is evenly split into the three subpicture blocks in a direction of an Y axis in a two-dimensional rectangular coordinate system XoY shown in FIG. 1. As shown in FIG. 1(f), a picture block c is split in the horizontal ternary split mode, to generate a subpicture block j, a subpicture block k, and a subpicture block m. A height of the subpicture block j, a height of the subpicture block k, and a height of the subpicture block m each are ⅓ of a height of the picture block c.

(2) Vertical ternary split mode (or referred to as a perpendicular ternary split mode):

In this mode, a picture block is split into three subpicture blocks from left to right.

In an example, widths of the three subpicture blocks from left to right are ¼, ½, and ¼ of a width of the picture block. As shown in FIG. 1(g), a picture block c is split in the vertical ternary split mode, to generate a subpicture block p, a subpicture block q, and a subpicture block x. A width of the subpicture block p is ¼ of a width of the picture block c, a width of the subpicture block q is ½ of the width of the picture block c, and a width of the subpicture block x is ¼ of the width of the picture block c.

In another example, widths of the three subpicture blocks from left to right each are ⅓ of a widths of the picture block. To be specific, the picture block is evenly split into the three subpicture blocks in a direction of an X axis in a two-dimensional rectangular coordinate system XoY shown in FIG. 1. As shown in FIG. 1(h), a picture block c is split in the vertical ternary split mode, to generate a subpicture block p, a subpicture block q, a subpicture block x. A width of the subpicture block p, a width of the subpicture block q, and a width of the subpicture block x each are ⅓ of a width of the picture block c.

It can be learned from the foregoing descriptions that after a picture block is split, the encoder side further needs to determine whether to continue to split a subpicture block. Whether a picture block is to be split is indicated in a bitstream by using a split flag (e.g., split_cu_flag) corresponding to the picture block. Layers of the picture block with a QT split structure (QT layer for short) indirectly indicates a quantity of QT split times.

Figure 3:
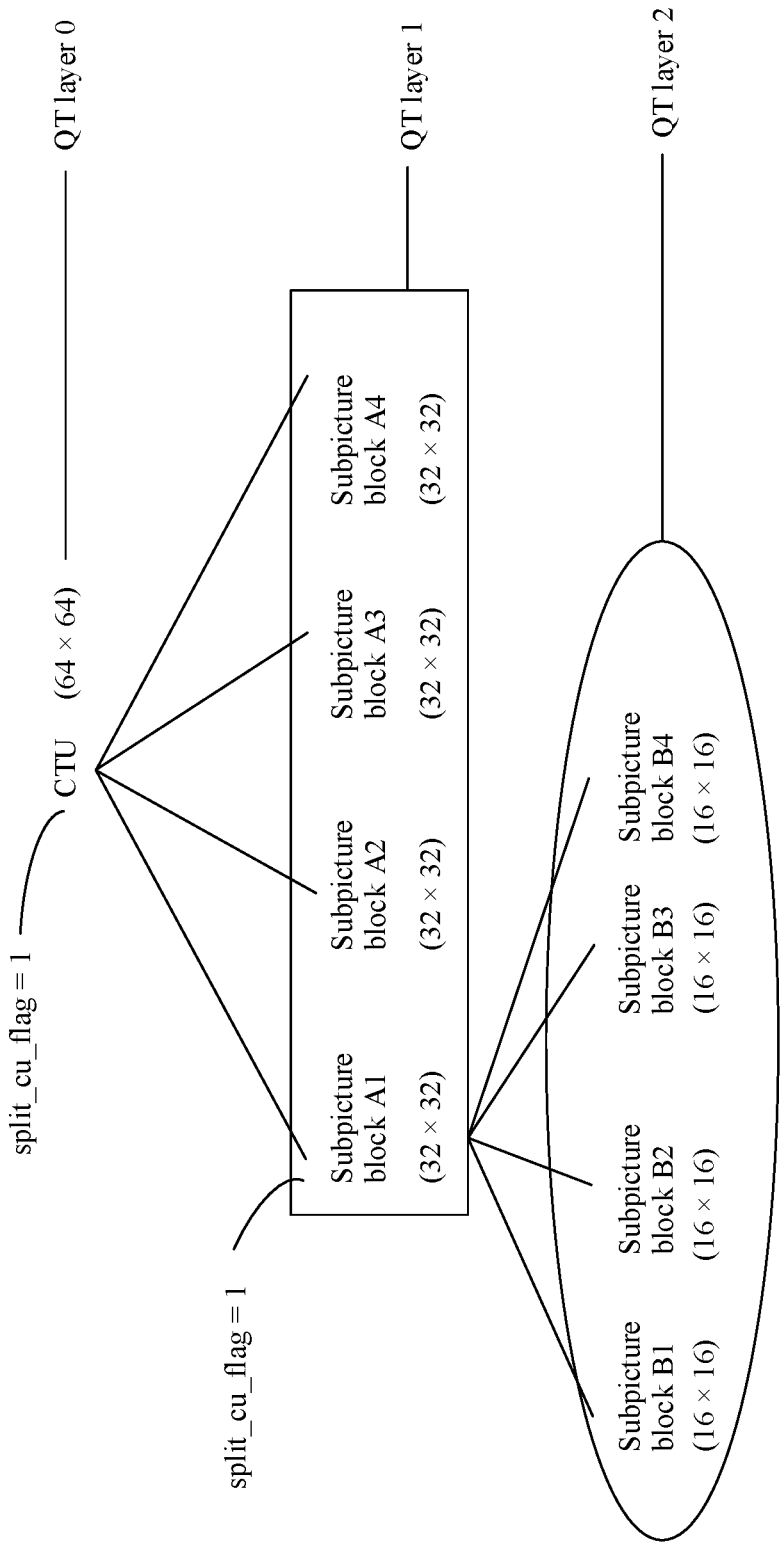
FIG. 3 is a schematic diagram of a split indicator corresponding to a QT split mode according to an embodiment of this application.

For example, a split flag corresponding to a picture block is indicated by using split_cu_flag, where split_cu_flag=0 indicates that the node is no longer split, and split_cu_flag=1 indicates that the node continues to be split. As shown in FIG. 3, when a value of split_cu_flag corresponding to a picture block represented by a 64×64 CTU is 1, the CTU is split into four 32×32 subpicture blocks. The four 32×32 subpicture blocks are a subpicture block A1, a subpicture block A2, a subpicture block A3, and a subpicture block A4. Each of the four 32×32 subpicture blocks may continue to be split or may not be split based on split_cu_flag corresponding to the subpicture block. If a value of split_cu_flag corresponding to the subpicture block A1 is 1, the subpicture block A1 continues to be split into four 16×16 nodes. The four 16×16 subpicture blocks are a subpicture block B1, a subpicture block B2, a subpicture block B3, and a subpicture block B4. The rest may be deduced by analogy, until all the subpicture blocks are no longer split. In FIG. 3, the CTU is at a QT layer 0, the subpicture block A1, the subpicture block A2, the subpicture block A3, and the subpicture block A4 are all at a QT layer 1, and the subpicture block B1, the subpicture block B2, the subpicture block B3, and the subpicture block B4 are all at a QT layer 2.

Currently, the joint video exploration team (JVET) proposes a QTBT split mode that concatenates a QT split mode and a BT split mode. Specifically, the CTU is split into four subpicture blocks in the QT split mode, and then a subpicture block that needs to be further split is split in a QT split mode/BT split mode.

As shown in FIG. 4(a), each node represents one picture block, a node is a child node of an upper-layer node, and correspondingly, a picture block represented by the node is a subpicture block of a picture block represented by the upper-layer node. In FIG. 4(a), a solid line indicates that a QT split mode is used for splitting, a dashed line indicates that a BT split mode is used for splitting, and each node from A to M corresponds to one CU. In a BT structure, 10 indicates a vertical binary split mode, and 11 indicates a horizontal binary split mode. FIG. 4(b) shows a CTU that is split in the split modes shown in FIG. 4(a).

Figure 4:
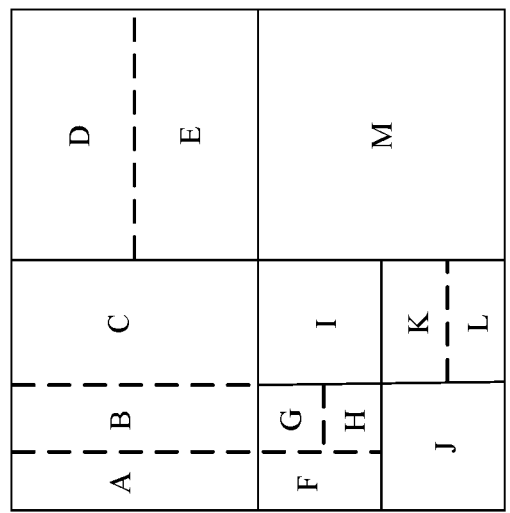
FIG. 4 is a schematic diagram of splitting a picture block in a QTBT split mode according to an embodiment of this application.
Figure 4:
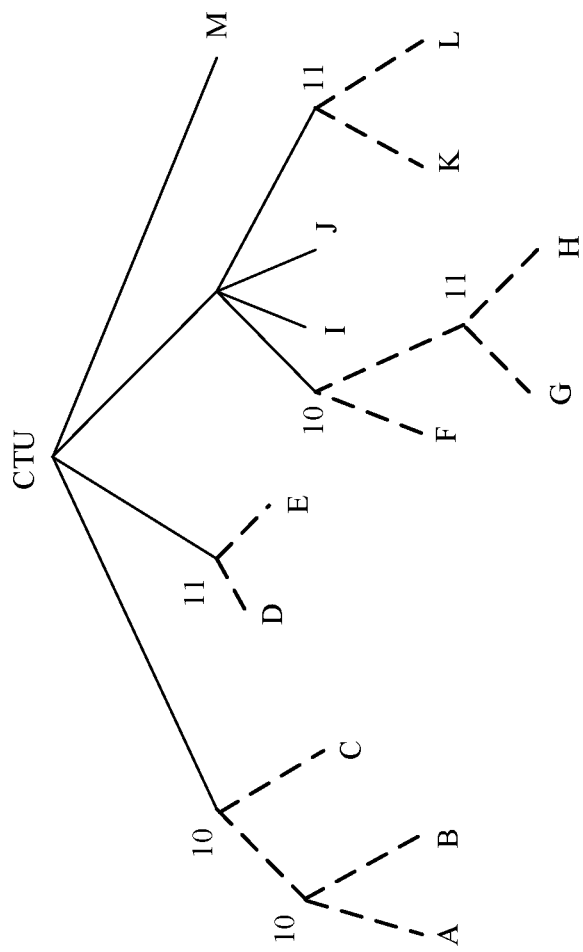

It can be learned, with reference to FIG. 4, that after a picture block is split in the QTBT split mode, only centrosymmetric subpicture blocks can be obtained, and the QTBT split mode cannot satisfy a requirement of non-centrosymmetric splitting. In addition, the QTBT split mode can cover only a small quantity of modes. For a picture region with relatively complex textures or relatively fine textures, the encoder side needs to perform BT splitting or QT splitting at a deeper layer.

To resolve this problem, a QT-ABT/TT split mode has been subsequently proposed in the QTBT split mode. To be specific, a CTU is split into four subpicture blocks in a QT split mode, and then a subpicture block that needs to be further split is split in a QT split mode/ABT split mode/TT split mode.

Figure 5:
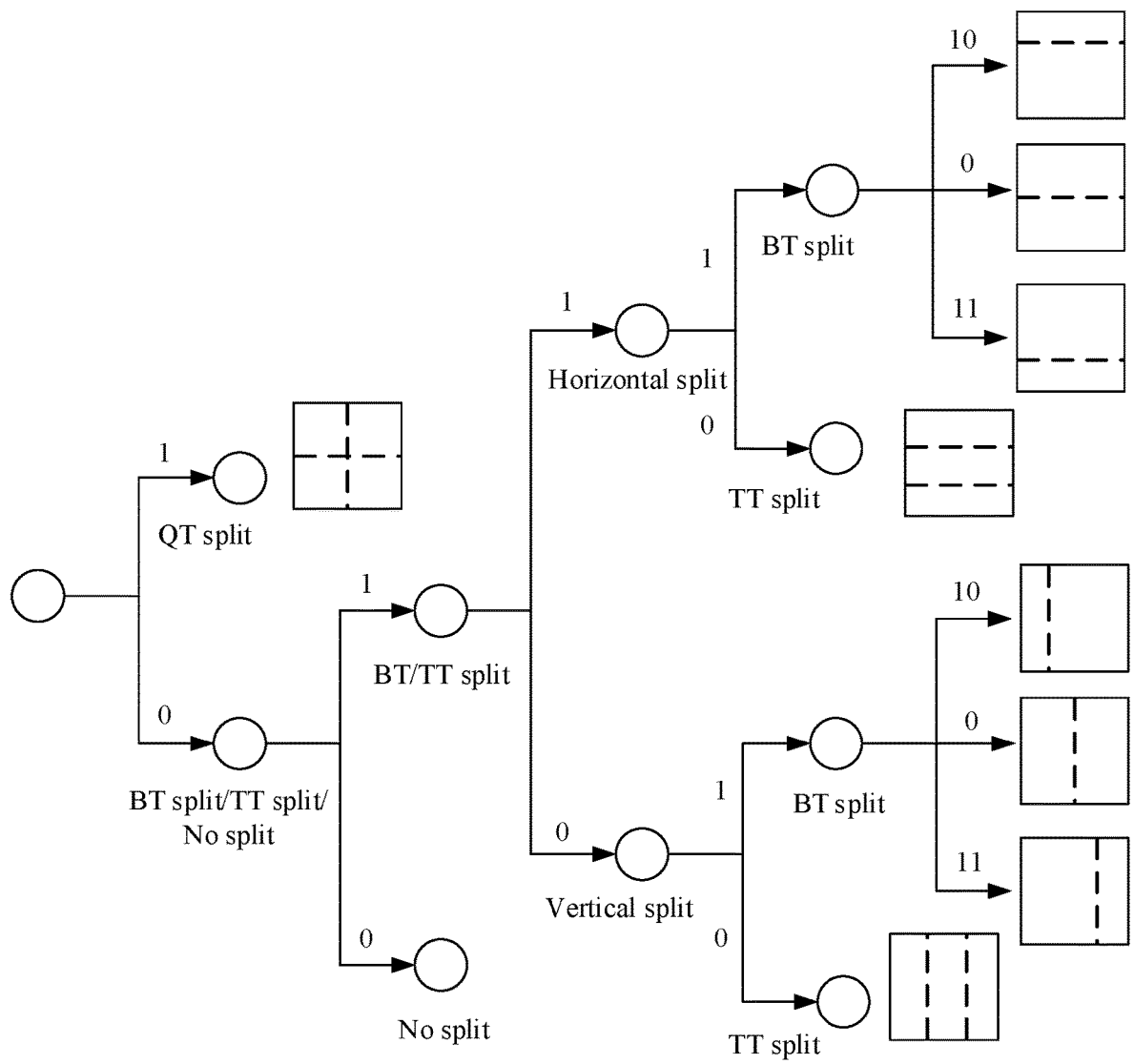
FIG. 5 is a schematic diagram of a method for identification by using a flag corresponding to a QT-ABT/TT split mode according to an embodiment of this application.
Figure 6:
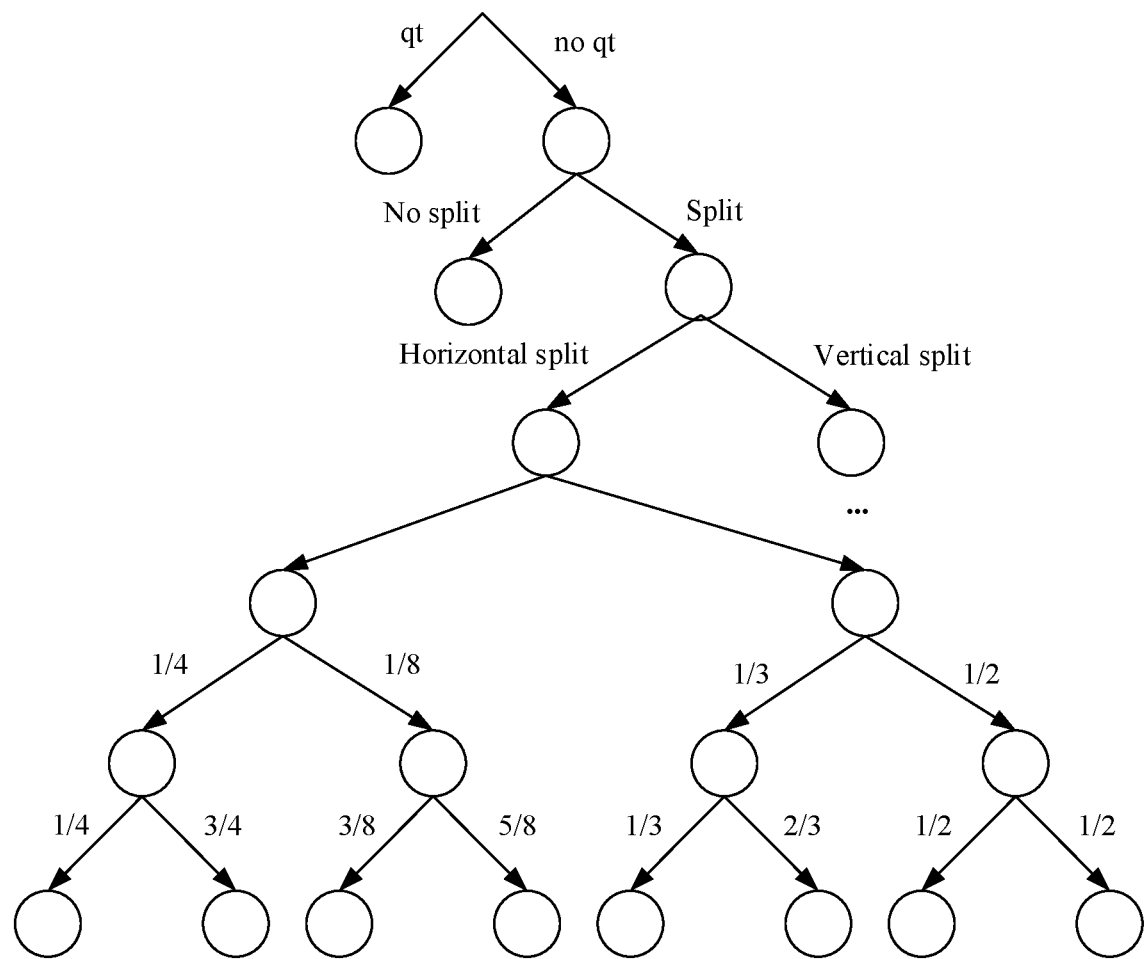
FIG. 6 is a schematic diagram of a method for identification by using a flag corresponding to a QT-ABT/TT split mode according to an embodiment of this application.

In the QT-ABT/TT split mode, the encoder side may write a specific split mode into a bitstream according to a method for identification by using a flag shown in FIG. 5 or FIG. 6.

Each branch in FIG. 5 indicates a split mode to be used at a corresponding layer. At a first layer, 1 indicates a QT split mode, and 0 indicates a BT split mode/TT split mode/no split. At a second layer, 1 indicates a BT split mode/TT split mode, and 0 indicates no split. At a third layer, 1 indicates a horizontal split mode, and 0 indicates a vertical split mode. On a branch with an indicator 1 at the third layer, 1 indicates a BT split mode (that is, a horizontal binary split mode), and 0 indicates a TT split mode (that is, a horizontal ternary split mode). On a branch with an indicator 0 at the third layer, 0 indicates a TT split mode (that is, a vertical ternary split mode), and 1 indicates a BT split mode (that is, a vertical binary split mode). Further, on a branch at the third layer, three indicators 0, 10, and 11 are used to indicate whether a BT split mode is a symmetric split mode.

In FIG. 6, qt indicates that a QT split mode is used, and no qt indicates that a QT split mode is not used. Correspondingly, no qt means that no splitting may be performed or a BT split mode may be further used. If the BT split mode is further used, whether a horizontal (parallel) split mode or a vertical (perpendicular) split mode is used needs to be identified in a bitstream. If the horizontal split mode is used, whether a ¼ split mode, a ⅛ split mode, a ⅓ split mode, or a ½ split mode is to be used is further identified, and the rest may be deduced by analogy.

The foregoing method for identification enables a decoder side to correctly obtain, through decoding, a specific shape of a picture block. However, a QTBT is used as a basic framework of the foregoing split modes. Although a horizontal or vertical TT split mode or a horizontal or vertical ABT split mode is added based on the QTBT, the foregoing split modes still have limitations, and cannot satisfy a relatively complex texture requirement.

In addition, when the foregoing plurality of split modes are combined, a method for identifying a split mode for a picture block is complex. This affects coding efficiency to some extent.

In view of this, this application provides a decoding method. The decoding method provided in this application may be implemented in two manners.

In a first feasible implementation, a decoding apparatus parses a bitstream to determine a basic split mode for a current to-be-decoded picture block and a target derivation mode for a subpicture block of the current to-be-decoded picture block, splits the current to-be-decoded picture block into N (where N is an integer greater than or equal to 2) subpicture blocks in the basic split mode, and derives a first derived picture block from at least two adjacent subpicture blocks in the N subpicture blocks in a derivation manner indicated by the target derivation mode. In this way, the decoding apparatus can decode the first derived picture block. Herein, the target derivation mode is one derivation mode in a candidate derivation mode set, the candidate derivation mode set includes M (where M is an integer greater than or equal to 0) preset derivation modes, each preset derivation mode is used to uniquely indicate one derivation manner, and the derivation manner is used for deriving one derived picture block from at least two adjacent subpicture blocks in the N subpicture blocks. It is easily understood that a plurality of different split results can be identified by combining a split mode and a derivation mode. In comparison with the prior art, the decoding method can enrich split modes for a picture block, and adapt to video pictures with various texture characteristics.

In a second feasible implementation, a decoding apparatus parses a bitstream to determine a basic split mode for a current to-be-decoded picture block and a feature parameter (e.g., at least one of a height and a width) of the current to-be-decoded picture block; and when the feature parameter of the current to-be-decoded picture block is less than or equal to a first preset threshold, the decoding apparatus parses the bitstream to determine a target derivation mode for a subpicture block of the current to-be-decoded picture block. Then, the decoding apparatus may split the current to-be-decoded picture block into N subpicture blocks in the basic split mode, and derive a first derived picture block from at least two adjacent subpicture blocks in the N subpicture blocks in the target derivation mode. In this way, the decoding apparatus can decode the first derived picture block. The decoding apparatus determines the target derivation mode for the subpicture block of the current to-be-decoded picture block only when the feature parameter of the current to-be-decoded picture block is less than or equal to the first preset threshold. In comparison with the first feasible implementation, in this implementation, the decoding apparatus has higher decoding efficiency.

Figure 9:
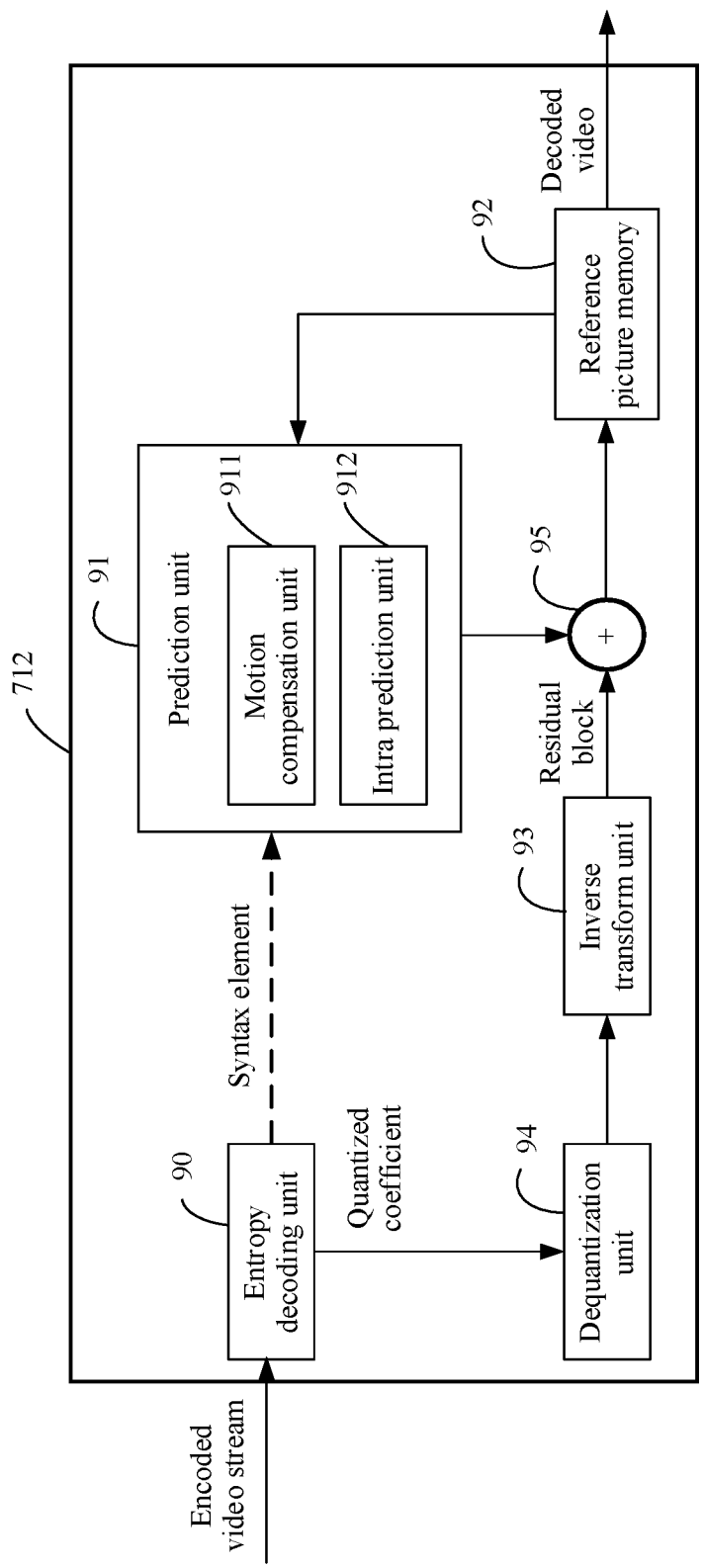
FIG. 9 is a schematic structural diagram of a video decoder according to an embodiment of this application.

The decoding apparatus may be a video decoder (as shown in FIG. 9), or may be a device that has a function of implementing the first feasible implementation or the second feasible implementation.

Correspondingly, this application further provides an encoding method. The encoding method may be implemented in two manners.

In an implementation A, after determining a basic split mode for a current to-be-encoded picture block and a target derivation mode for a subpicture block of the current to-be-encoded picture block, an encoding apparatus splits the current to-be-encoded picture block into N subpicture blocks in the basic split mode, and derives a first derived picture block from at least two adjacent subpicture blocks in the N subpicture blocks in a derivation manner indicated by the target derivation mode. Further, when the first derived picture block is not split, the encoding apparatus encodes the first derived picture block to obtain a bitstream that includes a split indicator of the current to-be-encoded picture block and a derivation indicator of the current to-be-encoded picture block, and sends the bitstream to a decoding apparatus. Herein, the target derivation mode is one derivation mode in a candidate derivation mode set, the candidate derivation mode set includes M (where M is an integer greater than or equal to 0) preset derivation modes, each preset derivation mode is used to uniquely indicate one derivation manner, and the derivation manner is used for deriving one derived picture block from at least two adjacent subpicture blocks in the N subpicture blocks. The split indicator of the current to-be-encoded picture block is used to indicate the basic split mode, and the derivation indicator of the current to-be-encoded picture block is used to indicate the target derivation mode. On the basis of the basic split mode, the encoding apparatus in this application derives the first derived picture block from the at least two adjacent subpicture blocks in the N subpicture blocks in the target derivation mode. In this way, the current to-be-encoded picture block is split. In other words, the the encoding apparatus in this application identifies a plurality of different split results by combining a split mode and a derivation mode. This can enrich split modes for a picture block, and adapt to video pictures with various texture characteristics.

In an implementation B, after determining a basic split mode for a current to-be-encoded picture block and a feature parameter of the current to-be-encoded picture block, an encoding apparatus splits the current to-be-encoded picture block into N subpicture blocks in the basic split mode; and when the feature parameter of the current to-be-encoded picture block is less than or equal to a first preset threshold, parses a bitstream to determine a target derivation mode for a subpicture block of the current to-be-encoded picture block. Then, the encoding apparatus derives a first derived picture block from at least two adjacent subpicture blocks in the N subpicture blocks in a derivation manner indicated by the target derivation mode. Further, when the first derived picture block is not split, the encoding apparatus encodes the first derived picture block to obtain a bitstream that includes a split indicator of the current to-be-encoded picture block and a derivation indicator of the current to-be-encoded picture block, and sends the bitstream to a decoding apparatus. The encoding apparatus determines the target derivation mode only when the feature parameter of the current to-be-encoded picture block is less than or equal to the first preset threshold. In comparison with the implementation A, the implementation B effectively improves encoding efficiency. In addition, the bitstream occupies relatively few transmission resources. In actual application, in comparison with the implementation A, the implementation B is easier to implement.

Figure 8:
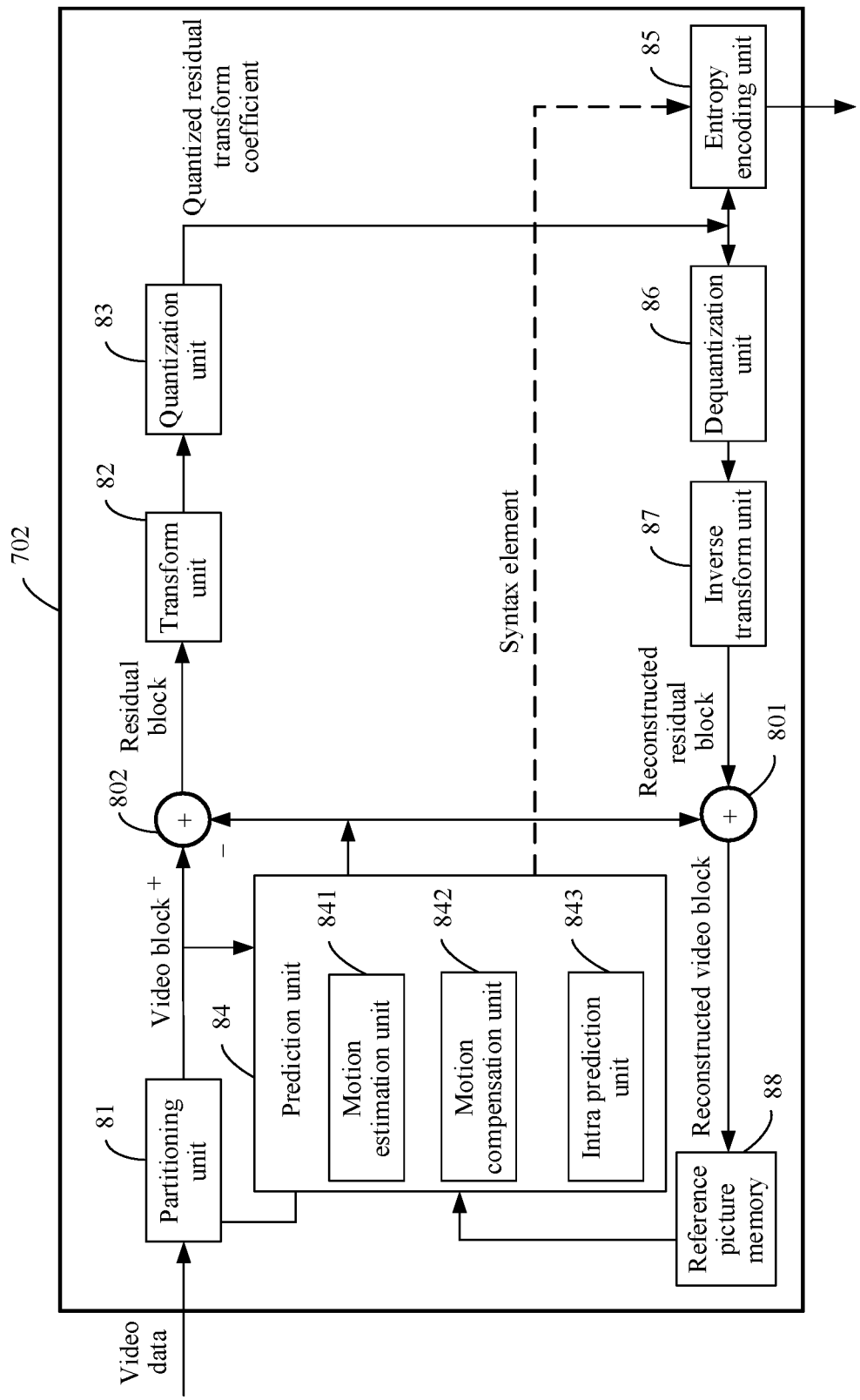
FIG. 8 is a schematic structural diagram of a video encoder according to an embodiment of this application.

The encoding apparatus may be a video encoder (as shown in FIG. 8), or may be a device that has a function of implementing the implementation A or the implementation B.

Figure 7:
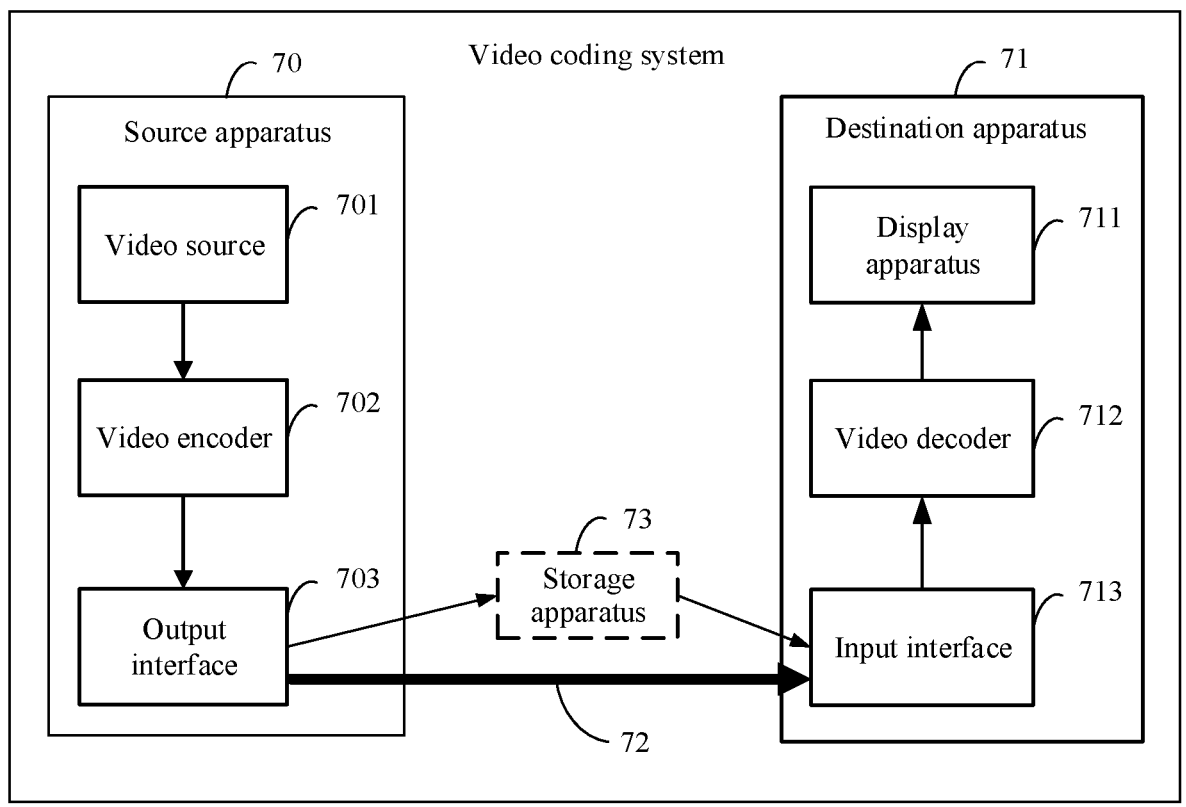
FIG. 7 is a schematic structural diagram of a video coding system according to an embodiment of this application.

The encoding method and the decoding method provided in this application are applicable to a video coding system. FIG. 7 shows a structure of a video coding system.

As shown in FIG. 7, the video coding system includes a source apparatus 70 and a destination apparatus 71. The source apparatus 70 generates encoded video data, and the source apparatus 70 may also be referred to as a video encoding apparatus or a video encoding device. The destination apparatus 71 may decode the encoded video data generated by the source apparatus 70, and the destination apparatus 71 may also be referred to as a video decoding apparatus or a video decoding device. The source apparatus 70 and/or the destination apparatus 71 may include at least one processor and a memory coupled to the at least one processor. The memory may include but is not limited to a read-only memory (ROM), a random access memory (RAM), an electrically erasable programmable read-only memory (EEPROM), a flash memory, or any other medium that may be configured to store required program code in a form of an instruction or a data structure that can be accessed by a computer. This is not specifically limited in this application.

The source apparatus 70 and the destination apparatus 71 each may include an apparatus in various forms, including a desktop computer, a mobile computing apparatus, a notebook (e.g., laptop) computer, a tablet computer, a set top box, a handheld telephone such as a "smart" phone, a television set, a camera, a display apparatus, a digital media player, a video game console, an in-vehicle computer, or the like.

The destination apparatus 71 may receive the encoded video data from the source apparatus 70 through a link 72. The link 72 may include one or more media and/or apparatuses that can transfer the encoded video data from the source apparatus 70 to the destination apparatus 71. In an example, the link 72 may include one or more communications media that enable the source apparatus 70 to directly transmit the encoded video data to the destination apparatus 71 in real time. In this example, the source apparatus 70 may modulate the encoded video data according to a communications standard (e.g., a wireless communications protocol), and may transmit modulated video data to the destination apparatus 71. The one or more communications media may include a wireless and/or wired communications medium, for example, a radio frequency (RF) spectrum or one or more physical transmission lines. The one or more communications media may constitute a part of a packet-based network (e.g., a local area network, a wide area network, or a global network (e.g., the internet)). The one or more communications media may include a router, a switch, a base station, or another device implementing communication from the source apparatus 70 to the destination apparatus 71.

In another example, the encoded video data may be output to a storage apparatus 73 through an output interface 703. Likewise, the encoded video data may be accessed from the storage apparatus 73 through an input interface 713. The storage apparatus 73 may include a plurality of locally accessible data storage media such as a Blu-ray disc, a high-density digital video disc (DVD), a compact disc read-only memory (CD-ROM), a flash memory, or another appropriate digital storage medium used to store the encoded video data.

In another example, the storage apparatus 73 may correspond to a file server or another intermediate storage apparatus that stores the encoded video data generated by the source apparatus 70. In this example, the destination apparatus 71 may obtain stored video data from the storage apparatus 73 through streaming transmission or downloading. The file server may be any type of server that can store the encoded video data and transmit the encoded video data to the destination apparatus 71. For example, the file server may include a world wild web (Web) server (e.g., used for a website), a file transfer protocol (FTP) server, a network attached storage (NAS) apparatus, and a local disk drive.

The destination apparatus 71 may access the encoded video data through any standard data connection (e.g., an internet connection). An example type of the data connection includes a wireless channel, a wired connection (e.g., a cable modem), or a combination thereof that is suitable for accessing the encoded video data stored on the file server. The encoded video data may be transmitted from the file server in a streaming manner or through downloading or through a combination thereof.

The encoding method and the decoding method in this application are not limited to being applied to a wireless application scenario. For example, the encoding method and the decoding method in this application may be applied to video encoding and decoding, to support a plurality of multimedia applications such as the following applications: over-the-air television broadcast, cable television transmission, satellite television transmission, video streaming transmission (e.g., through the internet), encoding of video data stored on a data storage medium, decoding of video data stored on a data storage medium, or another application. In some examples, the video coding system may be configured to support unidirectional or bidirectional video transmission, to support applications such as video streaming transmission, video playing, video broadcasting, and/or videotelephony.

It should be noted that the video coding system shown in FIG. 7 is merely an example of a video coding system, and is not intended to limit a video coding system in this application. The encoding method and the decoding method provided in this application is further applicable to a scenario in which there is no data communication between the encoding apparatus and the decoding apparatus. In another example, to-be-encoded video data or encoded video data may be retrieved from a local memory, or may be transmitted on a network in a streaming manner or the like. The video encoding apparatus may encode the to-be-encoded video data and store encoded video data in the memory. The video decoding apparatus may also obtain the encoded video data from the memory and decode the encoded video data.

In FIG. 7, the source apparatus 70 includes a video source 701, a video encoder 702, and the output interface 703. In some examples, the output interface 703 may include a modulator/demodulator (a modem) and/or a transmitter. The video source 701 may include a video capturing apparatus (e.g., a camera), a video archive including previously captured video data, a video input interface configured to receive video data from a video content provider, and/or a computer graphics system configured to generate video data, or a combination of these sources of the video data.

The video encoder 702 may encode video data from the video source 701. In some examples, the source apparatus 70 directly transmits the encoded video data to the destination apparatus 71 through the output interface 703. In another example, the encoded video data may alternatively be stored on the storage apparatus 73, so that the destination apparatus 71 subsequently accesses the encoded video data for decoding and/or playing.

In an example in FIG. 7, the destination apparatus 71 includes a display apparatus 711, a video decoder 712, and the input interface 713. In some examples, the input interface 713 includes a receiver and/or a modem. The input interface 713 may receive the encoded video data through the link 72 and/or from the storage apparatus 73. The display apparatus 711 may be integrated with the destination apparatus 71 or disposed outside the destination apparatus 71. Generally, the display apparatus 711 displays decoded video data. The display apparatus 711 may include a plurality of display apparatuses, for example, a liquid crystal display, a plasma display, an organic light-emitting diode display, or a display apparatus of another type.

Optionally, the video encoder 702 and the video decoder 712 may be integrated respectively with an audio encoder and an audio decoder, and may include an appropriate multiplexer-demultiplexer unit or other hardware and software, to encode both audio and a video in a same data stream or separate data streams.

The video encoder 702 and the video decoder 712 may include at least one microprocessor, digital signal processor (DSP), application-specific integrated circuit (ASIC), field programmable gate array (FPGA), discrete logic, or hardware, or any combination thereof. If the encoding method and the decoding method provided in this application are implemented by software, an instruction used for the software may be stored in an appropriate non-volatile computer-readable storage medium, and at least one processor may be used to execute the instruction in hardware, to implement this application. Any one of the foregoing content (including the hardware, the software, a combination of the hardware and the software, and the like) may be considered as at least one processor. The video encoder 702 may be included in an encoder, and the video decoder 712 may be included in a decoder. The encoder or the decoder may be a part of a combined encoder/decoder (codec) in a corresponding apparatus.

The video encoder 702 and the video decoder 712 in this application may operate according to a video compression standard (e.g., HEVC), or may operate according to another industrial standard. This is not specifically limited in this application.

The video encoder 702 is configured to: determine a basic split mode for a current to-be-encoded picture block and a target derivation mode for a subpicture block of the current to-be-encoded picture block; or determine a basic split mode for a current to-be-encoded picture block and a feature parameter of the current to-be-encoded picture block, and when the feature parameter of the current to-be-encoded picture block is less than or equal to a first preset threshold, determine a target derivation mode for a subpicture block of the current to-be-encoded picture block; split the current to-be-encoded picture block into N (where N is an integer greater than or equal to 2) subpicture blocks in the basic split mode; and derive a first derived picture block from at least two adjacent subpicture blocks in the N subpicture blocks in a derivation manner indicated by the target derivation mode.

In this way, when the video encoder 702 does not need to split the first derived picture block, the video encoder 702 encodes the first derived picture block to obtain a bitstream, and sends the bitstream to the video decoder 712. When the video encoder 702 needs to further split the first derived picture block, the video encoder 702 determines the first derived picture block as a current to-be-encoded picture block, and repeats the foregoing process, until a re-obtained first derived picture block is no longer split.

Optionally, a method in which "the video encoder 702 determines a basic split mode for a current to-be-encoded picture block" may be: The video encoder 702 determines at least two candidate split modes corresponding to the current to-be-encoded picture block, and calculates a rate distortion cost for each of the at least two candidate split modes; and then the video encoder 702 determines a candidate split mode corresponding to a minimum rate distortion cost as the basic split mode.

A method in which "the video encoder 702 determines a target derivation mode for a subpicture block of the current to-be-encoded picture block" may be: the video encoder 702 calculates a rate distortion cost for each preset derivation mode in a candidate derivation mode set, and determines a preset derivation mode corresponding to a minimum rate distortion cost as the target derivation mode.

Figure 11A:
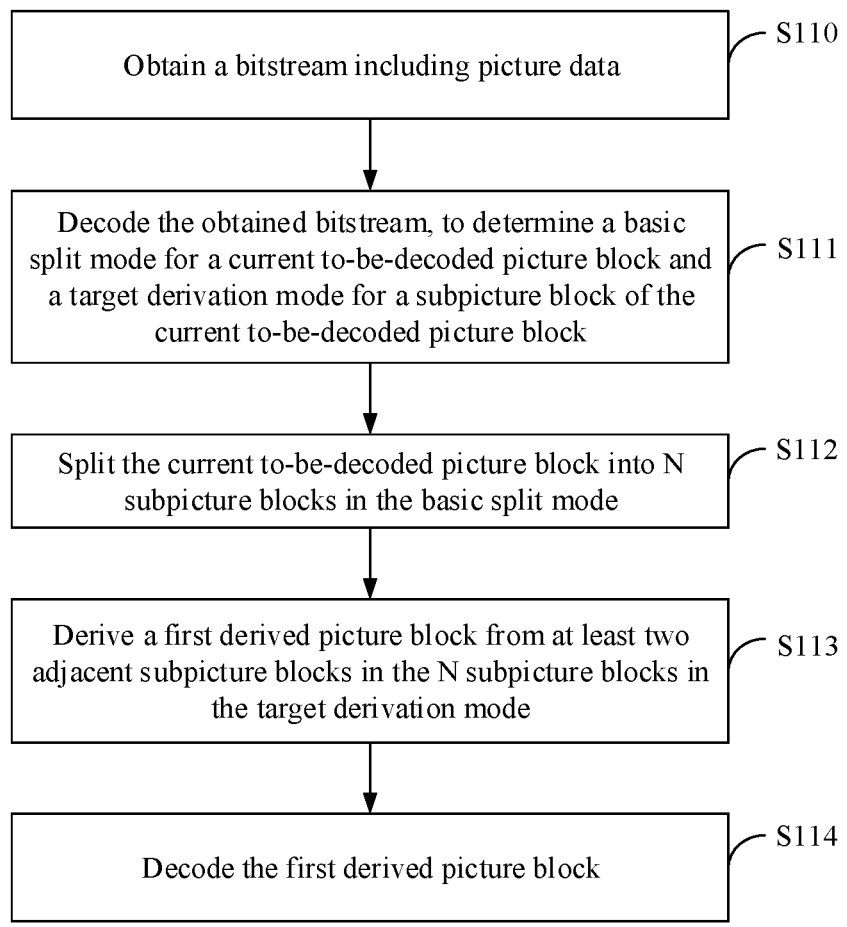
FIG. 11A is a schematic flowchart of a decoding method according to an embodiment of this application.
Figure 11B:
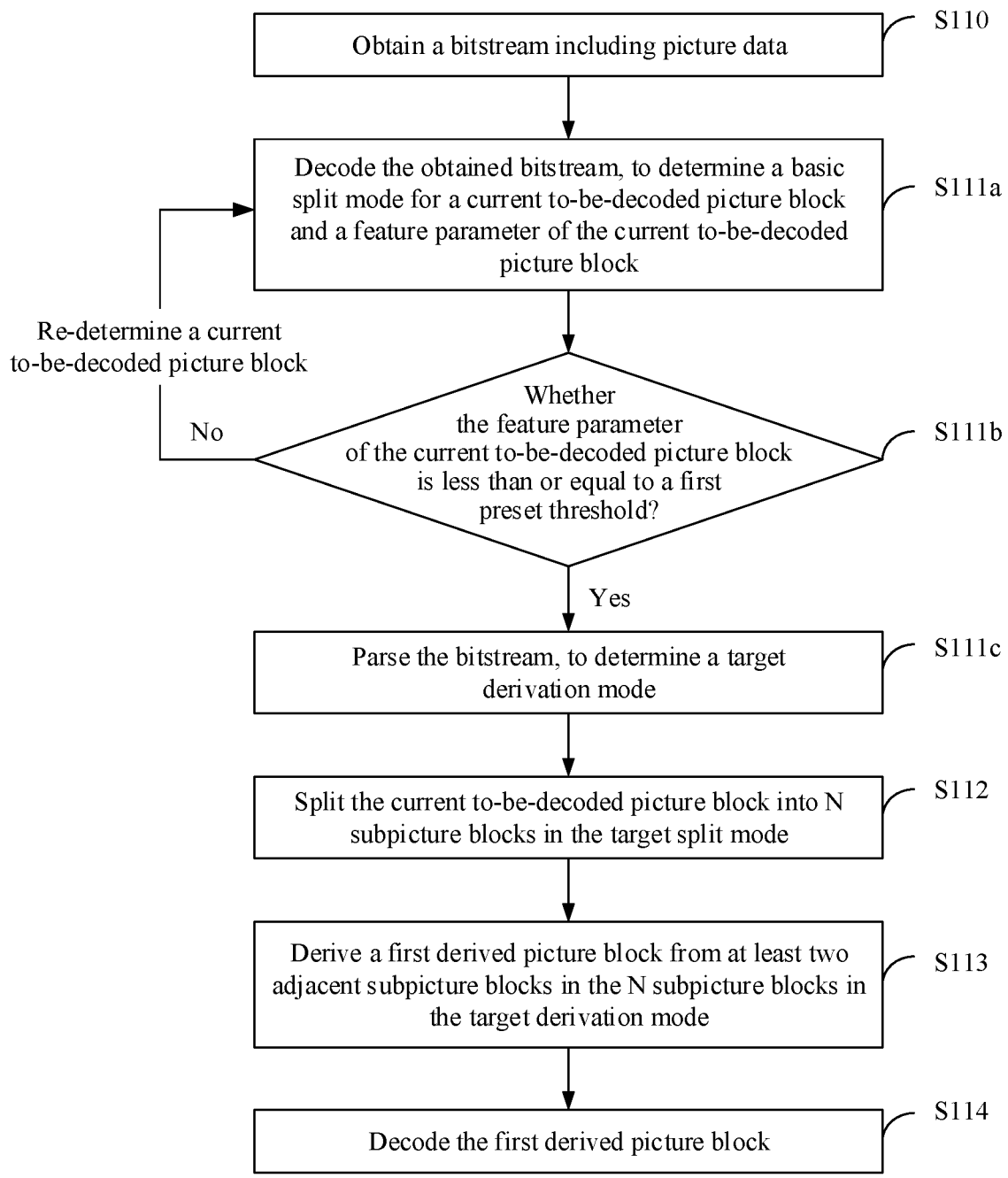
FIG. 11B is a schematic flowchart of a decoding method according to an embodiment of this application.

With reference to FIG. 11A or FIG. 11B, the video decoder 712 is configured to: parse a bitstream to determine a basic split mode for a current to-be-decoded picture block and a target derivation mode for a subpicture block of the current to-be-decoded picture block (S111); or parse a bitstream to determine a basic split mode for a current to-be-decoded picture block and a feature parameter of the current to-be-decoded picture block (S111a), determine whether the feature parameter of the current to-be-decoded picture block is less than or equal to a first preset threshold (S111b), and when the feature parameter of the current to-be-decoded picture block is less than or equal to the first preset threshold, parse the bitstream to determine a target derivation mode for a subpicture block of the current to-be-decoded picture block (S111c). Subsequently, the video decoder 712 splits the current to-be-decoded picture block into N subpicture blocks in the basic split mode (S112), and derives a first derived picture block from at least two adjacent subpicture blocks in the N subpicture blocks in a derivation manner indicated by the target derivation mode (S113). Further, the video decoder 712 decodes the first derived picture block (S114).

FIG. 8 is a schematic block diagram of a video encoder 702 according to an embodiment of this application. The video encoder 702 may perform intra coding and inter coding on a video block in a video slice. The intra coding depends on spatial prediction to reduce or remove spatial redundancy of a video in a given video frame or picture. The inter coding depends on temporal prediction to reduce or remove temporal redundancy of a video in at least a one neighboring frame or picture of a video sequence. An intra coding mode (I mode) may be any one of several space-based compression modes. For example, a unidirectional prediction (P mode) or a bidirectional prediction (B mode). An inter coding mode may be any one of several time-based compression modes.

In a feasible implementation of FIG. 8, the video encoder 702 includes a partitioning unit 81, a transform unit 82, a quantization unit 83, a prediction unit 84, an entropy encoding unit 85, a reference picture memory 88, and a summator 802. The prediction unit 84 includes a motion estimation unit 841, a motion compensation unit 842, and an intra prediction unit 843. For video block reconstruction, the video encoder 702 further includes a dequantization unit 86, an inverse transform unit 87, and a summator 801. In addition, the video encoder 702 may further include a deblocking filter (not shown in FIG. 8). The deblocking filter is configured to filter a block boundary, to remove a blocking artifact from a reconstructed video. When necessary, the deblocking filter usually filters an output of the summator 801. In addition to the deblocking filter, the video encoder 702 may further include an additional loop filter (in-loop or post-loop).

As shown in FIG. 8, the video encoder 702 receives video data, and the partitioning unit 81 partitions the data into video blocks. Such partitioning may further include partitioning into slices, picture blocks, or other larger units, and, e.g., video block partitioning based on quadtree structures of an LCU and a CU. For example, the video encoder 702 encodes a component of a video block in a to-be-encoded video slice. Usually, a slice may be partitioned into a plurality of video blocks (and may be partitioned into sets of video blocks that are referred to as picture blocks).

The prediction unit 84 may select one of a plurality of possible coding modes, for example, one of a plurality of intra coding modes or one of a plurality of encoding and decoding modes, for a current video block based on coding quality and a cost calculation result (e.g., a rate distortion cost (RD cost)). The prediction unit 84 may provide an obtained intra coded or inter coded block to the summator 802 to generate residual block data, and provide an obtained intra decoded or inter decoded block to the summator 801 to reconstruct an encoded block and use the reconstructed encoded block as a reference picture.

The motion estimation unit 841 and the motion compensation unit 842 in the prediction unit 84 perform inter prediction decoding on the current video block relative to one or more prediction blocks in one or more reference pictures, to implement temporal compression. The motion estimation unit 841 may be configured to determine an inter prediction mode for the video slice in a preset mode for the video sequence. In the preset mode, the video slice in the sequence may be specified as a P slice, a B slice, or a GPB slice. The motion estimation unit 841 and the motion compensation unit 842 may be highly integrated, but are separately described to explain concepts. Motion estimation performed by the motion estimation unit 841 is a process of generating a motion vector for estimating the video block. For example, the motion vector may indicate a displacement of a PU of a video block in a current video frame or picture relative to a prediction block of a reference picture.

A prediction block is a block of a PU that is found, based on a sample difference, to be closely matched with a to-be-decoded video block. The sample difference may be determined based on a sum of absolute differences (SAD), a sum of squared differences (SSD), or another difference metric. In some feasible implementations, the video encoder 702 may calculate a value of a sub-integer sample position of a reference picture stored in the reference picture memory 88. For example, the video encoder 702 may interpolate a value of a one-quarter sample position, a one-eighth sample position, or another fractional sample position of the reference picture. Therefore, the motion estimation unit 841 may perform motion search relative to a full sample position and a fractional sample position, and output a motion vector with fractional sample precision.

The motion estimation unit 841 calculates a motion vector of a PU of a video block in an inter decoded slice by comparing a position of the PU and a position of a prediction block of a reference picture. The reference picture may be selected from a first reference picture list (a list 0) or a second reference picture list (a list 1). Each item in the list is used to identify one or more reference pictures stored in the reference picture memory 88. The motion estimation unit 841 sends the calculated motion vector to the entropy encoding unit 85 and the motion compensation unit 842.

Motion compensation performed by the motion compensation unit 842 may include extracting or generating a prediction block based on the motion vector determined through motion estimation, and interpolation at a sub-sample precision level may be performed. After receiving the motion vector of the PU of the current video block, the motion compensation unit 842 may locate the prediction block pointed to by the motion vector in one of the reference picture lists. The video encoder 702 subtracts a sample value of the prediction block from a sample value of the current video block that is being decoded, to obtain a residual video block, and form a sample difference. The sample difference constitutes residual data of the block, and may include both a luma difference component and a chroma difference component. The summator 801 represents one or more components that perform the subtraction operation. The motion compensation unit 842 may further generate syntax elements associated with the video block and the video slice, for a video decoder 712 to decode the video block in the video slice.

If the PU is located in the B slice, a picture including the PU may be associated with the two reference picture lists referred to as the "list 0" and the "list 1". In some feasible implementations, the picture including the B slice may be associated with a list combination of the list 0 and the list 1.

In addition, if the PU is located in the B slice, the motion estimation unit 841 may perform unidirectional prediction or bidirectional prediction on the PU. In some feasible implementations, the bidirectional prediction is prediction separately performed based on pictures in the reference picture list 0 and pictures in the reference picture list 1. In some other feasible implementations, the bidirectional prediction is prediction separately performed based on a reconstructed future frame and a reconstructed past frame that are included in a current frame in a display order. When the motion estimation unit 841 performs the unidirectional prediction on the PU, the motion estimation unit 841 may search the reference pictures in the list 0 or the list 1 for a reference block for the PU. The motion estimation unit 841 may generate a reference index indicating a reference picture including the reference block in the list 0 or the list 1, and a motion vector indicating a spatial displacement between the PU and the reference block. The motion estimation unit 841 may output the reference index, a prediction direction identifier, and the motion vector as motion information of the PU. The prediction direction identifier may indicate that the reference index indicates the reference pictures in the list 0 or the list 1. The motion compensation unit 842 may generate a prediction picture block for the PU based on the reference block indicated by the motion information of the PU.

When the motion estimation unit 841 performs the bidirectional prediction on the PU, the motion estimation unit 841 may search the reference pictures in the list 0 for a reference block for the PU, and may further search the reference pictures in the list 1 for another reference block for the PU. Then, the motion estimation unit 841 may generate reference indexes indicating reference pictures including the reference blocks in the list 0 and the list 1, and motion vectors indicating spatial displacements between the reference blocks and the PU. The motion estimation unit 841 may output the reference indexes and the motion vectors for the PU as motion information of the PU. The motion compensation unit 842 may generate a prediction picture block for the PU based on the reference blocks indicated by the motion information of the PU.

In some feasible implementations, the motion estimation unit 841 does not output a complete set of the motion information of the PU to the entropy encoding unit 85. Instead, the motion estimation unit 841 may signal the motion information of the PU with reference to motion information of another PU. For example, the motion estimation unit 841 may determine that the motion information of the PU is greatly similar to motion information of a neighboring PU. In this implementation, the motion estimation unit 841 may indicate an indicator value in a syntax structure associated with the PU. The indicator value indicates, to the video decoder 712, that the PU has the same motion information as the neighboring PU or has motion information that can be derived from the neighboring PU. In another implementation, the motion estimation unit 841 may identify, in the syntax structure associated with the PU, a candidate predicted motion vector and a motion vector difference (MVD) that are associated with the neighboring PU. The MVD indicates a difference between the motion vector of the PU and the indicated candidate predicted motion vector associated with the neighboring PU. The video decoder 712 may use the indicated candidate predicted motion vector and the MVD determine the motion vector of the PU.

As described above, the prediction unit 84 may generate a candidate predicted motion vector list for each PU of a CU. One or more of the candidate predicted motion vector lists may include one or more original candidate predicted motion vectors and one or more additional candidate predicted motion vectors derived from the one or more original candidate predicted motion vectors.

The intra prediction unit 843 in the prediction unit 84 may perform intra prediction decoding on the current video block relative to one or more neighboring blocks that are in a same picture or slice as the current to-be-decoded block, to implement spatial compression. Therefore, as an alternative of inter prediction (as described above) performed by the motion estimation unit 841 and the motion compensation unit 842, the intra prediction unit 843 may perform intra prediction on the current block. Specifically, the intra prediction unit 843 may determine an intra prediction mode used for encoding the current block. In some feasible implementations, the intra prediction unit 843 may (for example) use various intra prediction modes to encode the current block during separate encoding traversal, and the intra prediction unit 843 may select an appropriate used intra prediction mode from tested modes.

After the prediction unit 84 generates a prediction block of the current video block through inter prediction or intra prediction, the video encoder 702 subtracts the prediction block from the current video block, to obtain a residual video block. Residual video data in the residual block may be included in one or more TUs, and applied to the transform unit 82. The transform unit 82 performs transform, for example, discrete cosine transform (DCT) or conceptually similar transform (e.g., discrete sine transform (DST)) to transform the residual video data into residual transform coefficients. The transform unit 82 may transform the residual video data from a sample domain to a transform domain (e.g., a frequency domain).

The transform unit 82 may send the obtained transform coefficients to the quantization unit 83. The quantization unit 83 quantizes the transform coefficients to further reduce a bit rate. The quantization process can reduce a bit depth associated with some or all of the coefficients. A quantization degree may be modified by adjusting a quantization parameter. In some feasible implementations, the quantization unit 83 may further scan a matrix including a quantized transform coefficient. Alternatively, the entropy encoding unit 85 may perform the scanning.

After the quantization, the entropy encoding unit 85 may perform entropy encoding on the quantized transform coefficient. For example, the entropy encoding unit 85 may perform context-adaptive variable-length coding (CAVLC), context-adaptive binary arithmetic coding (CABAC), syntax-based context-adaptive binary arithmetic coding (SBAC), probability interval partitioning entropy (PIPE) decoding, or another entropy coding method or technology. The entropy encoding unit 85 may further perform entropy encoding on a motion vector and another syntax element of a current video slice that is being decoded. After the entropy encoding unit 85 performs the entropy encoding, the entropy encoding unit 85 may transmit an encoded bitstream to the video decoder 712, or archive encoded bitstream for subsequent transmission or for retrieval by the video decoder 712.

The dequantization unit 86 and the inverse transform unit 87 perform dequantization and inverse transform respectively, to reconstruct the residual block in the sample domain, so that the residual block is subsequently used as a reference block of the reference picture. The motion compensation unit 842 may calculate the reference block by adding the residual block and a prediction block of one reference picture in one of the reference picture lists. The motion compensation unit 842 may further apply one or more interpolation filters to the reconstructed residual block, to calculate a sub-integer sample value for motion estimation. The summator 801 adds the reconstructed residual block and a motion compensated prediction block generated by the motion compensation unit 842 to generate the reference block, where the reference block is stored in the reference picture memory 88. The reference block may be used by the motion estimation unit 841 and the motion compensation unit 842 as a reference block for performing inter prediction on a block in a subsequent video frame or picture.

It should be understood that the video encoder 702 may be configured to encode a video stream. For example, for some picture blocks or picture frames, the video encoder 702 may directly quantize a residual signal. In this case, neither the transform unit 82 nor the inverse transform unit 87 is required to process the residual signal. Alternatively, for some picture blocks or picture frames, the video encoder 702 does not generate residual data. Correspondingly, the transform unit 82, the quantization unit 83, the dequantization unit 86, and the inverse transform unit 87 are not required to process the residual data. Alternatively, the video encoder 702 may use the reconstructed video block as a reference block and directly store the reconstructed video block. In this case, a filter is not required to process the reconstructed video block. Alternatively, the quantization unit 83 and the dequantization unit 86 in the video encoder 702 may be combined.

FIG. 9 is a schematic structural diagram of a video decoder 712 according to an embodiment of this application. As shown in FIG. 9, the video decoder 712 includes an entropy decoding unit 90, a prediction unit 91, a dequantization unit 94, an inverse transform unit 93, a summator 95, and a reference picture memory 92. The prediction unit 91 includes a motion compensation unit 911 and an intra prediction unit 912. In some feasible implementations, the video decoder 712 may perform an example decoding process that is inverse to the encoding process described with respect to the video encoder 702 in FIG. 8.

During decoding, the video decoder 712 receives, from the video encoder 702, an encoded video bitstream that represents a video block of an encoded video slice and an associated syntax element. The entropy decoding unit 90 in the video decoder 712 performs entropy decoding on the bitstream to generate a quantized coefficient, a motion vector, and another syntax element. The entropy decoding unit 90 transfers the motion vector and the another syntax element to the prediction unit 91. The video decoder 712 may receive the syntax element at a video slice level and/or a video block level.

When the video slice is decoded into an intra decoded (I) slice, the intra prediction unit 912 in the prediction unit 91 may generate prediction data of the video block in the current video slice in a signaled intra prediction mode based on data of a previously decoded block of a current frame or picture.

When the video slice is decoded into an inter decoded slice (e.g., a B slice, a P slice, or a GPB slice), the motion compensation unit 911 in the prediction unit 91 generates a prediction block of the video block of the current video picture based on the motion vector and the another syntax element that are received from the entropy decoding unit 90. The prediction block may be generated from one reference picture in one of reference picture lists. The video decoder 712 may use a default construction technology to construct the reference picture lists (a list 0 and a list 1) based on a reference picture stored in the reference picture memory 92.

The motion compensation unit 911 determines prediction information of the video block in the current video slice by parsing the motion vector and the another syntax element, and uses the prediction information to generate the prediction block of the current video block that is being decoded. For example, the motion compensation unit 911 uses some information of the received syntax element to determine a prediction mode (e.g., intra prediction or inter prediction) for decoding the video block in the video slice, an inter prediction slice type (e.g., the B slice, the P slice, or the GPB slice), construction information of one or more of the reference picture lists of the slice, a motion vector of each inter encoded video block in the slice, an inter prediction status of each inter decoded video block in the slice, and other information for decoding the video block in the current video slice.

The motion compensation unit 911 may further perform interpolation through an interpolation filter. The motion compensation unit 911 may use, for example, an interpolation filter used by the video encoder 702 during video block encoding, to calculate an interpolation value of a sub-integer sample of a reference block. In this application, the motion compensation unit 911 may determine, based on the received syntax element, the interpolation filter used by the video encoder 702, and use the interpolation filter to generate the prediction block.

If a PU is encoded through inter prediction, the motion compensation unit 911 may generate a candidate predicted motion vector list for the PU. The bitstream may include data for identifying a position of a selected candidate predicted motion vector in the candidate predicted motion vector list for the PU. After generating the candidate predicted motion vector list for the PU, the motion compensation unit 911 may generate a prediction picture block for the PU based on one or more reference blocks indicated by motion information of the PU. The reference block for the PU may be located in a temporal picture different from a temporal picture of the PU. The motion compensation unit 911 may determine the motion information of the PU based on selected motion information in the candidate predicted motion vector list for the PU.

The dequantization unit 94 dequantizes a quantized transform coefficient that is provided in the bitstream and decoded by the entropy decoding unit 90. The dequantization process may include: determining a quantization degree based on a quantization parameter calculated by the video encoder 702 for each video block in the video slice, and determining a to-be-applied dequantization degree. The inverse transform unit 93 performs inverse transform (e.g., inverse DCT, inverse integer transform, or a conceptually similar inverse transform process) on the transform coefficient to generate a sample-domain residual block After the motion compensation unit 911 generates the prediction block of the current video block based on the motion vector and the another syntax element, the video decoder 712 adds the residual block from the inverse transform unit 93 and the corresponding prediction block generated by the motion compensation unit 911, to generate a decoded video block. The summator 95 represents one or more components that perform the summation operation. When necessary, a deblocking filter may be further used to filter the decoded block to remove a blocking artifact. Another loop filter (in a decoding loop or after a decoding loop) may be further used to smoothen samples, or video quality may be improved in another manner. Then, a decoded video block in a given frame or picture is stored in the reference picture memory 92. The reference picture memory 92 stores a reference picture used for subsequent motion compensation.

It should be understood that the video decoder 712 may be configured to decode a bitstream. For example, for some picture blocks or picture frames, the entropy decoding unit 90 in the video decoder 712 does not obtain the quantized coefficient through decoding. Correspondingly, the dequantization unit 94 and the inverse transform unit 93 are not required to perform processing. For example, the dequantization unit 94 and the inverse transform unit 93 in the video decoder 712 may be combined together.

Figure 10:
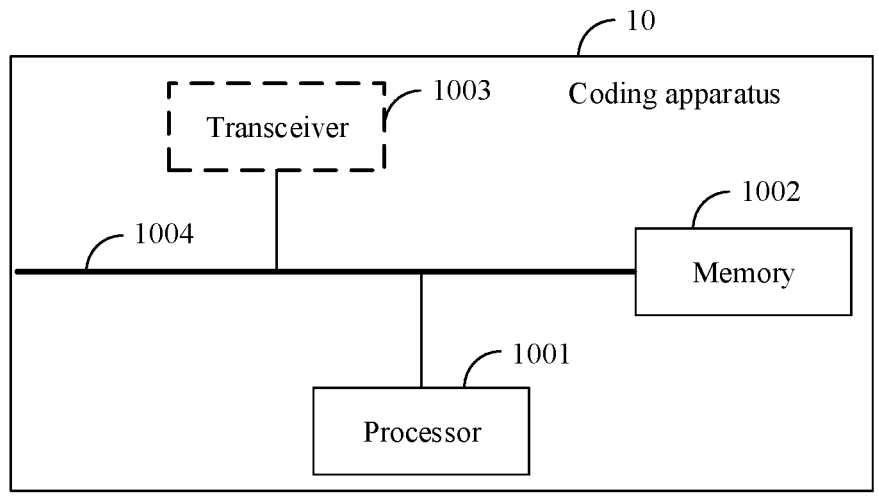
FIG. 10 is a schematic structural diagram of a coding apparatus according to an embodiment of this application.

The video encoder 702 and the video decoder 712 may alternatively be implemented in another implementation form, for example, implemented by a general-purpose digital processor system. A coding apparatus 10 shown in FIG. 10 may be an apparatus in the video encoder 702, or may be an apparatus in the video decoder 712.

The coding apparatus 10 may be applied to an encoder side, or may be applied to a decoder side. The coding apparatus 10 includes a processor 1001 and a memory 1002. The processor 1001 is connected to the memory 1002 (e.g., connected to the memory 1002 through a bus 1004). Optionally, the coding apparatus 10 may further include a transceiver 1003. The transceiver 1003 is connected to the processor 1001 and the memory 1002, and is configured to receive/send data.

The memory 1002 may be a random access memory (RAM), a read-only memory (ROM), an erasable programmable read-only memory (EPROM), or a compact disc read-only memory (CD-ROM). The memory 1002 is configured to store related program code and video data.

The processor 1001 may be one or more central processing units (CPU). When the processor 1001 is a CPU, the CPU may be a single-core CPU or a multi-core CPU.

The processor 1001 is configured to read the program code stored in the memory 1002, and perform operations in any implementation solution corresponding to FIG. 11A, FIG. 11B, FIG. 15A, or FIG. 15B and various feasible implementations of the implementation solution.

The following describes in detail an encoding method and a decoding method provided in this application with reference to the video coding system shown in FIG. 7, the video encoder 702 shown in FIG. 8, and the video decoder 712 shown in FIG. 9.

FIG. 11A is a schematic flowchart of a decoding method according to an embodiment of this application. The decoding method may be applied to the video coding system shown in FIG. 7. For example, the video decoder 712 shown in FIG. 9 performs a procedure shown in FIG. 11A.

As shown in FIG. 11A, the decoding method provided in this embodiment of this application includes the following steps.

S110: The video decoder obtains a bitstream including picture data.

Optionally, the bitstream that includes the picture data and that is obtained by the video decoder includes syntax elements such as a sequence parameter set (SPS), a picture parameter set (PPS), and a slice header or a slice segment header.

S111: The video decoder decodes the bitstream obtained by the video decoder, to determine a basic split mode for a current to-be-decoded picture block and a target derivation mode for a subpicture block of the current to-be-decoded picture block.

The syntax elements in the bitstream include a split indicator of the current to-be-decoded picture block and a derivation indicator of the current to-be-decoded picture block. The split indicator of the current to-be-decoded picture block is used to indicate the basic split mode, and the derivation indicator of the current to-be-decoded picture block is used to indicate the target derivation mode.

Optionally, the split indicator of the current to-be-decoded picture block is indicated by using a variable length code, for example, a truncated bin code or an exponential-Golomb code. The derivation indicator of the current to-be-decoded picture block is indicated by using a fixed length code.

The split indicator of the current to-be-decoded picture block and the derivation indicator of the current to-be-decoded picture block may be independent indicators (e.g., flag). For example, the split indicator of the current to-be-decoded picture block is indicated by using SplitFlag, and the derivation indicator of the current to-be-decoded picture block is indicated by using DeriveFlag. Certainly, the split indicator of the current to-be-decoded picture block and the derivation indicator of the current to-be-decoded picture block may alternatively be parts of a same indicator. For example, if the derivation indicator of the current to-be-decoded picture block is indicated by using the fixed length code with a length of x, and the bitstream includes a flag 1 that corresponds to the current to-be-decoded picture block, last x bits of the flag 1 are used to indicate the derivation indicator of the current to-be-decoded picture block, and remaining bits other than the last x bits of the flag 1 are used to indicate the split indicator of the current to-be-decoded picture block.

Optionally, a method in which the video decoder parses a bitstream to determine a basic split mode and a target derivation mode may be: The video decoder parses the bitstream to obtain the split indicator (e.g., SplitFlag) used to indicate a manner of splitting the current to-be-decoded picture block into N subpicture blocks and the derivation indicator (e.g., DeriveFlag) used to indicate a manner of deriving one derived picture block from at least two adjacent subpicture blocks in the N subpicture blocks, where both the split indicator of the current to-be-decoded picture block and the derivation indicator of the current to-be-decoded picture block are included in the syntax elements in the bitstream; and the video decoder determines the basic split mode based on the split indicator of the current to-be-decoded picture block, and determines the target derivation mode based on the derivation indicator of the current to-be-decoded picture block.

For example, if a value of a SplitFlag is 011, it indicates that a split mode for a picture block corresponding to the SplitFlag is a horizontal quad split mode. If a value of a DeriveFlag is 01, it indicates that a first preset derivation mode in candidate derivation mode set is used for deriving one derived picture block from at least two adjacent subpicture blocks of a picture block corresponding to the DeriveFlag.

Optionally, a method in which the video decoder parses a bitstream to determine a basic split mode and a target derivation mode may alternatively be: The decoder side device parses the bitstream to obtain a first indicator (e.g., NSFlag) that is used to indicate whether to split the current to-be-decoded picture block and that is included in the syntax elements in the bitstream; and if a value of the first indicator is a first value (e.g., 1), the video decoder obtains a second indicator (e.g., QTSplitFlag) that corresponds to the current to-be-decoded picture block and that is included in the syntax elements. If a value of the second indicator is a second value (e.g., 01), it indicates that a split mode for the current to-be-decoded picture block is a vertical quad split mode. If a value of the second indicator is a third value (e.g., 00), it indicates that a split mode of the current to-be-decoded picture block is a horizontal quad split mode. In addition, the decoder side device further obtains, from the bitstream, a derivation indicator (e.g., DeriveFlag) used to indicate a manner of deriving one derived picture block from at least two adjacent subpicture blocks in N subpicture blocks, where the derivation indicator of the current to-be-decoded picture block is included in the syntax elements; and the decoder side device determines the basic split mode based on the split indicator of the current to-be-decoded picture block, and determines the target derivation mode based on the derivation indicator of the current to-be-decoded picture block.

Specifically, the basic split mode in this embodiment of this application is a horizontal N-way split mode, a vertical N-way split mode, or a horizontal and vertical N-way split mode.

Herein, the horizontal N-way split mode means that the current to-be-decoded picture block is horizontally split into the N subpicture blocks. A height of each of the N subpicture blocks may be 1/N of a height of the current to-be-decoded picture block. In other words, the current to-be-decoded picture block is horizontally and evenly split into the N subpicture blocks. As shown in FIG. 1(*c*), a height of each subpicture block is ½ of a height of a picture block b. In addition, heights of any two subpicture blocks in the N subpicture blocks may alternatively be unequal. In other words, the current to-be-decoded picture block is horizontally but unevenly split into the N subpicture blocks. As shown in FIG. 1(*e*), a height of a subpicture block j is ¼ of a height of a picture block c, a height of a subpicture block k is ½ of the height of the picture block c, and a height of a subpicture block m is ¼ of the height of the picture block c.

Likewise, the vertical N-way split mode means that the current to-be-decoded picture block is vertically split into the N subpicture blocks. A width of each of the N subpicture blocks may be 1/N of a width of the current to-be-decoded picture block. In other words, the current to-be-decoded picture block is vertically and evenly split into the N subpicture blocks. As shown in FIG. 1(d), a width of each subpicture block is ½ of a width of a picture block d. In addition, widths of any two subpicture blocks in the N subpicture blocks may alternatively be unequal. In other words, the current to-be-decoded picture block is vertically but unevenly split into the N subpicture blocks. As shown in FIG. 1(g), a width of a subpicture block p is ¼ of a width of a picture block c, a width of a subpicture block q is ½ of the width of the picture block c, and a width of a subpicture block x is ¼ of the width of the picture block c.

Likewise, the horizontal and vertical N-way split mode means that the current to-be-decoded picture block is horizontally and vertically split into the N subpicture blocks. A width of each of the N subpicture blocks may be $1/\sqrt{N}$ of a width of the current to-be-decoded picture block, and a height of each subpicture block may be $1/\sqrt{N}$ of a height of the current to-be-decoded picture block. In other words, the current to-be-decoded picture block is horizontally and vertically split, and evenly split into the N subpicture blocks. As shown in FIG. 1(b), a width of each subpicture block is $1/\sqrt{4}$ (that is, ½) of a width of a CTU A, and a height of each subpicture block is $1/\sqrt{4}$ (that is, ½) of a height of the CTU A. In addition, widths of any two subpicture blocks in the N subpicture blocks may alternatively be unequal, or heights of any two subpicture blocks may alternatively be unequal. In other words, the current to-be-decoded picture block is horizontally and vertically split but unevenly split into the N subpicture blocks.

In this embodiment of this application, a typical representation form of the horizontal and vertical N-way split mode is a quadtree split mode.

For ease of description, in this embodiment of this application, in an example, the horizontal N-way split mode means that "the current to-be-decoded picture block is horizontally and evenly split into the N subpicture blocks", the vertical N-way split mode means that "the current to-be-decoded picture block is vertically and evenly split into the N subpicture blocks", and the horizontal and vertical N-way split mode means that "the current to-be-decoded picture block is horizontally and vertically split, and is evenly split into the N subpicture blocks".

In actual application, for a video encoder, when a picture block satisfies a preset condition, the picture block may be split in the horizontal N-way split mode or the vertical N-way split mode. For example, a width of a picture block is M1, and a height of the picture block is H1. If M1×H1 is greater than X1×Y1, the video encoder splits the picture block in the horizontal N-way split mode or the vertical N-way split mode. Alternatively, if M1×H1 is smaller than X2×Y2, the video encoder splits the picture block in the horizontal N-way split mode or the vertical N-way split mode. Alternatively, if M1×H1 is greater than X1×Y1 and less than X2×Y2, the video encoder splits the picture block in the horizontal N-way split mode or the vertical N-way split mode. X1, Y1, X2, and Y2 are all positive integers.

For example, if M1=4×H1, the video encoder may split the picture block in a vertical quad split mode. If H1=4×M1, the video encoder may split the picture block in a horizontal quad split mode.

Correspondingly, if the width of the current to-be-decoded picture block is M1, the height of the current to-be-decoded picture block is H1, and M1×H1 is greater than X1×Y1, or M1×H1 is less than X2×Y2, or M1×H1 is greater than X1×Y1 and less than X2×Y2, the basic split mode is the horizontal N-way split mode or the vertical N-way split mode.

The target derivation mode in this embodiment of this application is one derivation mode in a candidate derivation mode set. The candidate derivation mode set includes M (M is an integer) preset derivation modes. When the basic split mode is the horizontal N-way split mode or the vertical N-way split mode, $0 \leq M \leq 2^{N-1}$. When the basic split mode is the horizontal and vertical N-way split mode, $0 \leq M \leq 2^{2\sqrt{N} \times (\sqrt{N}-1)}$. Each preset derivation mode uniquely indicates one derivation manner. The derivation manner is used for deriving one derived picture block from at least two adjacent subpicture blocks in the N subpicture blocks. It should be noted that the M preset derivation modes include a preset derivation mode used to indicate that derivation is not performed.

Derivation in this embodiment of this application may be understood as merging (merge). Specifically, after the to-be-decoded picture block is split into the N subpicture blocks, the at least two adjacent subpicture blocks are merged into one derived picture block.

Figure 12A:
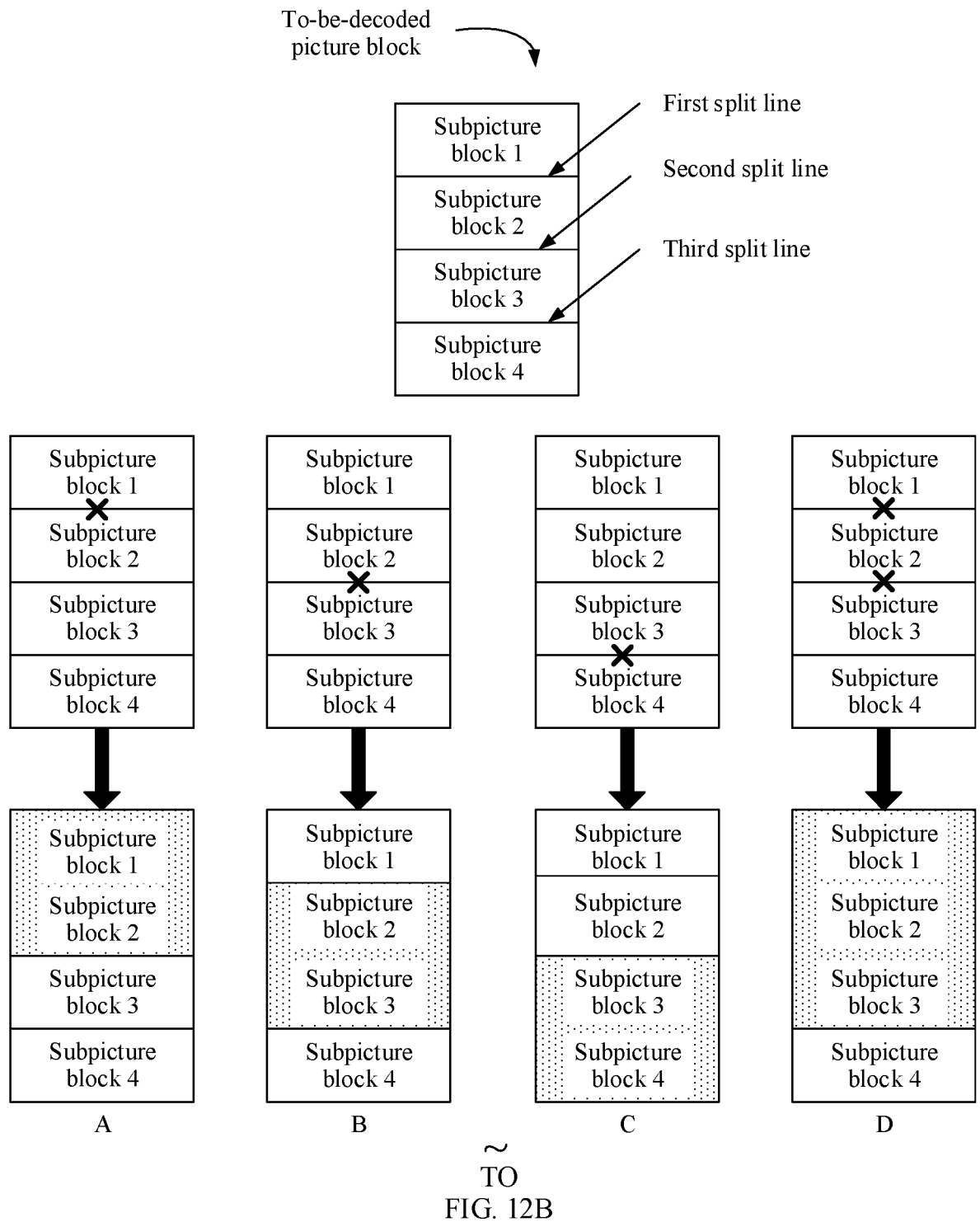
FIG. 12A and FIG. 12B are a schematic diagram of structures corresponding to derivation modes according to an embodiment of this application.
Figure 12B:
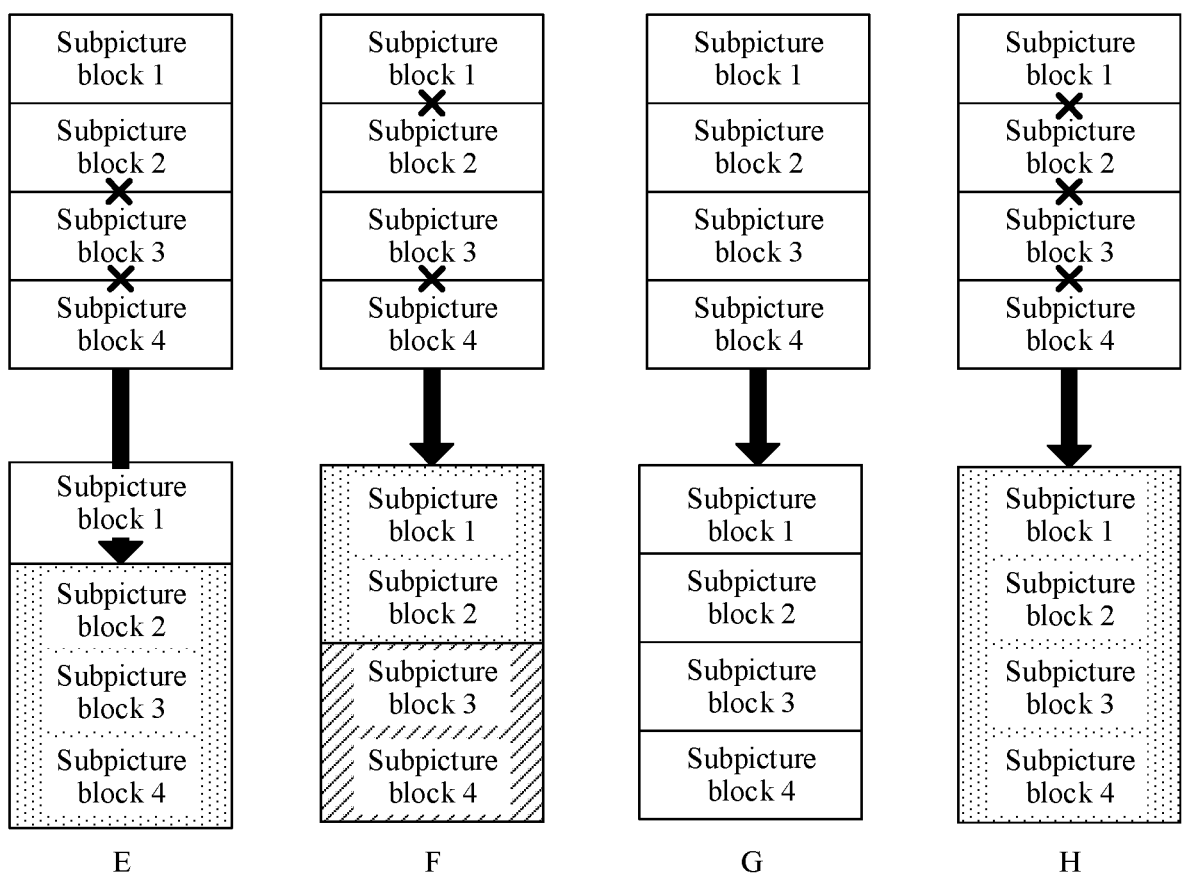

In an example, as shown in FIG. 12A and FIG. 12B, a to-be-decoded picture block is split into a subpicture block 1 (which may correspond to a first subpicture block described in this specification), a subpicture block 2 (which may correspond to a second subpicture block described in this specification), a subpicture block 3 (which may correspond to a third subpicture block described in this specification), and a subpicture block 4 (which may correspond to a fourth subpicture block described in this specification) in a horizontal quad split mode, where N=4. In this case, there are three (N−1=3) split lines for splitting the to-be-decoded picture block: a first split line, a second split line, and a third split line. Correspondingly, the candidate derivation mode set corresponding to the to-be-decoded picture block include a maximum of $2^{(4-1)}=8$ preset derivation modes. FIG. 12A (A), FIG. 12A(B), FIG. 12A(C), FIG. 12A(D), FIG. 12B(E), FIG. 12B(F), FIG. 12B(G), and FIG. 12B(H) show the eight preset derivation modes. A preset derivation mode shown in FIG. 12A(A) is used as an example for description. After the first split line is removed, one derived picture block is derived (or referred to as merged) from the subpicture block 1 and the subpicture block 2.

Figure 13A:
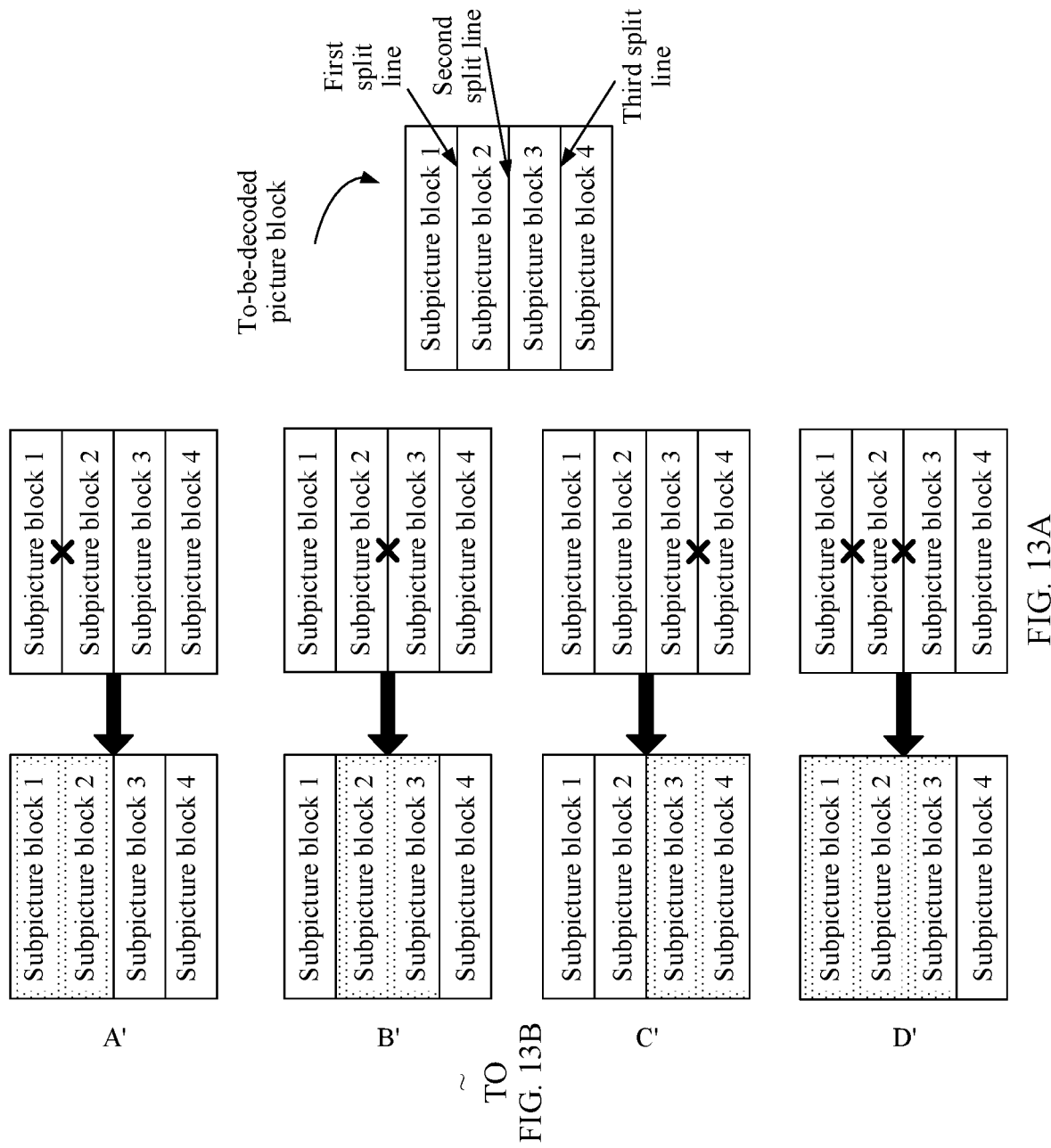

In another example, as shown in FIG. 13A and FIG. 13B, a to-be-decoded picture block is split into a subpicture block 1 (which may correspond to a fifth subpicture block described in this specification), a subpicture block 2 (which may correspond to a sixth subpicture block described in this specification), a subpicture block 3 (which may correspond to a seventh subpicture block described in this specification), and a subpicture block 4 (which may correspond to an eighth subpicture block described in this specification) in a vertical quad split mode, where N=4. In this case, there are three (N−1=3) split lines for splitting the to-be-decoded picture block: a first split line, a second split line, and a third split line. Correspondingly, the candidate derivation mode set corresponding to the to-be-decoded picture block include a maximum of $2^{(4-1)}=8$ preset derivation modes. FIG. 13A (A'), FIG. 13A(B'), FIG. 13A(C'), FIG. 13A(D'), FIG. 13B (E'), FIG. 13B(F'), FIG. 13B(G'), and FIG. 13B(H') show the eight preset derivation modes. A preset derivation mode shown in FIG. 13B(F') is used as an example for description. After the first split line is removed, one derived picture block is derived from the subpicture block 1 and the subpicture block 2; and after the third split line is removed, another derived picture block is derived from the subpicture block 3 and the subpicture block 4.

Figures 14A, 14B:
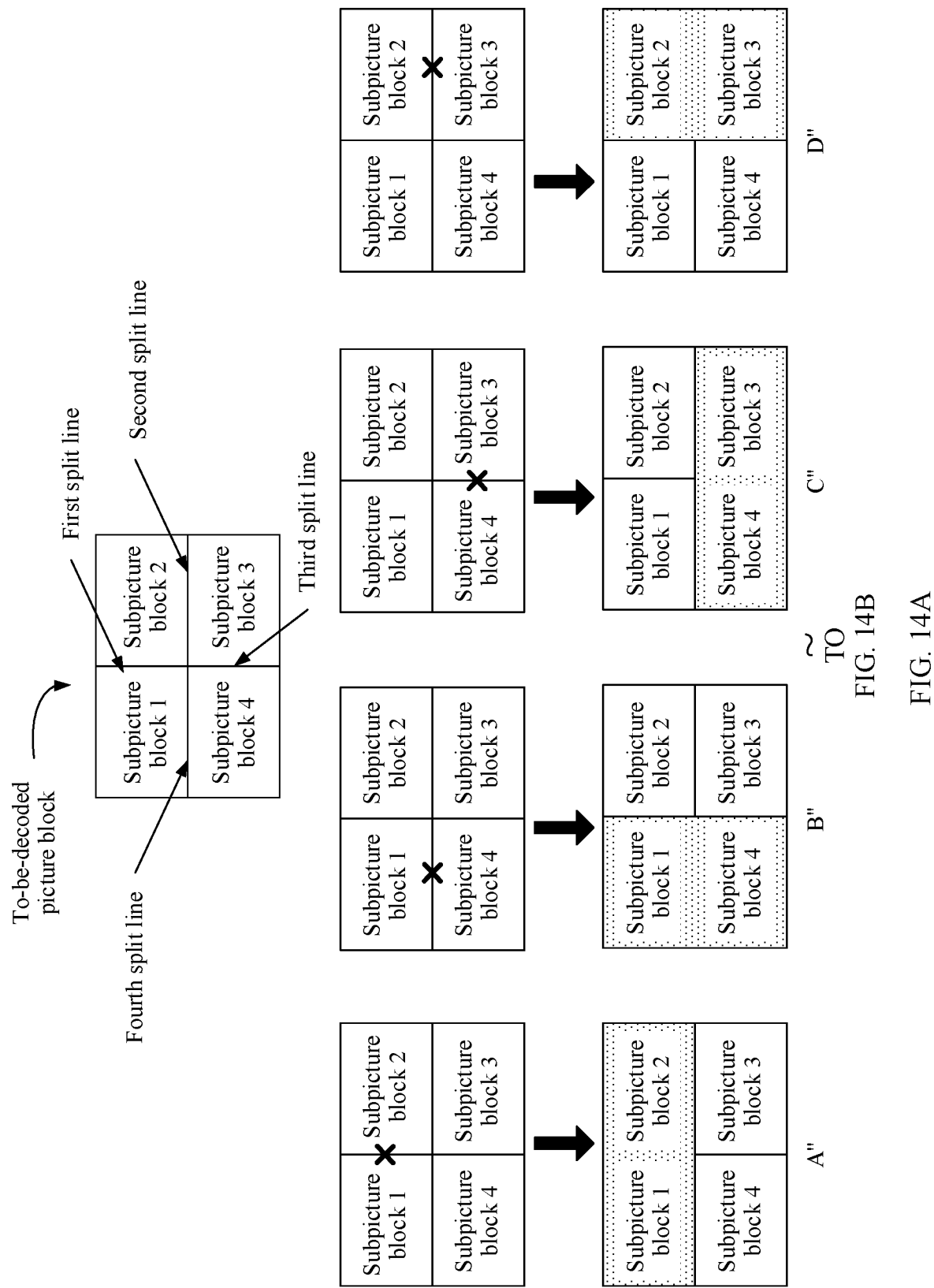
FIG. 14A and FIG. 14B are a schematic diagram of structures corresponding to derivation modes according to an embodiment of this application.
Figure 14B:
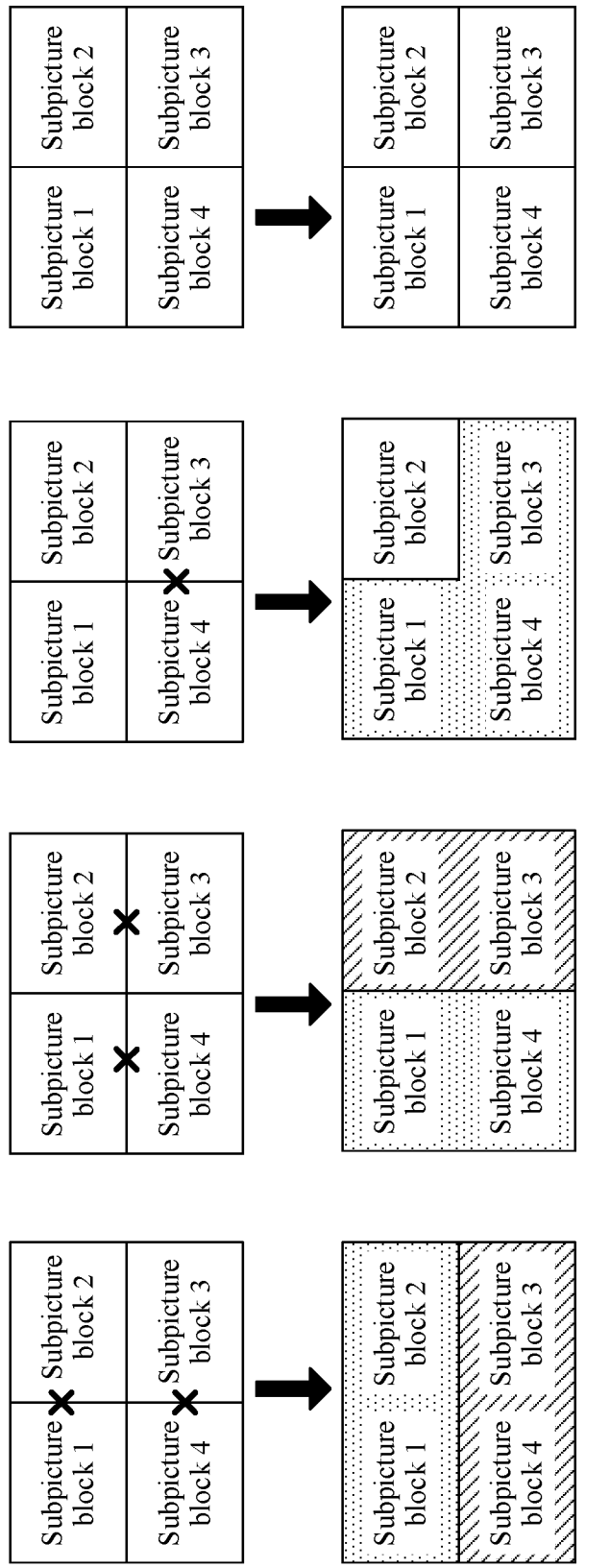

In still another example, as shown in FIG. 14A and FIG. 14B, a to-be-decoded picture block is split into a subpicture block 1 (which may correspond to a ninth subpicture block described in this specification), a subpicture block 2 (which may correspond to a tenth subpicture block described in this specification), a subpicture block 3 (which may correspond to an eleventh subpicture block described in this specification), and a subpicture block 4 (which may correspond to a twelfth subpicture block described in this specification) in a horizontal and vertical quad split mode, where N=4. In this case, there are four $(2\sqrt{N} \times (\sqrt{N}-1) = 2\sqrt{4} \times (\sqrt{4}-1) = 4)$ split lines for splitting the to-be-decoded picture block: a first split line, a second split line, a third split line, and a fourth split line. Correspondingly, the candidate derivation mode set corresponding to the to-be-decoded picture block include a maximum of $2^4 = 16$ preset derivation modes. FIG. 14A (A"), FIG. 14A(B"), FIG. 14A(C"), FIG. 14A(D"), FIG. 14B(E"), FIG. 14B(F"), FIG. 14B(G"), and FIG. 14B(H") show eight of the 16 preset derivation modes. A preset derivation mode shown in FIG. 14B(G") is used as an example for description. After the third split line and the fourth split line are removed, one derived picture block is derived from the subpicture block 1, the subpicture block 3, and the subpicture block 4.

With reference to FIG. 12A and FIG. 12B, FIG. 13A and FIG. 13B, and FIG. 14A and FIG. 14B, it can be learned that candidate derivation mode sets corresponding to different split modes include preset derivation modes corresponding to a same derivative result. For example, if derivation is performed on the same current to-be-decoded picture block, a derived picture block shown in FIG. 12B(F) is the same as a derived picture block shown in FIG. 14B(E"), a derived picture block shown in FIG. 13B(F') is the same as a derived picture block shown in FIG. 14B(F"), and a derived picture block shown in FIG. 12B(H) is the same as a derived picture block shown in FIG. 13B(H'). Therefore, in candidate derivation mode sets corresponding to different split modes, preset derivation modes corresponding to a same derivative result can be reserved only in a candidate derivation mode set corresponding to a split mode, but removed from other candidate derivation mode sets.

In an example, with reference to FIG. 12A and FIG. 12B, when N=4 and the basic split mode is the horizontal quad split mode, the candidate derivation mode set may include only preset derivation modes shown in FIG. 12A(B) (which may correspond to a third preset derivation mode described in this specification), FIG. 12A(C) (which may correspond to a second preset derivation mode described in this specification), FIG. 12A(D) (which may correspond to a first preset derivation mode described in this specification), and FIG. 12B(F) (which may correspond to a fourth preset derivation mode described in this specification).

In another example, with reference to FIG. 13A and FIG. 13B, when N=4 and the basic split mode is the vertical quad split mode, the candidate derivation mode set may include only preset derivation modes shown in FIG. 13A(B') (which may correspond to a seventh preset derivation mode described in this specification), FIG. 13A(D') (which may correspond to a fifth preset derivation mode described in this specification), FIG. 13B(E') (which may correspond to a sixth preset derivation mode described in this specification), and FIG. 13B(G') (which may correspond to an eighth preset derivation mode described in this specification).

In still another example, with reference to FIG. 14A and FIG. 14B, when N=4 and the basic split mode is the horizontal and vertical quad split mode, the candidate derivation mode set may include only preset derivation modes shown in FIG. 14A(A") (which may correspond to a ninth preset derivation mode described in this specification), FIG. 14A(B") (which may correspond to a twelfth preset derivation mode described in this specification), FIG. 14B(E") (which may correspond to a tenth preset derivation mode described in this specification), and FIG. 14B(F") (which may correspond to an eleventh preset derivation mode described in this specification).

Each preset derivation mode in the candidate derivation mode set is identified by using a fixed length code, for example, 2 bits. In comparison with the prior art, the decoding method provided in this application can identify a split mode for a picture block by using a simple indicator. This effectively improves decoding efficiency.

With reference to FIG. 12A and FIG. 12B, FIG. 13A and FIG. 13B, and FIG. 14A and FIG. 14B, it can be learned that a feature parameter of a derived picture block is greater than a feature parameter of each of the N subpicture blocks, and the feature parameter is at least one of a height and a width.

S112: The video decoder splits the current to-be-decoded picture block into the N subpicture blocks in the basic split mode.

Specifically, if the basic split mode is the horizontal quad split mode, the video decoder splits the current to-be-decoded picture block into four subpicture blocks by using the split method shown in FIG. 12A and FIG. 12B. If the basic split mode is the vertical quad split mode, the video decoder splits the current to-be-decoded picture block into four subpicture blocks by using the split method shown in FIG. 13A and FIG. 13B. If the basic split mode is the horizontal and vertical quad split mode, the video decoder splits the current to-be-decoded picture block into four subpicture blocks by using the split method shown in FIG. 14A and FIG. 14B.

S113: The video decoder derives a first derived picture block from at least two adjacent subpicture blocks in the N subpicture blocks in a derivation manner indicated by the target derivation mode.

S114: The video decoder decodes the first derived picture block.

Specifically, when the video decoder no longer splits the first derived picture block, the video decoder decodes the first derived picture block for reconstruction, to obtain a reconstructed picture block. When the video decoder further splits the first derived picture block, the video decoder considers the first derived picture block as a current to-be-decoded picture block, and repeats S111 to S114, until a re-obtained first derived picture block is no longer split.

The video decoder in this application determines a specific split mode for the current to-be-decoded picture block in the basic split mode and the target derivation mode. A plurality of different split results are identified by combining a split mode and a derivation mode. In comparison with the prior art, the decoding method can enrich split modes for a picture block, and adapt to video pictures with various texture characteristics.

It can be learned from the foregoing descriptions that the video decoder in this application may alternatively determine the target derivation mode only when a feature parameter of the current to-be-decoded picture block is less than or equal to a first preset threshold.

Specifically, with reference to FIG. 11A, as shown in FIG. 11B, S111 may be replaced with S111a to S111c.

S111a: The video decoder decodes the bitstream obtained by the video decoder, to determine a basic split mode for a current to-be-decoded picture block and a feature parameter of the current to-be-decoded picture block.

For a method in which the video decoder determines a basic split mode for a current to-be-decoded picture block, refer to the descriptions in S111. Details are not described herein again.

The feature parameter of the current to-be-decoded picture block includes a height of the current to-be-decoded picture block and a width of the current to-be-decoded picture block. The video decoder parses the bitstream to directly determine the feature parameter of the current to-be-decoded picture block.

S111b: The video decoder determines whether the feature parameter of the current to-be-decoded picture block is less than or equal to a first preset threshold.

If the feature parameter of the current to-be-decoded picture block is less than or equal to the first preset threshold, the video decoder performs S111c.

If the feature parameter of the current to-be-decoded picture block is greater than the first preset threshold, the video decoder considers a subpicture block of the current to-be-decoded picture block as a current to-be-decoded picture block, and repeats S111a.

S111c: The video decoder parses the bitstream, to determine a target derivation mode.

For a method in which the video decoder determines a target derivation mode, refer to the descriptions in S111. Details are not described herein again.

In the procedure shown in FIG. 11B, after performing S111a, the video decoder may perform S112 before S111b, or may perform S111b before S112, or may simultaneously perform S112 and S111b. This is not specifically limited in this embodiment of this application.

It is easily understood that the video decoder parses the bitstream to determine the target derivation mode only when the feature parameter of the current to-be-decoded picture block is less than or equal to the first preset threshold. Therefore, for a picture block whose feature parameter is greater than the first preset threshold, the bitstream may include only a split indicator of the picture block, but does not include a derivation indicator of the picture block. This effectively reduces transmission resources occupied by the bitstream. Certainly, for a picture block whose feature parameter is greater than the first preset threshold, the bitstream may also include a derivation indicator of the picture block. In this case, the derivation indicator of the picture block is used to indicate that derivation is not performed on a subpicture block of the picture block.

The video decoder parses the bitstream to determine the target derivation mode only when the feature parameter of the current to-be-decoded picture block is less than or equal to the first preset threshold. This effectively improves a decoding rate.

In addition, an embodiment of this application further provides an encoding method. The encoding method may be applied to the video coding system shown in FIG. 7.

Figure 15A:
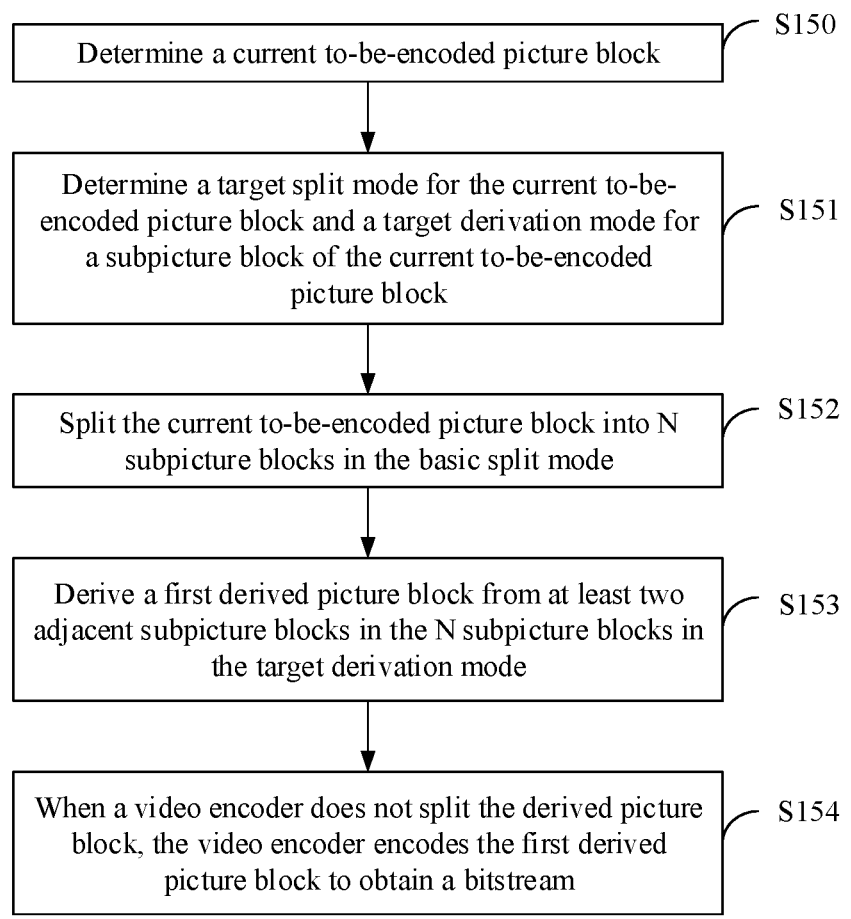
FIG. 15A is a schematic flowchart of an encoding method according to an embodiment of this application.

FIG. 15A is a schematic flowchart of an encoding method according to an embodiment of this application. For example, the video encoder 702 shown in FIG. 8 performs a procedure shown in FIG. 15A.

As shown in FIG. 15A, the encoding method provided in this embodiment of this application includes the following steps.

S150: The video encoder determines a current to-be-encoded picture block.

The current to-be-encoded picture block may be a CTU or a CU. This is not specifically limited in this embodiment of this application.

Figure 17A:
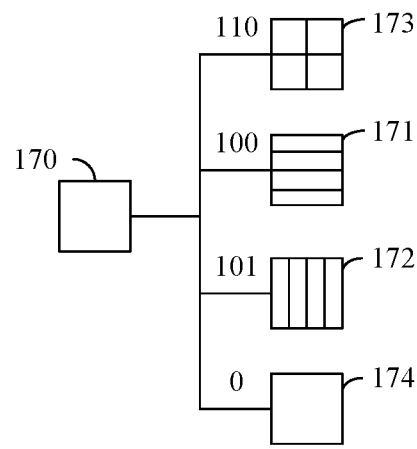
FIG. 17A is a schematic diagram of a split structure of a picture block according to an embodiment of this application.
Figure 17B:
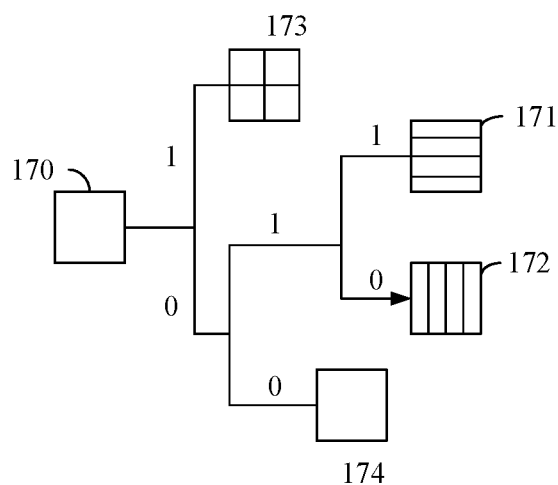
FIG. 17B is a schematic diagram of a split structure of a picture block according to an embodiment of this application.

As shown in FIG. 17A or FIG. 17B, the current to-be-encoded picture block may be a picture block 170, a subpicture block of a picture block 173, a picture block 174, or a subpicture block of a picture block 171. This is not specifically limited in this embodiment of this application.

S151: The video encoder determines a basic split mode for the current to-be-encoded picture block and a target derivation mode for a subpicture block of the current to-be-encoded picture block.

In a first feasible implementation, the video encoder determines at least two candidate split modes (a horizontal N-way split mode, a vertical N-way split mode, a horizontal and vertical N-way split mode, and no split) corresponding to the current to-be-encoded picture block, and calculates a rate distortion cost for each of the at least two candidate split modes; and then the video encoder determines a candidate split mode corresponding to a minimum rate distortion cost as the basic split mode. Subsequently, the video encoder calculates a rate distortion cost for each preset derivation mode in a candidate derivation mode set corresponding to the basic split mode, and determines a preset derivation mode corresponding to a minimum rate distortion cost as the target derivation mode.

For the candidate derivation mode, refer to the descriptions of the candidate derivation mode in the embodiment shown in FIG. 11A or FIG. 11B. Details are not described herein again.

For the basic split mode for the current to-be-encoded picture block and the target derivation mode for the subpicture block of the current to-be-encoded picture block in this embodiment, refer to the descriptions in the embodiment in FIG. 11A. A difference lies in that the current to-be-decoded picture block is described in FIG. 11A, while the current to-be-encoded picture block is described in this embodiment.

Figure 16:
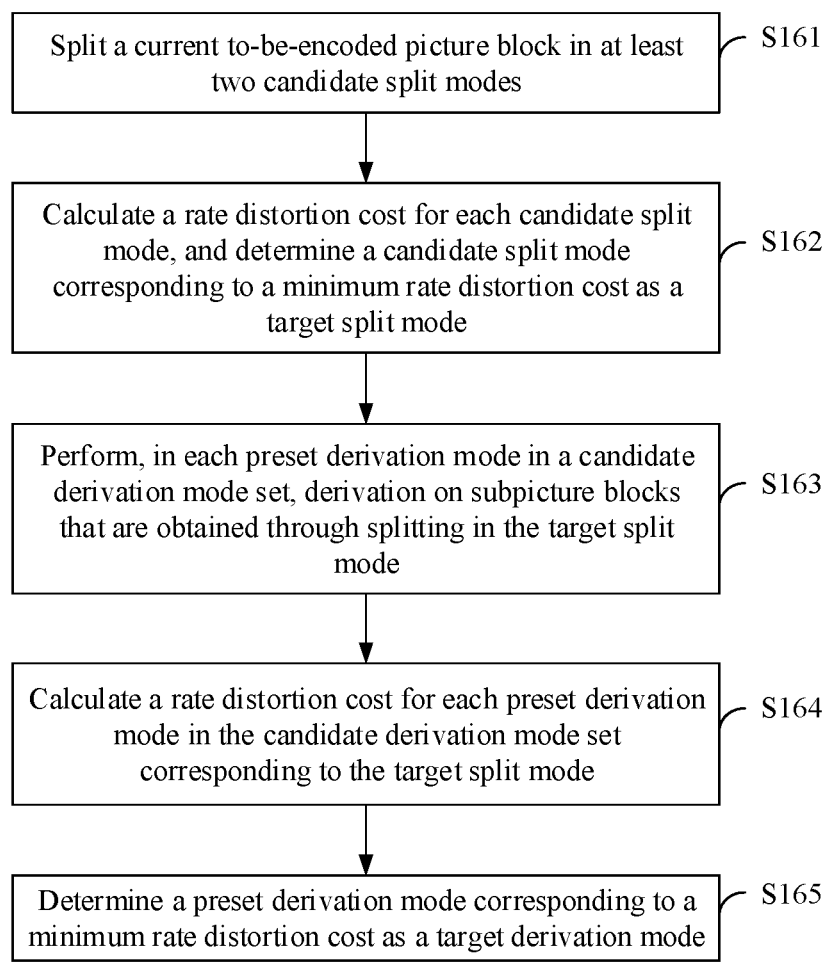
FIG. 16 is a schematic flowchart of a method for determining a basic split mode and a target derivation mode according to an embodiment of this application.

For details about the first feasible implementation, refer to descriptions in FIG. 16. Details are not described herein.

In a second feasible implementation, the video encoder determines at least two candidate split modes (a horizontal N-way split mode, a vertical N-way split mode, a horizontal and vertical N-way split mode, and no split) corresponding to the current to-be-encoded picture block. Subsequently, for each candidate split mode, the video encoder performs derivation on at least two adjacent subpicture blocks in each preset derivation mode. Then, the video encoder may calculate a rate distortion cost for each preset derivation mode and rate distortion cost for each candidate split mode, determines a split mode corresponding to a minimum rate distortion cost as the basic split mode, and determines a derivation mode corresponding to a minimum rate distortion cost as the target derivation mode.

S152: The video encoder splits the current to-be-encoded picture block into N subpicture blocks in the basic split mode.

S153: The video encoder derives a first derived picture block from at least two adjacent subpicture blocks in the N subpicture blocks in a derivation manner indicated by the target derivation mode.

S154: When the video encoder does not split the first derived picture block, the video encoder encodes the first derived picture block to obtain a bitstream.

Optionally, syntax elements in the bitstream include a split indicator of the current to-be-encoded picture block and a derivation indicator of the current to-be-encoded picture block. The split indicator of the current to-be-encoded picture block is used to indicate the basic split mode for the current to-be-encoded picture block. The derivation indicator of the current to-be-encoded picture block is used to indicate the target derivation mode for the subpicture block of the current to-be-encoded picture block.

Optionally, the split indicator of the current to-be-encoded picture block is indicated by using a variable length code, for example, a truncated bin code or an exponential-Golomb code. The derivation indicator of the current to-be-encoded picture block is indicated by using a fixed length code.

The split indicator of the current to-be-encoded picture block and the derivation indicator of the current to-be-encoded picture block may be independent indicators (e.g., flag). For example, the split indicator of the current to-be-encoded picture block is indicated by using SplitFlag, and the derivation indicator of the current to-be-encoded picture block is indicated by using DeriveFlag. Certainly, the split indicator of the current to-be-encoded picture block and the derivation indicator of the current to-be-encoded picture block may alternatively be parts of a same indicator. For example, if the derivation indicator of the current to-be-encoded picture block is indicated by using the fixed length code with a length of x, and the bitstream includes a flag 1 that corresponds to the current to-be-encoded picture block, last x bits of the flag 1 are used to indicate the derivation indicator of the current to-be-encoded picture block, and remaining bits other than the last x bits of the flag 1 are used to indicate the split indicator of the current to-be-encoded picture block.

It is easily understood that if the video encoder needs to further split the first derived picture block, the video encoder determines the derived picture block as a current to-be-encoded picture block, and repeats S151 to S154, until a re-determined first derived picture block is no longer split.

The first feasible implementation in S151 is described in detail below.

With reference to FIG. 15A, as shown in FIG. 16, a method in which the video encoder determines a basic split mode and a target derivation mode in this embodiment of this application may be implemented in S161 to S166. In other words, S151 may be replaced with S161 to S166. S161 to S166 are specifically as follows:

S161: The video encoder splits the current to-be-encoded picture block in at least two candidate split modes.

The candidate split modes include a horizontal N-way split mode, a vertical N-way split mode, a horizontal and vertical N-way split mode, and no split.

In an example, as shown in FIG. 17A, if the candidate split modes include a horizontal quad split mode, a vertical quad split mode, a horizontal and vertical quad split mode, and no split, and the current to-be-encoded picture block is a picture block 170, the video encoder may split the picture block 170 in the horizontal quad split mode, to generate four rectangular subpicture blocks whose widths are all equal to a width of the picture block 170 and whose heights are all equal to ¼ of a height of the picture block 170. Picture block 171 in FIG. 17A is used to represent a picture block with this structure. Alternatively, the video encoder may split the picture block 170 in the vertical quad split mode, to generate four rectangular subpicture blocks whose heights are all equal to a height of the picture block 170 and whose widths are all equal to ¼ of a width of the picture block 170. Picture block 172 in FIG. 17A is used to represent a picture block with this structure. Alternatively, the video encoder may split the picture block 170 in the horizontal and vertical quad split mode, to generate four square subpicture blocks whose heights are all equal to ½ of a height of the picture block 170 and whose widths are all equal to ½ of a width of the picture block 170. Picture block 173 in FIG. 17A is used to represent a picture block with this structure. Certainly, alternatively, the video encoder may not split the current to-be-encoded picture block 170. Picture block 174 in FIG. 17A is used to represent a picture block that is not split.

In FIG. 17A, 100 is used to identify the horizontal quad split mode, 101 is used to identify the vertical quad split mode, 110 is used to identify the horizontal and vertical quad split mode, and 0 is used to identify no split.

Certainly, alternatively, in the split modes shown in FIG. 17A, 110 may be used to identify the horizontal quad split mode, 100 may be used to identify the vertical quad split mode, 101 may be used to identify the horizontal and vertical quad split mode, and 0 may be used to identify no split. This is not specifically limited in this embodiment of this application.

Figure 19:
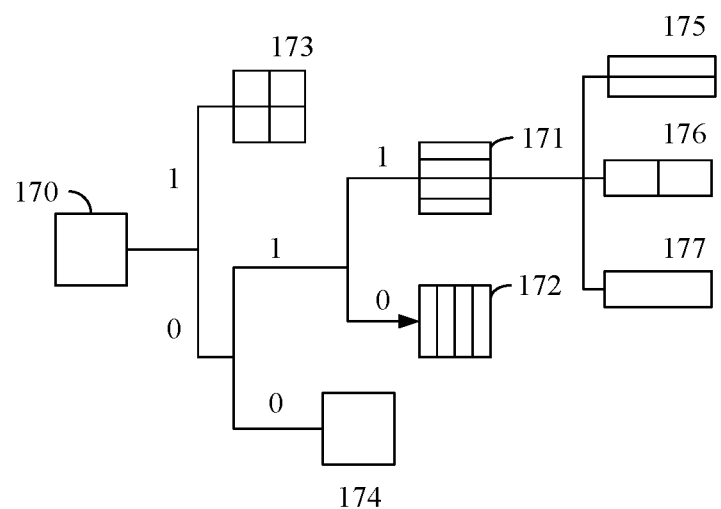
FIG. 19 is a schematic diagram of a split structure of a picture block according to an embodiment of this application.

In another example, as shown in FIG. 19, if the candidate split modes include a horizontal binary split mode, a vertical binary split mode, and no split, and the current to-be-encoded picture block is a subpicture block of a picture block 171, the video encoder may split the subpicture block of the picture block 171 in the horizontal binary split mode, to generate two rectangular subpicture blocks whose widths are all equal to a width of the subpicture block of the picture block 171 and whose heights are all equal to ½ of a height of the subpicture block of the picture block 171. Picture block 175 in FIG. 19 is used to represent a picture block with this structure. Alternatively, the video encoder may split the subpicture block of the picture block 171 in the vertical binary split mode, to generate two rectangular subpicture blocks whose heights are all equal to a height of the subpicture block of the picture block 171 and whose widths are all equal to ½ of a width of the subpicture block of the picture block 171. Picture block 176 in FIG. 19 is used to represent a picture block with this structure. Certainly, alternatively, the video encoder may not split the subpicture block of the picture block 171. Picture block 177 in FIG. 19 is used to represent a picture block that is not split.

Figure 20:
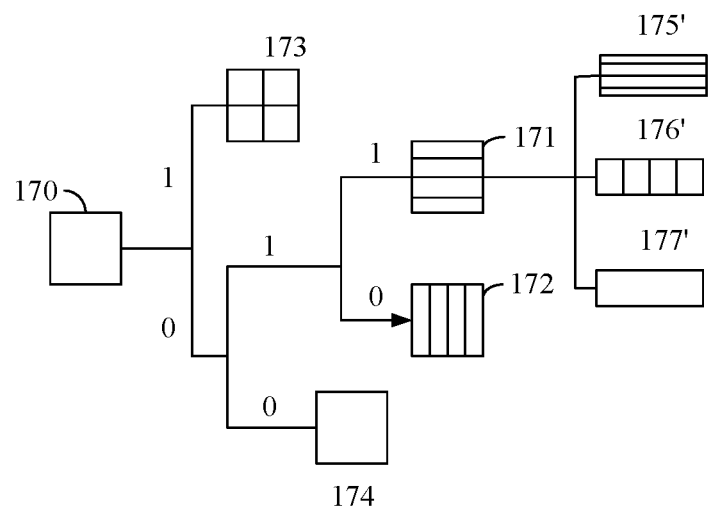
FIG. 20 is a schematic diagram of a split structure of a picture block according to an embodiment of this application.

In still another example, as shown in FIG. 20, if the candidate split modes include a horizontal quad split mode, a vertical quad split mode, and no split, and the current to-be-encoded picture block is a subpicture block of a picture block 171, the video encoder may split the subpicture block of the picture block 171 in the horizontal quad split mode, to generate four rectangular subpicture blocks whose widths are all equal to a width of the subpicture block of the picture block 171 and whose heights are all equal to ¼ of a height of the subpicture block of the picture block 171. Picture block 175' in FIG. 20 is used to represent a picture block with this structure. Alternatively, the video encoder may split the subpicture block of the picture block 171 in the vertical quad split mode, to generate four rectangular subpicture blocks whose heights are all equal to a height of the subpicture block of the picture block 171 and whose widths are all equal to ¼ of a width of the subpicture block of the picture block 171. Picture block 176' in FIG. 20 is used to represent a picture block with this structure. Certainly, alternatively, the video encoder may not split the subpicture block of the picture block 171. Picture block 177' in FIG. 20 is used to represent a picture block that is not split.

Optionally, the candidate split modes indirectly reflect split layers. In this case, the video encoder may split the current to-be-encoded picture block at a preset split layer in a corresponding split mode selected from the candidate split modes.

For example, as shown in FIG. 17B, the video encoder splits a picture block 170 at a first layer in a horizontal and vertical quad split mode, to generate a picture block 173, or does not split the picture block 170 at a first layer. On a branch on which the picture block 170 is not split, the video encoder may split or not split the picture block 170 at a second layer. On a branch on which the video encoder splits the picture block 170 at the second layer, the video encoder may split the picture block 170 in a horizontal quad split mode, to generate a picture block 171, or may split the picture block 170 in a vertical quad split mode, to generate a picture block 172.

In FIG. 17B, 011 is used to identify the split mode corresponding to the picture block 171, 010 is used to identify the split mode corresponding to the picture block 172, and 1 is used to identify the split mode corresponding to the picture block 173.

Certainly, the values of the split indicators in FIG. 17B are merely an example. In addition to the example in FIG. 17B, alternatively, 1 may be used to identify the split mode corresponding to the picture block 171, 010 may be used to identify the split mode corresponding to the picture block 172, and 011 may be used to identify the split mode corresponding to the picture block 173.

In actual application, the video encoder may split the current to-be-encoded picture block in a binary split mode/quad split mode only when the current to-be-encoded picture block satisfies a preset condition. For example, a width of the picture block 171 is M1, and a height of the picture block 171 is H1. If M1×H1 is greater than X1×Y1, the video encoder splits the picture block 171 in the binary split mode/quad split mode. Alternatively, if M1×H1 is smaller than X2×Y2, the video encoder splits the picture block 171 in the binary split mode/quad split mode. Alternatively, if M1×H1 is greater than X1×Y1 and less than X2×Y2, the video encoder splits the picture block 171 in the binary split mode/quad split mode. X1, Y1, X2, and Y2 are all positive integers.

For example, if M1=4×H1, the video encoder splits the current to-be-encoded picture block in a vertical quad split mode. If H1=4×M1, the video encoder splits the current to-be-encoded picture block in a horizontal quad split mode.

S162: The video encoder calculates a rate distortion cost for each candidate split mode, and determines a candidate split mode corresponding to a minimum rate distortion cost as the basic split mode.

S163: The video encoder performs, in each preset derivation mode in the candidate derivation mode set, derivation on subpicture blocks that are obtained through splitting in the basic split mode.

Figure 18:
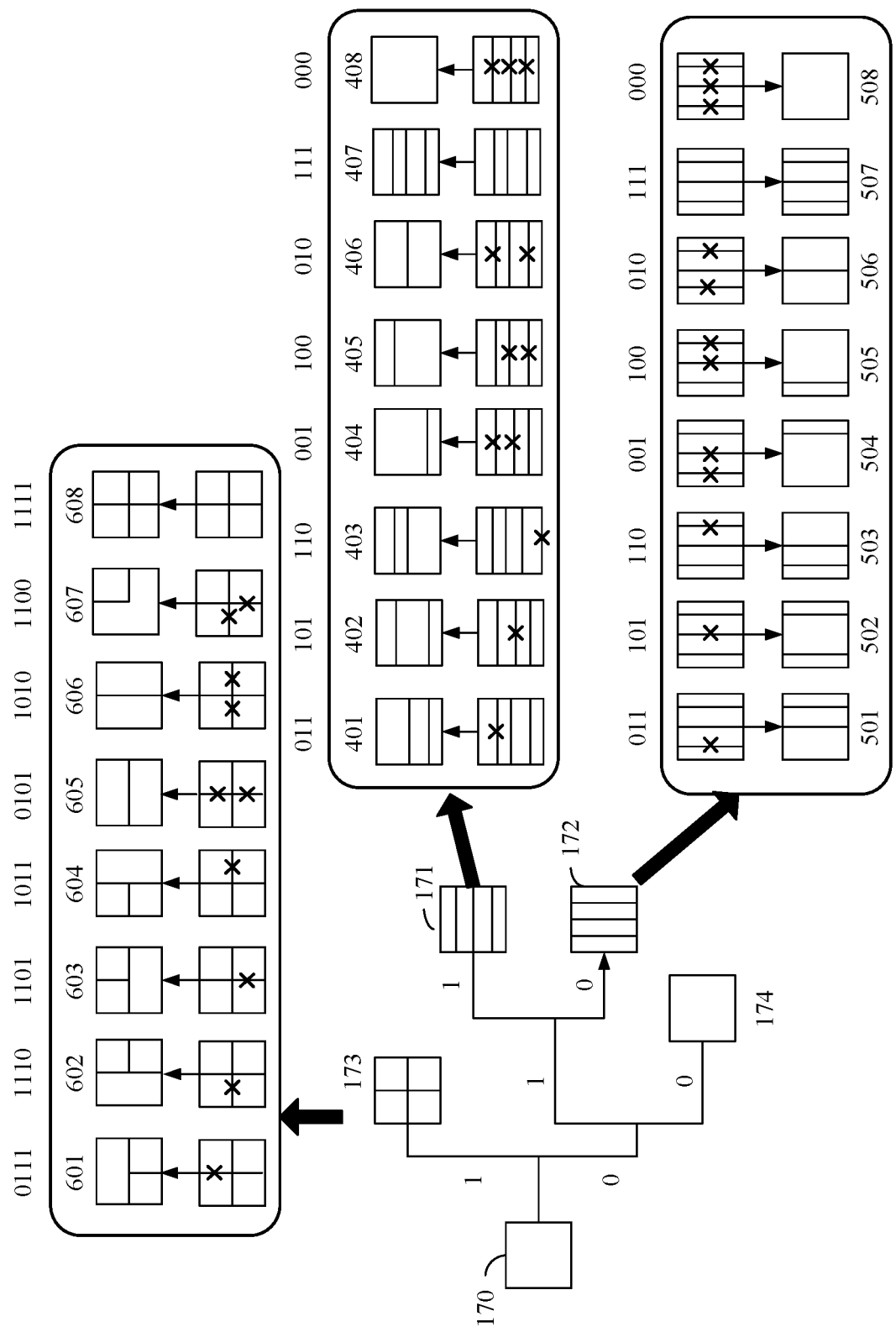
FIG. 18 is a schematic diagram of a split structure of a picture block according to an embodiment of this application.

With reference to FIG. 12A and FIG. 12B, and FIG. 17B, as shown in FIG. 18, if the basic split mode is the horizontal quad split mode, the video encoder may separately perform derivation on at least two adjacent subpicture blocks of a picture block 171 in the eight preset derivation modes (A, B, C, D, E, F, G, and H) shown in FIG. 12A and FIG. 12B. Correspondingly, picture blocks obtained after processing performed in the eight preset derivation modes are represented by 401, 402, 403, 404, 405, 406, 407, and 408.

With reference to FIG. 13A and FIG. 13B, and FIG. 17B, as shown in FIG. 18, if the basic split mode is the vertical quad split mode, the video encoder may separately perform derivation on at least two adjacent subpicture blocks of a picture block 172 in the eight preset derivation modes (A', B', C', D', E', F', G', and H') shown in FIG. 13A and FIG. 13B. Correspondingly, picture blocks obtained after processing performed in the eight preset derivation modes are represented by 501, 502, 503, 504, 505, 506, 507, and 508.

With reference to FIG. 14A and FIG. 14B, and FIG. 17B, as shown in FIG. 18, if the basic split mode is the horizontal and vertical quad split mode, the video encoder may separately perform derivation on at least two adjacent subpicture blocks of a picture block 173 in the eight preset derivation modes (A", B", C", D", E", F", G", and H") shown in FIG. 14A and FIG. 14B. Correspondingly, picture blocks obtained after processing performed in the eight preset derivation modes are represented by 601, 602, 603, 604, 605, 606, 607, and 608.

A method for identifying a picture block obtained after processing performed in a preset derivation mode may be determined based on a status of a split line. Optionally, if a split line is removed, the split line is represented by "0". If a split line is reserved, the split line is represented by "1". A picture block is identified based on removal or reservation of a split line of the picture block.

For example, the picture block 171 includes a first split line, a second split line, and a third split line (for representation of the split line, refer to FIG. 12A and FIG. 12B). If the first split line is removed, and the second split line and the third split line are reserved, in other words, if a first subpicture block and a second subpicture block are merged, and the picture block 401 is generated, the picture block 401 may be represented by 011. Correspondingly, the picture block 172 includes a first split line, a second split line, and a third split line (for representation of the split line, refer to FIG. 13A and FIG. 13B). If the second split line is removed, and the first split line and the third split line are reserved, in other words, if a second subpicture block and a third subpicture block are merged, and the picture block 502 is generated, the picture block 502 may be represented by 101. The picture block 173 includes a first split line, a second split line, a third split line, and a fourth split line (for representation of the split line, refer to FIG. 14A and FIG. 14B). If the first split line is removed, and the second split line, the third split line, and the fourth split line are reserved, in other words, if a first subpicture block and a second subpicture block are merged, and the picture block 601 is generated, the picture block 601 may be represented by 0111. A method for identifying another picture block is similar. Details are not described herein.

Certainly, a method for identifying a picture block may alternatively be different from the method in FIG. 18. This is not specifically limited in this embodiment of this application.

In actual encoding, for each split mode, the video encoder may select some of the eight preset derivation modes that are shown in FIG. 18 and that correspond to the split mode, as key modes (where picture blocks generated in the derivation modes need to be further split) or to-be-deleted derivation modes (where the derivation modes are not considered), and a remaining derivation mode is used as a common mode (which is a mode in which the video encoder performs derivation processing). In this way, the candidate derivation mode set may include only the common mode.

For example, if the basic split mode is the horizontal quad split mode, common modes may include the preset derivation modes shown in FIG. 12A(B), FIG. 12A(C), FIG. 12A(D), and FIG. 12B(F). In other words, the video encoder generates the picture blocks 402, 403, 404, and 406.

If the basic split mode is the vertical quad split mode, common modes may include the preset derivation modes shown in FIG. 13A(B'), FIG. 13A(D'), FIG. 13B(E'), and FIG. 13B(G'). In other words, the video encoder generates the picture blocks 502, 504, 505, and 507.

If the basic split mode is the horizontal and vertical quad split mode, common modes may include the preset derivation modes shown in FIG. 14A(A"), FIG. 14A(B"), FIG. 14B(E"), and FIG. 14B(F"). In other words, the video encoder generates the picture blocks 601, 602, 605, and 606.

The common modes in this embodiment of this application may be identified by using bits with a preset length, for example, 2 bits.

It can be learned, with reference to FIG. 18, that the picture block 608 has a same shape as the picture block 173. Therefore, if a preset derivation mode corresponding to the picture block 608 is a key mode, the mode may be identified by using a flag "1" of the picture block 173. In comparison with a flag "1111" of the picture block 608, the flag "1" includes fewer bits. If the video encoder determines a derivation mode corresponding to the picture block 608 as the target derivation mode, the video encoder may directly add 1 after the last bit of the split indicator to indicate that the target derivation mode is the derivation mode corresponding to the picture block 608.

The derived picture block in this embodiment of this application may be identified by using fewer bits. In comparison with the prior art, the encoding method provided in this application can identify a split mode for a picture block by using a simple indicator. This effectively improves encoding efficiency.

S164: The video encoder calculates a rate distortion cost for each preset derivation mode in the candidate derivation mode set corresponding to the basic split mode.

S165: The video encoder determines a preset derivation mode corresponding to a minimum rate distortion cost as the target derivation mode.

It is easily understood that if the video encoder needs to further split the first derived picture block obtained in S153, the video encoder considers the first derived picture block as a current to-be-encoded picture block, and repeats S161 to S165 to determine a basic split mode and a target derivation mode.

It can be learned from the foregoing descriptions that the video encoder in this application may alternatively determine the target derivation mode only when a feature parameter of the current to-be-encoded picture block is less than or equal to a first preset threshold.

Figure 15B:
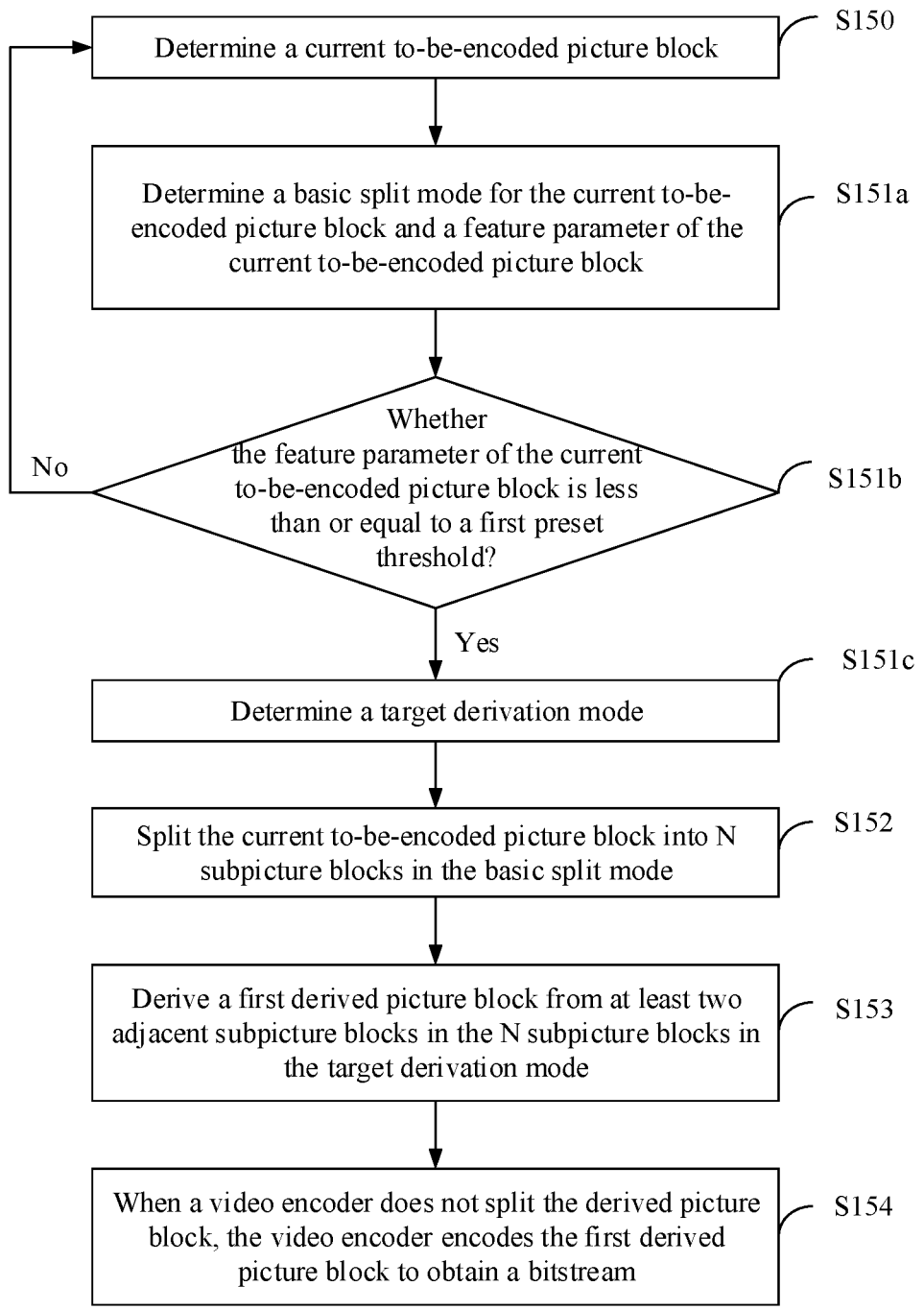
FIG. 15B is a schematic flowchart of an encoding method according to an embodiment of this application.

Specifically, with reference to FIG. 15A and FIG. 16, as shown in FIG. 15B, S151 may be replaced with S151a to S151c.

S151a: The video encoder determines a basic split mode for the current to-be-encoded picture block and a feature parameter of the current to-be-encoded picture block.

For a method in which the video encoder determines a basic split mode for the current to-be-encoded picture block, refer to the descriptions in S161 and S162. Details are not described herein again.

The feature parameter of the current to-be-encoded picture block includes a height of the current to-be-encoded picture block and a width of the current to-be-encoded picture block.

S151b: The video encoder determines whether the feature parameter of the current to-be-encoded picture block is less than or equal to a first preset threshold.

If the feature parameter of the current to-be-encoded picture block is less than or equal to the first preset threshold (e.g., 32×32), the video encoder performs S151c.

If the feature parameter of the current to-be-encoded picture block is greater than the first preset threshold, the video encoder considers a subpicture block of the current to-be-encoded picture block as a current to-be-encoded picture block, and repeats S150. For example, in FIG. 21, if the current to-be-encoded picture block is a picture block 210, a size of the picture block 210 is 64×64, and the first preset threshold is 32×32, after determining that the basic split mode for the picture block 210 is a horizontal binary split mode, the video encoder splits the picture block 210 in the horizontal binary split mode, to generate a picture block 212. Because a feature parameter of the picture block 210 is greater than the first preset threshold, the video encoder uses a subpicture block of the picture block 212 as a current to-be-encoded picture block, and re-determines a basic split mode for the subpicture block of the picture block 212.

S151c: The video encoder determines a target derivation mode.

For a method in which the video encoder determines a target derivation mode, refer to the descriptions in S163 to S165. Details are not described herein again.

In the procedure shown in FIG. 15B, after performing S151a, the video encoder may perform S152 before S151b, or may perform S151b before S152, or may simultaneously perform S152 and S151b. This is not specifically limited in this embodiment of this application.

It is easily understood that the video encoder determines the target derivation mode only when the feature parameter of the current to-be-encoded picture block is less than or equal to the first preset threshold. Therefore, for a picture block whose feature parameter is greater than the first preset threshold, the bitstream may include only a split indicator of the picture block, but does not include a derivation indicator of the picture block. This effectively reduces transmission resources occupied by the bitstream. Certainly, for a picture block whose feature parameter is greater than the first preset threshold, the bitstream may also include a derivation indicator of the picture block. In this case, the derivation indicator of the picture block is used to indicate that derivation is not performed on a subpicture block of the picture block.

The video encoder determines the target derivation mode only when the feature parameter of the current to-be-encoded picture block is less than or equal to the first preset threshold. This effectively improves an encoding rate. In actual application, the procedure shown in FIG. 15B is easier to implement.

Figure 21:
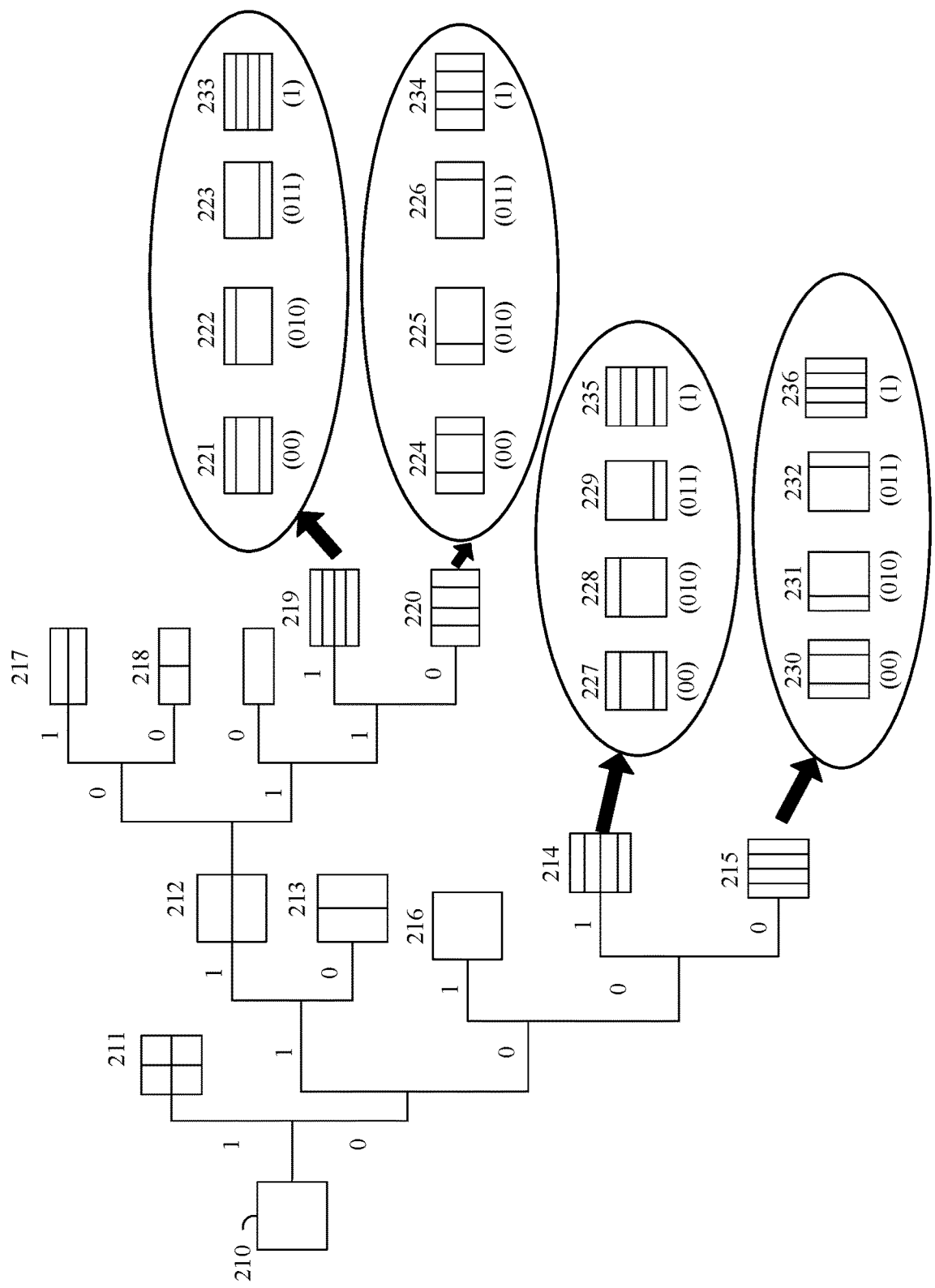
FIG. 21 is a schematic diagram of a split structure of a picture block according to an embodiment of this application.

For ease of comprehensively understanding this application, splitting of a picture block and derivation of a subpicture block in this application are described with reference to a coding tree shown in FIG. 21. FIG. 21 shows splitting of a square picture block and derivation of a subpicture block of the square picture block, and splitting of a non-square picture block and derivation of a subpicture block of the non-square picture block by using the method provided in this application.

A video encoder splits a picture block 210. The picture block 210 may be split in a horizontal and vertical quad split mode at a first layer, to generate a picture block 211. Alternatively, the picture block 210 may not be split. On a branch on which the picture block 210 is not split, the video encoder may split the picture block 210 in a binary split mode at a second layer, or may split the picture block 210 in a quad split mode or not split the picture block 210. On a branch on which the picture block 210 is split in the binary split mode at the second layer, the video encoder may specifically split the picture block 210 in a horizontal binary split mode, to generate a picture block 212, or may split the picture block 210 in a vertical binary split mode, to generate a picture block 213. Further, the video encoder may split a subpicture block of the picture block 212 in the binary split mode, or may split a subpicture block of the picture block 212 in the quad split mode. On a branch on which the video encoder splits the subpicture block of the picture block 212 in the quad split mode, the video encoder may specifically split the subpicture block of the picture block 212 in the horizontal quad split mode, to generate a picture block 219, or may split the subpicture block of the picture block 212 in the vertical quad split mode, to generate a picture block 220. On a branch on which the video encoder performs splitting in the quad split mode or does not perform splitting, the video encoder may specifically split the picture block 210 in the horizontal quad split mode, to generate a picture block 214, or may split the picture block 210 in the vertical quad split mode, to generate a picture block 215. The picture block 219 and the picture block 220 are non-square picture blocks. Picture blocks obtained after derivation processing is performed on at least two adjacent subpicture blocks of the picture block 219 in four preset derivation modes are represented by 221, 222, 223, and 233. Picture blocks obtained after derivation processing is performed on at least two adjacent subpicture blocks of the picture block 220 in four preset derivation modes are represented by 224, 225, 226, and 234. The picture block 214 and the picture block 215 are square picture blocks. Picture blocks obtained after derivation processing is performed on at least two adjacent subpicture blocks of the picture block 214 in four preset derivation modes are represented by 227, 228, 228, and 235. Picture blocks obtained after derivation processing is performed on at least two adjacent subpicture blocks of the picture block 215 in four preset derivation modes are represented by 230, 231, 232, and 236.

Each picture block in FIG. 21 is identified by using the method shown in this figure.

The picture block 212 is identified by "011". If a basic split mode for the subpicture block of the picture block 212 is the horizontal quad split mode, and the picture block 219 is generated, the basic split mode may be identified by "011111". If a feature parameter of the subpicture block of the picture block 212 is less than or equal to a first preset threshold, the video encoder may determine one of the four preset derivation modes as a target derivation mode, where the four preset derivation modes correspond to the picture block 219 shown in FIG. 21. Because the picture block 233 has a same shape as the picture block 219, a derivation mode corresponding to the picture block 233 may be directly identified by 1, and the remaining three preset derivation modes may be identified by values (e.g., 0) that are different from 1. The picture blocks 221, 222, and 223 are all identified by values starting from 0. In this case, if the video encoder uses the derivation mode corresponding to the picture block 233 as the target derivation mode, the video encoder may directly add 1 after the indicator "011111" of the basic split mode, to obtain an indicator "0111111". Correspondingly, a video decoder parses a bitstream. After obtaining the indicator "0111111", the video decoder may determine that derivation is not performed after the picture block 219 is obtained. If the video encoder uses the derivation mode corresponding to the picture block 223 as the target derivation mode, the video encoder adds 011 after the indicator "011111" of the basic split mode, to obtain an indicator "011111011". Correspondingly, a video decoder parses a bitstream. After obtaining the indicator "011111011", the video decoder may determine that the target derivation mode is the derivation mode corresponding to the picture block 223.

Likewise, the video encoder processes the picture blocks 214, 215, and 220 by using a similar method.

The split mode shown in FIG. 21 is implemented in an existing QTBT split mode. Therefore, in actual application, the split mode is easier to implement.

The video encoder in this application identifies a plurality of different split results by combining a split mode and a derivation mode. This can enrich split modes for a picture block, and adapt to video pictures with various texture characteristics.

An embodiment of this application provides a decoding apparatus. The decoding apparatus may be a video decoder. Specifically, the decoding apparatus is configured to perform the steps performed by the video decoder in the foregoing decoding method. The decoding apparatus provided in this embodiment of this application may include modules corresponding to corresponding steps.

In this embodiment of this application, the decoding apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into the modules is merely an example and logical function division, and may be other division in an actual implementation.

Figure 22:
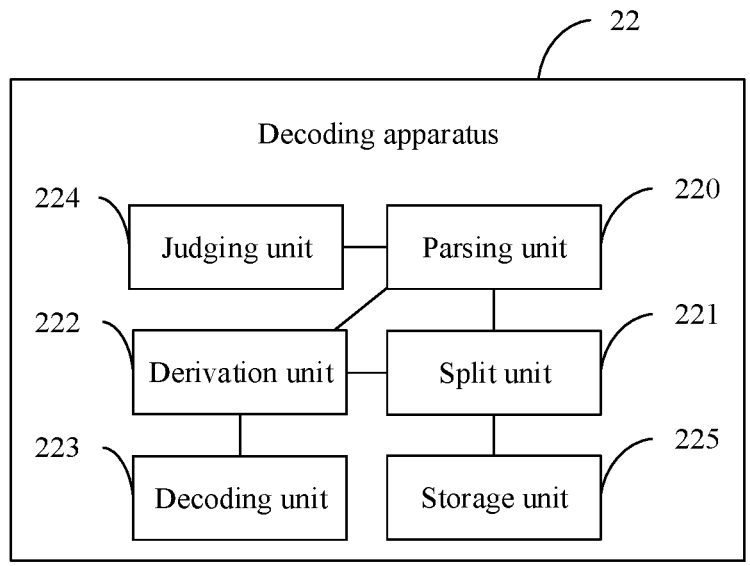
FIG. 22 is a schematic structural diagram of a decoding apparatus according to an embodiment of this application.

When each functional module is obtained through division based on each corresponding function, a possible schematic structural diagram of the decoding apparatus in the foregoing embodiment is shown in FIG. 22. As shown in FIG. 22, a decoding apparatus 22 includes a parsing unit 220, a split unit 221, a derivation unit 222, a decoding unit 223, and a judging unit 224.

The parsing unit 220 is configured to support the decoding apparatus to perform S111 and the like in the foregoing embodiments, and/or perform another process of the technology described in this specification.

The split unit 221 is configured to support the decoding apparatus to perform S112 and the like in the foregoing embodiments, and/or perform another process of the technology described in this specification.

The derivation unit 222 is configured to support the decoding apparatus to perform S113 and the like in the foregoing embodiments, and/or perform another process of the technology described in this specification.

The decoding unit 223 is configured to support the decoding apparatus to perform S114 and the like in the foregoing embodiments, and/or perform another process of the technology described in this specification.

The judging unit 224 is configured to indicate the decoding apparatus to perform S111b and the like in the foregoing embodiments, and/or perform another process of the technology described in this specification.

All related content of the steps in the foregoing method embodiments may be cited in function descriptions of corresponding functional modules. Details are not described herein again.

Certainly, the decoding apparatus provided in this embodiment of this application includes but is not limited to the foregoing modules. For example, the decoding apparatus may further include a storage unit 225.

The storage unit 225 may be configured to store program code and data of the decoding apparatus.

Figure 23:
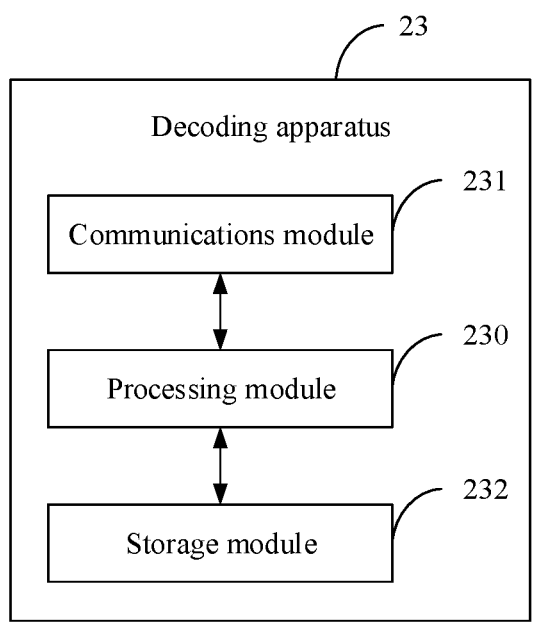
FIG. 23 is a schematic structural diagram of a decoding apparatus according to an embodiment of this application.

When an integrated unit is used, a schematic structural diagram of a decoding apparatus provided in an embodiment of this application is shown in FIG. 23. In FIG. 23, a decoding apparatus 23 includes a processing module 230 and a communications module 231. The processing module 230 is configured to control and manage an action of the decoding apparatus, for example, perform steps performed by the parsing unit 220, the split unit 221, the derivation unit 222, the decoding unit 223, and the judging unit 224, and/or perform another process of the technology described in this specification. The communications module 231 is configured to support interaction between the decoding apparatus and another device. As shown in FIG. 23, the decoding apparatus may further include a storage module 232. The storage module 232 is configured to store program code and data of the decoding apparatus, for example, store content stored in the storage unit 225.

The processing module 230 may be a processor or a controller, for example, may be a central processing unit (CPU), a general-purpose processor, a digital signal processor (DSP), an ASIC, an FPGA or another programmable logic device, a transistor logic device, a hardware component, or any combination thereof. The processing module 230 may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 231 may be a transceiver, an RF circuit, a communications interface, or the like. The storage module 232 may be a memory.

All related content of each scenario in the foregoing method embodiments may be cited in function descriptions of corresponding functional modules. Details are not described herein again.

Both the decoding apparatus 22 and the decoding apparatus 23 may execute the decoding method shown in FIG. 11A or FIG. 11B, and the decoding apparatus 22 and the decoding apparatus 23 each may be specifically a video decoding apparatus or another device having a video coding function.

This application further provides a decoding device. The decoding device includes one or more processors, a memory, and a communications interface. The memory and the communications interface are coupled to the one or more processors. The memory is configured to store computer program code. The computer program code includes an instruction. When the one or more processors execute the instruction, the decoding device performs the decoding method in the embodiments of this application.

The decoding device herein may be a video display device, a smartphone, a portable computer, or another device that can process a video or play a video.

This application further provides a video decoder, including a non-volatile storage medium and a central processing unit. The non-volatile storage medium stores an executable program. The central processing unit is connected to the non-volatile storage medium, and executes the executable program to implement the decoding method in the embodiments of this application.

This application further provides a decoder. The decoder includes the decoding apparatus (the decoding apparatus 22 or the decoding apparatus 23) in the embodiments of this application and a reconstruction module. The reconstruction module is configured to determine a reconstructed sample value of a current picture block based on a predicted sample obtained by the decoding apparatus.

Another embodiment of this application further provides a computer-readable storage medium. The computer-readable storage medium includes one or more pieces of program code. The one or more programs include an instruction. When a processor in a decoding device executes the program code, the decoding device performs the decoding method shown in FIG. 11A or FIG. 11B.

Another embodiment of this application further provides a computer program product. The computer program product includes a computer-executable instruction. The computer-executable instruction is stored in a computer-readable storage medium. At least one processor in a decoding device may read the computer-executable instruction from the computer-readable storage medium. The at least one processor executes the computer-executable instruction, to enable a terminal to perform the steps performed by the video decoder in the decoding method shown in FIG. 11A or FIG. 11B.

An embodiment of this application provides an encoding apparatus. The encoding apparatus may be a video encoder. Specifically, the encoding apparatus is configured to perform the steps performed by the video encoder in the foregoing encoding method. The encoding apparatus provided in this embodiment of this application may include modules corresponding to corresponding steps.

In this embodiment of this application, the encoding apparatus may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, division into the modules is merely an example and logical function division, and may be other division in an actual implementation.

Figure 24:
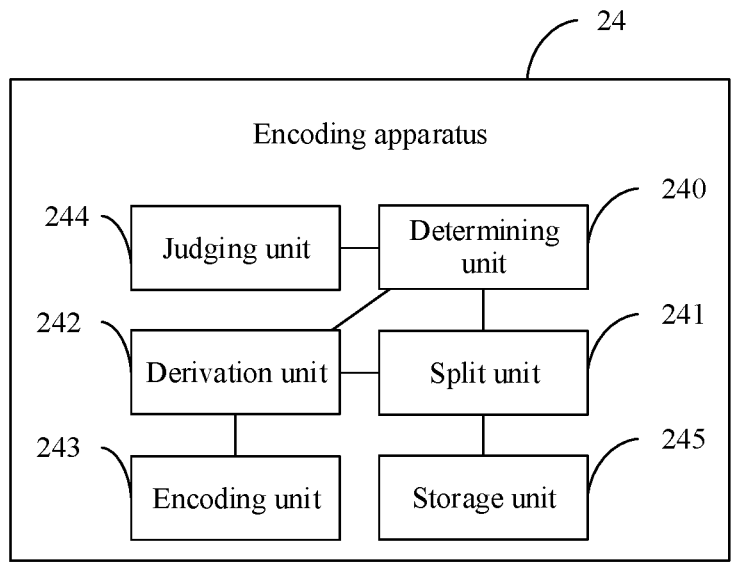
FIG. 24 is a schematic structural diagram of an encoding apparatus according to an embodiment of this application.

When each functional module is obtained through division based on each corresponding function, a possible schematic structural diagram of the encoding apparatus in the foregoing embodiment is shown in FIG. 24. As shown in FIG. 24, an encoding apparatus 24 includes a determining unit 240, a split unit 241, a derivation unit 242, an encoding unit 243, and a judging unit 244.

The determining unit 240 is configured to support the encoding apparatus to perform S150, S151, S161, S162, S163, S164, S165, and the like in the foregoing embodiments, and/or perform another process of the technology described in this specification.

The split unit 241 is configured to support the encoding apparatus to perform S152 and the like in the foregoing embodiments, and/or perform another process of the technology described in this specification.

The derivation unit 242 is configured to support the encoding apparatus to perform S153 and the like in the foregoing embodiments, and/or perform another process of the technology described in this specification.

The encoding unit 243 is configured to support the encoding apparatus to perform S154 and the like in the foregoing embodiments, and/or perform another process of the technology described in this specification.

The judging unit 244 is configured to support the encoding apparatus to perform S151b and the like in the foregoing embodiments, and/or perform another process of the technology described in this specification.

All related content of the steps in the foregoing method embodiments may be cited in function descriptions of corresponding functional modules. Details are not described herein again.

Certainly, the encoding apparatus provided in this embodiment of this application includes but is not limited to the foregoing modules. For example, the encoding apparatus may further include a storage unit 245.

The storage unit 245 may be configured to store program code and data of the encoding apparatus.

Figure 25:
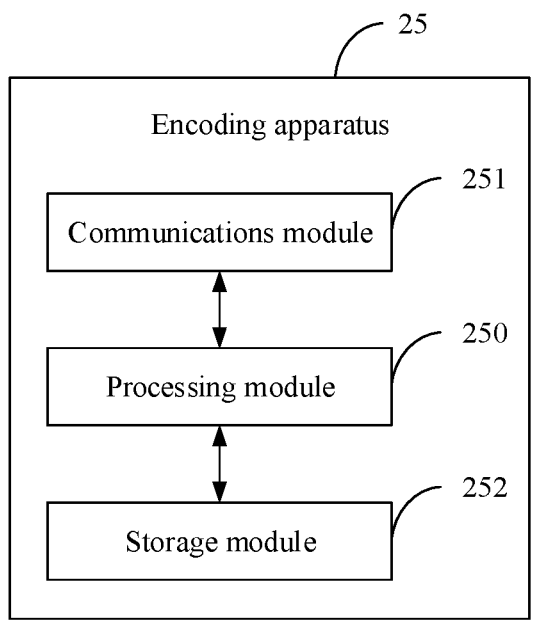
FIG. 25 is a schematic structural diagram of an encoding apparatus according to an embodiment of this application.

When an integrated unit is used, a schematic structural diagram of an encoding apparatus provided in an embodiment of this application is shown in FIG. 25. In FIG. 25, an encoding apparatus 25 includes a processing module 250 and a communications module 251. The processing module 250 is configured to control and manage an action of the encoding apparatus, for example, perform steps performed by the determining unit 240, the split unit 241, the derivation unit 242, the encoding unit 243, and the judging unit 244, and/or perform another process of the technology described in this specification. The communications module 251 is configured to support interaction between the encoding apparatus and another device. As shown in FIG. 25, the encoding apparatus may further include a storage module 252. The storage module 252 is configured to store program code and data of the encoding apparatus, for example, store content stored in the storage unit 245.

The processing module 250 may be a processor or a controller, for example, may be a CPU, a general-purpose processor, a DSP, an ASIC, an FPGA or another programmable logic device, a transistor logic device, a hardware component, or any combination thereof. The processing module 250 may implement or execute various example logical blocks, modules, and circuits described with reference to content disclosed in this application. The processor may be a combination of processors implementing a computing function, for example, a combination of one or more microprocessors, or a combination of a DSP and a microprocessor. The communications module 251 may be a transceiver, an RF circuit, a communications interface, or the like. The storage module 252 may be a memory.

All related content of each scenario in the foregoing method embodiments may be cited in function descriptions of corresponding functional modules. Details are not described herein again.

Both the encoding apparatus 24 and the encoding apparatus 25 may execute the encoding method shown in FIG. 15A or FIG. 15B. The encoding apparatus 24 and the encoding apparatus 25 each may be specifically a video encoding apparatus or another device having a video coding function.

This application further provides an encoding device. The encoding device includes one or more processors, a memory, and a communications interface. The memory and the communications interface are coupled to the one or more processors. The memory is configured to store computer program code. The computer program code includes an instruction. When the one or more processors execute the instruction, the encoding device performs the encoding method in the embodiments of this application.

The encoding device herein may be a video display device, a smartphone, a portable computer, or another device that can process a video or play a video.

This application further provides a video encoder, including a non-volatile storage medium and a central processing unit. The non-volatile storage medium stores an executable program. The central processing unit is connected to the non-volatile storage medium, and executes the executable program to implement the encoding method in the embodiments of this application.

This application further provides an encoder. The encoder includes the encoding apparatus (the encoding apparatus 24 or the encoding apparatus 25) in the embodiments of this application.

Another embodiment of this application further provides a computer-readable storage medium. The computer-readable storage medium includes one or more pieces of program code. The one or more programs include an instruction. When a processor in an encoding device executes the program code, the encoding device performs the encoding method shown in FIG. 15A or FIG. 15B.

Another embodiment of this application further provides a computer program product. The computer program product includes a computer-executable instruction. The computer-executable instruction is stored in a computer-readable storage medium. At least one processor in an encoding device may read the computer-executable instruction from the computer-readable storage medium. The at least one processor executes the computer-executable instruction, to enable a terminal to perform the steps performed by the video encoder in the encoding method shown in FIG. 15A or FIG. 15B.

All or some of the foregoing embodiments may be implemented by software, hardware, firmware, or any combination thereof. When a software program is used to implement the embodiments, of the embodiments may be all or partially implemented in a form of a computer program product. The computer program product includes one or more computer instructions. When the computer program instructions are loaded and executed on a computer, the procedure or functions according to the embodiments of this application are all or partially generated.

The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive, SolidState Disk (SSD)), or the like.

The foregoing descriptions about implementations allow a person skilled in the art to understand that, for the purpose of convenient and brief description, division into the functional modules is merely an example. In actual application, the foregoing functions may be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A decoding method, comprising:
   parsing a bitstream to determine a basic split mode for a current to-be-decoded picture block and a target derivation mode for a subpicture block of the current to-be-decoded picture block, wherein the target derivation mode is one derivation mode in a candidate derivation mode set, the candidate derivation mode set comprises M preset derivation modes, the preset derivation mode is used to indicate a derivation manner, the derivation manner is used for deriving one derived picture block from any two adjacent subpicture blocks of the current to-be-decoded picture block, and M is an integer greater than or equal to 0;
   splitting the current to-be-decoded picture block into N subpicture blocks in the basic split mode, wherein N is an integer greater than or equal to 2;
   deriving a first derived picture block from at least two adjacent subpicture blocks in the N subpicture blocks in a derivation manner indicated by the target derivation mode; and
   decoding the first derived picture block,
   wherein responsive to determining that the basic split mode is a horizontal N-way split mode or a vertical N-way split mode, $0 \le M \le 2^{N-1}$; or
   wherein responsive to determining that the basic split mode is a horizontal and vertical N-way split mode, $0 \le M \le 2^{2\sqrt{N} \times (\sqrt{N}-1)}$; and $\sqrt{N}$ is an integer.

2. The decoding method according to claim 1, wherein responsive to determining that the basic split mode is the horizontal N-way split mode, a width of each of the N subpicture blocks is equal to a width of the current to-be-decoded picture block, and a height of each subpicture block is equal to 1/N of a height of the current to-be-decoded picture block; or
   when the basic split mode is the vertical N-way split mode, a height of each of the N subpicture blocks is equal to a height of the current to-be-decoded picture block, and a width of each subpicture block is equal to 1/N of a width of the current to-be-decoded picture block.

3. The decoding method according to claim 1, wherein responsive to determining that the basic split mode is the horizontal and vertical N-way split mode, a width of each of the N subpicture blocks is equal to $1/\sqrt{N}$ of a width of the current to-be-decoded picture block, a height of each subpicture block is equal to $1/\sqrt{N}$ of a height of the current to-be-decoded picture block, wherein $\sqrt{N}$ is an integer.

4. The decoding method according to claim 1, wherein responsive to determining that N=4, M=4, and the basic split mode is a horizontal quad split mode, the candidate derivation mode set comprises a first preset derivation mode, a second preset derivation mode, a third preset derivation mode, and a fourth preset derivation mode, wherein the first preset derivation mode is to derive one derived picture block from a first subpicture block, a second subpicture block, and a third subpicture block; the second preset derivation mode is to derive one derived picture block from the third subpicture block and a fourth subpicture block; the third preset derivation mode is to derive one derived picture block from the second subpicture block and the third subpicture block; the fourth preset derivation mode is to derive one derived picture block from the first subpicture block and the second subpicture block and derive another derived picture block from the third subpicture block and the fourth subpicture block; and the first subpicture block, the second subpicture block, the third subpicture block, and the fourth subpicture block are sequentially arranged in the current to-be-decoded picture block from top to bottom;
   responsive to determining that N=4, M=4, and the basic split mode is a vertical quad split mode, the candidate derivation mode set comprises a fifth preset derivation mode, a sixth preset derivation mode, a seventh preset derivation mode, and an eighth preset derivation mode, wherein the fifth preset derivation mode is to derive one derived picture block from a fifth subpicture block, a sixth subpicture block, and a seventh subpicture block; the sixth preset derivation mode is to derive one derived picture block from the sixth subpicture block, the seventh subpicture block, and an eighth subpicture block; the seventh preset derivation mode is to derive one derived picture block from the sixth subpicture block and the seventh subpicture block; the eighth preset derivation mode is to keep the fifth subpicture block, the sixth subpicture block, the seventh subpicture block, and the eighth subpicture block independent of each other; and the fifth subpicture block, the sixth subpicture block, the seventh subpicture block, and the eighth subpicture block are sequentially arranged in the current to-be-decoded picture block from left to right; or responsive to determining that N=4, M=4, and the basic split mode is a horizontal and vertical quad split mode, the candidate derivation mode set comprises a ninth preset derivation mode, a tenth preset derivation mode, an eleventh preset derivation mode, and a twelfth preset derivation mode, wherein the ninth preset derivation mode is to derive one derived picture block from a ninth subpicture block and a tenth subpicture block; the tenth preset derivation mode is to derive one derived picture block from the ninth subpicture block and the tenth subpicture block and derive another derived picture block from an eleventh subpicture block and a twelfth subpicture block; the eleventh preset derivation mode is to derive one derived picture block from the tenth subpicture block and the eleventh subpicture block and derive another derived picture block from the ninth subpicture block and the twelfth subpicture block; the twelfth preset derivation mode is to derive one derived picture block from the ninth subpicture block and the twelfth subpicture block; and the ninth subpicture block, the tenth subpicture block, the eleventh subpicture block, and the twelfth subpicture block are sequentially arranged clockwise in the current to-be-decoded picture block.

5. The decoding method according to claim 1, wherein the parsing a bitstream to determine the basic split mode for the current to-be-decoded picture block specifically comprises:
obtaining a split indicator of the current to-be-decoded picture block from the bitstream; and
determining the basic split mode based on the split indicator of the current to-be-decoded picture block; and
wherein the determining a target derivation mode for the current to-be-decoded picture block specifically comprises:
obtaining a derivation indicator of the current to-be-decoded picture block from the bitstream; and
determining the target derivation mode based on the derivation indicator of the current to-be-decoded picture block.

6. The decoding method according to claim 5, wherein:
the split indicator of the current to-be-decoded picture block is indicated by using a variable length code, and the derivation indicator of the current to-be-decoded picture block is indicated by using a fixed length code.

7. The decoding method according to claim 1, wherein each preset derivation mode in the candidate derivation mode set is identified by using a fixed length code.

8. A decoding apparatus, comprising:
a memory; and
one or more processors coupled to the memory, wherein the one or more processors are configured to:
parse a bitstream to determine a basic split mode for a current to-be-decoded picture block and a target derivation mode for a subpicture block of the current to-be-decoded picture block, wherein the target derivation mode is one derivation mode in a candidate derivation mode set, the candidate derivation mode set comprises M preset derivation modes, the preset derivation mode is used to indicate a derivation manner, the derivation manner is used for deriving one derived picture block from any two adjacent subpicture blocks of the current to-be-decoded picture block, and M is an integer greater than or equal to 0;
split the current to-be-decoded picture block into N subpicture blocks in the basic split mode, wherein N is an integer greater than or equal to 2;
derive, in a derivation manner indicated by the target derivation mode, a first derived picture block from at least two adjacent subpicture blocks in the N subpicture blocks; and
decode the first derived picture block,
wherein responsive to determining that the basic split mode is a horizontal N-way split mode or a vertical N-way split mode, $0 \leq M \leq 2^{N-1}$; or
wherein responsive to determining that the basic split mode is a horizontal and vertical N-way split mode, $0 \leq M \leq 2^{2\sqrt{N} \times (\sqrt{N}-1)}$, and $\sqrt{N}$ is an integer.

9. The decoding apparatus according to claim 8, wherein:
responsive to determining that the basic split mode is the horizontal N-way split mode, a width of each of the N subpicture blocks is equal to a width of the current to-be-decoded picture block, and a height of each subpicture block is equal to 1/N of a height of the current to-be-decoded picture block; or
responsive to determining that the basic split mode is the vertical N-way split mode, a height of each of the N subpicture blocks is equal to a height of the current to-be-decoded picture block, and a width of each subpicture block is equal to 1/N of a width of the current to-be-decoded picture block.

10. The decoding apparatus according to claim 8, wherein:
responsive to determining that the basic split mode is the horizontal and vertical N-way split mode, a width of each of the N subpicture blocks is equal to $1/\sqrt{N}$ of a width of the current to-be-decoded picture block, a height of each subpicture block is equal to $1/\sqrt{N}$ of a height of the current to-be-decoded picture block, wherein $\sqrt{N}$ is an integer.

11. The decoding apparatus according to claim 8, wherein:
responsive to determining that N=4, M=4, and the basic split mode is a horizontal quad split mode, the candidate derivation mode set comprises a first preset derivation mode, a second preset derivation mode, a third preset derivation mode, and a fourth preset derivation mode, wherein the first preset derivation mode is to derive one derived picture block from a first subpicture block, a second subpicture block, and a third subpicture block; the second preset derivation mode is to derive one derived picture block from the third subpicture block and a fourth subpicture block; the third preset derivation mode is to derive one derived picture block from the second subpicture block and the third subpicture block; the fourth preset derivation mode is to derive one derived picture block from the first subpicture block and the second subpicture block and derive another derived picture block from the third subpicture block and the fourth subpicture block; and the first subpicture block, the second subpicture block, the third subpicture block, and the fourth subpicture block are sequentially arranged in the current to-be-decoded picture block from top to bottom;

responsive to determining that N=4, M=4, and the basic split mode is a vertical quad split mode, the candidate derivation mode set comprises a fifth preset derivation mode, a sixth preset derivation mode, a seventh preset derivation mode, and an eighth preset derivation mode, wherein the fifth preset derivation mode is to derive one derived picture block from a fifth subpicture block, a sixth subpicture block, and a seventh subpicture block; the sixth preset derivation mode is to derive one derived picture block from the sixth subpicture block, the seventh subpicture block, and an eighth subpicture block; the seventh preset derivation mode is to derive one derived picture block from the sixth subpicture block and the seventh subpicture block; the eighth preset derivation mode is to keep the fifth subpicture block, the sixth subpicture block, the seventh subpicture block, and the eighth subpicture block independent of each other; and the fifth subpicture block, the sixth subpicture block, the seventh subpicture block, and the eighth subpicture block are sequentially arranged in the current to-be-decoded picture block from left to right; or responsive to determining that N=4, M=4, and the basic split mode is a horizontal and vertical quad split mode, the candidate derivation mode set comprises a ninth preset derivation mode, a tenth preset derivation mode, an eleventh preset derivation mode, and a twelfth preset derivation mode, wherein the ninth preset derivation mode is to derive one derived picture block from a ninth subpicture block and a tenth subpicture block; the tenth preset derivation mode is to derive one derived picture block from the ninth subpicture block and the tenth subpicture block and derive another derived picture block from an eleventh subpicture block and a twelfth subpicture block; the eleventh preset derivation mode is to derive one derived picture block from the tenth subpicture block and the eleventh subpicture block and derive another derived picture block from the ninth subpicture block and the twelfth subpicture block; the twelfth preset derivation mode is to derive one derived picture block from the ninth subpicture block and the twelfth subpicture block; and the ninth subpicture block, the tenth subpicture block, the eleventh subpicture block, and the twelfth subpicture block are sequentially arranged clockwise in the current to-be-decoded picture block.

12. The decoding apparatus according to claim 8, wherein the one or more processors are further configured to:
obtain a split indicator of the current to-be-decoded picture block from the bitstream;
determine the basic split mode based on the split indicator of the current to-be-decoded picture block;
obtain a derivation indicator of the current to-be-decoded picture block from the bitstream; and
determine the target derivation mode based on the derivation indicator of the current to-be-decoded picture block.

13. The decoding apparatus according to claim 12, wherein:
the split indicator of the current to-be-decoded picture block is indicated by using a variable length code, and the derivation indicator of the current to-be-decoded picture block is indicated by using a fixed length code.

14. The decoding apparatus according to claim 8, wherein each preset derivation mode in the candidate derivation mode set is identified by using a fixed length code.

* * * * *

UNITED STATES PATENT AND TRADEMARK OFFICE
CERTIFICATE OF CORRECTION

| | | |
|---|---|---|
| PATENT NO. | : 11,936,861 B2 | Page 1 of 1 |
| APPLICATION NO. | : 17/099470 | |
| DATED | : March 19, 2024 | |
| INVENTOR(S) | : Yu et al. | |

It is certified that error appears in the above-identified patent and that said Letters Patent is hereby corrected as shown below:

In the Claims

Claim 1: Column 50, Line 11: "$0 \leq M \leq 2^{2\sqrt{N} \times (\sqrt{N}-1)}$; and V$\sqrt{N}$ is an integer." should read -- $0 \leq M \leq 2^{2\sqrt{N} \times (\sqrt{N}-1)}$, and $\sqrt{N}$ is an integer. --.

Signed and Sealed this
Twelfth Day of November, 2024

*Katherine Kelly Vidal*

Katherine Kelly Vidal
*Director of the United States Patent and Trademark Office*